US012587640B2

(12) United States Patent
Dumas et al.

(10) Patent No.: US 12,587,640 B2
(45) Date of Patent: Mar. 24, 2026

(54) INTERACTIONS BETWEEN NEURAL NETWORK-BASED INTRA PREDICTION MODES AND REGULAR INTRA PREDICTION MODES

(71) Applicant: INTERDIGITAL CE PATENT HOLDINGS, SAS, Paris (FR)

(72) Inventors: Thierry Dumas, Rennes (FR); Franck Galpin, Thorigne-Fouillard (FR); Philippe Bordes, Laille (FR); Fabrice Le Léannec, Betton (FR); Antoine Robert, Mézières sur Couesnon (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 73 days.

(21) Appl. No.: 18/288,763

(22) PCT Filed: Apr. 28, 2022

(86) PCT No.: PCT/IB2022/000252
§ 371 (c)(1),
(2) Date: Oct. 27, 2023

(87) PCT Pub. No.: WO2022/229707
PCT Pub. Date: Nov. 3, 2022

(65) Prior Publication Data
US 2024/0214558 A1 Jun. 27, 2024

(30) Foreign Application Priority Data

Apr. 28, 2021 (EP) ..................................... 21305546
Jun. 11, 2021 (EP) ..................................... 21305806
(Continued)

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/159* (2014.11); *H04N 19/176* (2014.11); *H04N 19/196* (2014.11); *H04N 19/593* (2014.11)

(58) Field of Classification Search
CPC .... H04N 19/11; H04N 19/159; H04N 19/176; H04N 19/196; H04N 19/593; H04N 19/463; H04N 19/12
See application file for complete search history.

(56) References Cited

U.S. PATENT DOCUMENTS

| | | | |
|---|---|---|---|
| 11,252,410 B2* | 2/2022 | Liu ...................... | H04N 19/122 |
| 12,335,539 B2* | 6/2025 | Dumas ................. | H04N 19/176 |

(Continued)

FOREIGN PATENT DOCUMENTS

WO WO-2020251743 A1 * 12/2020 ........... H04N 19/122

OTHER PUBLICATIONS

Yang Wang et al., (hereinafter Wang) "Multi-Scale Convolutional Neural Network-Based Intra Prediction for Video Coding", IEEE Transactions on Circuits and Systems for video technology, vol. 30, No. 7, Jul. 2020, pp. 1803-1815 (Year: 2020).*
(Continued)

*Primary Examiner* — Dramos Kalapodas
(74) *Attorney, Agent, or Firm* — Condo Roccia Koptiw LLP

(57) ABSTRACT

Systems, methods, and instrumentalities are disclosed for performing intra prediction of a luminance coding block and/or a chrominance coding block and related signaling when neural network-based intra prediction is enabled. For a current coding block, information representative of a neural network-based prediction mode and a block context may be obtained. A neural network-based predictor may be generated for the current coding block based on the block context and the neural network-based prediction mode. A (Continued)

non-neural network-based intra prediction mode that corresponds to the generated neural network-based predictor may be determined. A prediction mode for a neighboring block may be determined based on the non-neural network-based intra prediction mode.

20 Claims, 35 Drawing Sheets

(30)          Foreign Application Priority Data

Sep. 20, 2021     (EP) ..................................... 21306297
Dec. 21, 2021     (EP) ..................................... 21306892

(51)   Int. Cl.
       *H04N 19/176*          (2014.01)
       *H04N 19/196*          (2014.01)
       *H04N 19/593*          (2014.01)

(56)               References Cited

U.S. PATENT DOCUMENTS

| | | | |
|---|---|---|---|
| 2022/0094977 A1* | 3/2022 | Kim ..................... | G06N 3/0464 |
| 2022/0256169 A1* | 8/2022 | Siddaramanna ....... | G06N 3/045 |
| 2023/0388490 A1* | 11/2023 | Liu ........................ | H04N 19/70 |

OTHER PUBLICATIONS

Brand et al., "Intra-Frame Coding Using a Conditional Autoencoder", IEEE Journal of Selected Topics in Signal Processing, vol. 15, No. 2, Feb. 2021, pp. 354-365.

Dumas et al., "AHG11: Neural Network-Based Intra Prediction with Transform Selection in VVC", JVET-T0073, InterDigital, Joint Video Experts Team (JVET) of ITU-T SG 16 WP 3 and ISO/IEC JTC 1/SC 29, 20th Meeting, by Teleconference, Oct. 7-16, 2020, 11 pages.

Helle et al., "Intra Picture Prediction for Video Coding with Neural Networks", 2019 Data Compression Conference (DCC), Mar. 26, 2019, pp. 448-457.

Koo et al., "Low Frequency Non-Separable Transform (LFNST)", 2019 Picture Coding Symposium (PCS), Ningbo, China, Nov. 12-15, 2019, 5 pages.

Li et al., "Fully-Connected Network-Based Intra Prediction for Image Coding", IEEE Transactions on Image Processing, vol. 27, No. 7, Jul. 2018, pp. 3236-3247.

Meyer et al., "Convolutional Neural Networks for Video Intra Prediction Using Cross-Component Adaptation", ICASSP, 2019, pp. 1607-1611.

Sun et al., "Enhanced Intra Prediction for Video Coding by Using Multiple Neural Networks", IEEE Transactions on Multimedia, vol. 22, Issue 11, Nov. 2020, pp. 2764-2779.

Wang et al., "Multi-Scale Convolutional Neural Network-Based Intra Prediction for Video Coding", IEEE Transactions on Circuits and Systems for video technology, vol. 30, No. 7, Jul. 2020, pp. 1803-1815.

* cited by examiner $$X = X_0 \cup X_1$$

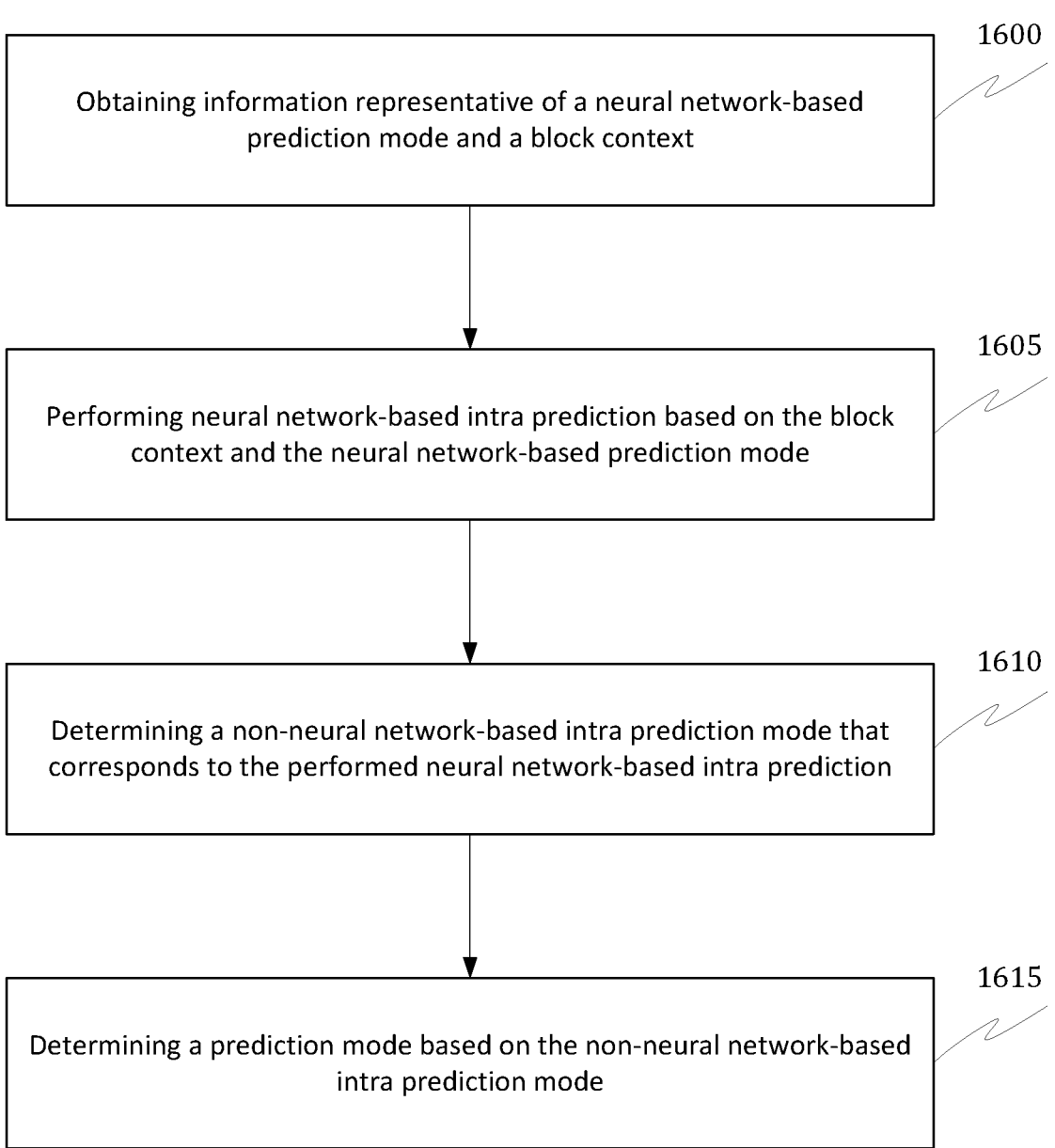

1600

Obtaining information representative of a neural network-based prediction mode and a block context

1605

Performing neural network-based intra prediction based on the block context and the neural network-based prediction mode

1610

Determining a non-neural network-based intra prediction mode that corresponds to the performed neural network-based intra prediction

1615

Determining a prediction mode based on the non-neural network-based intra prediction mode

FIG. 16

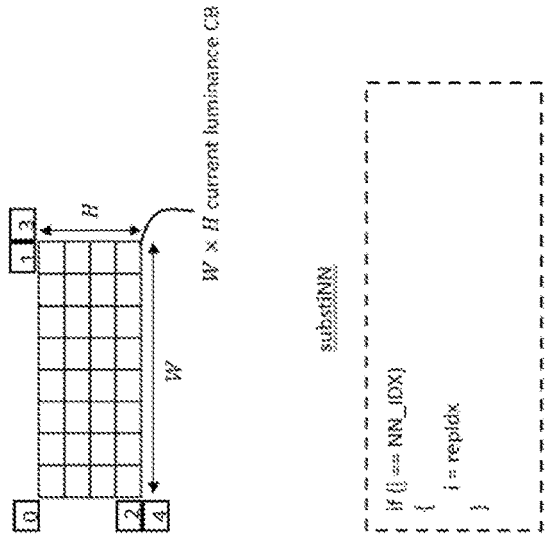
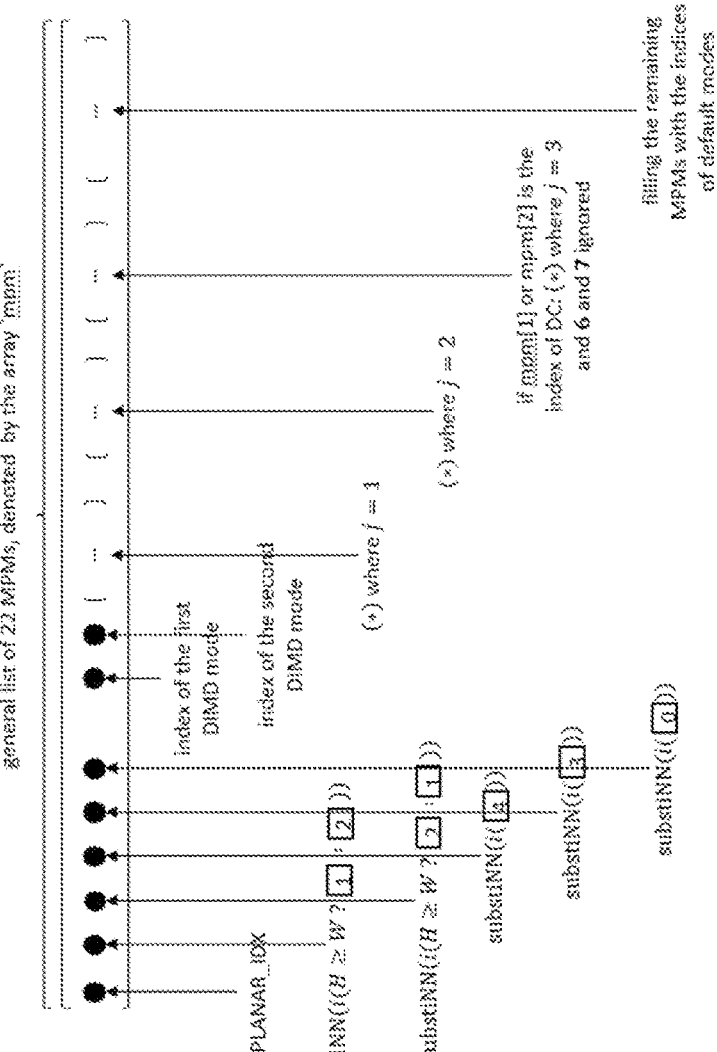
FIG. 27

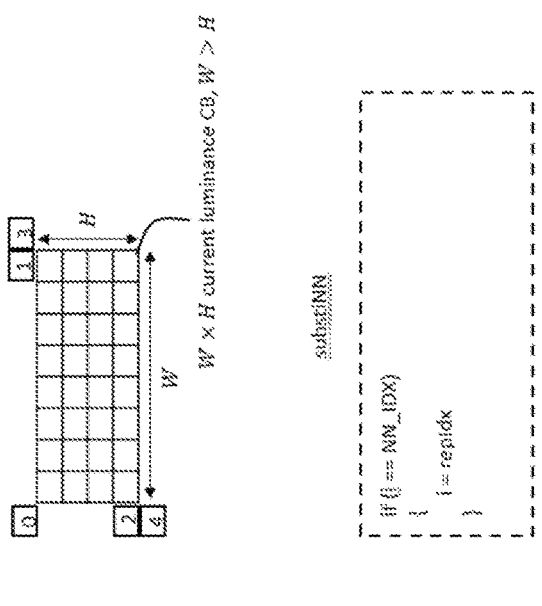
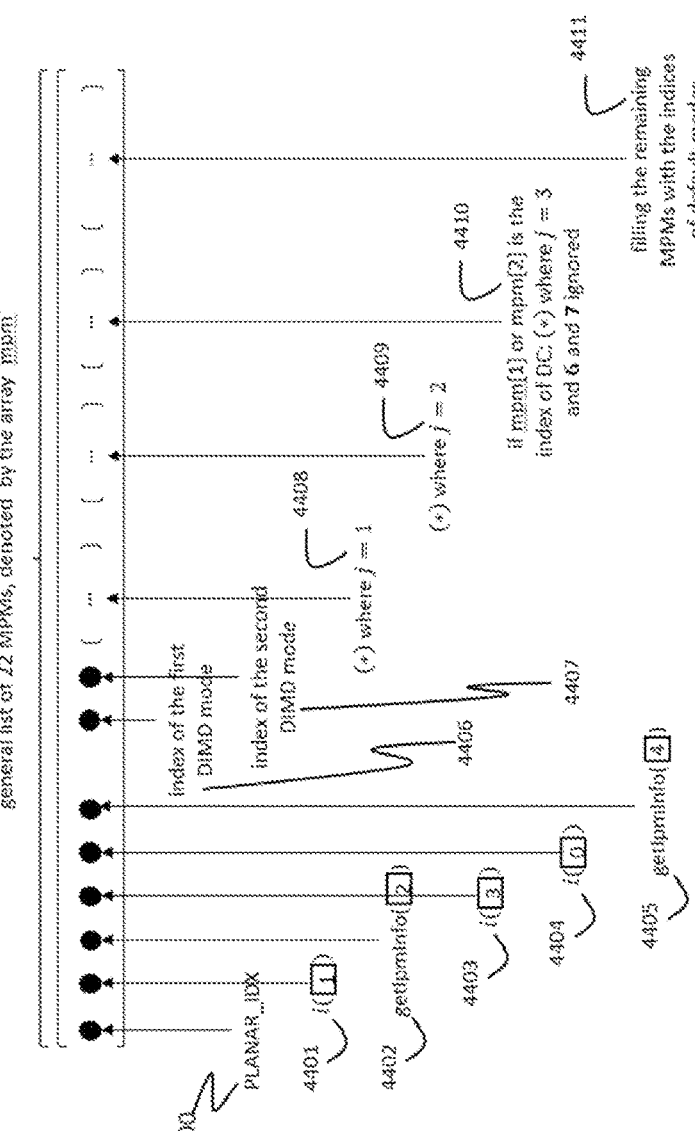
FIG. 28

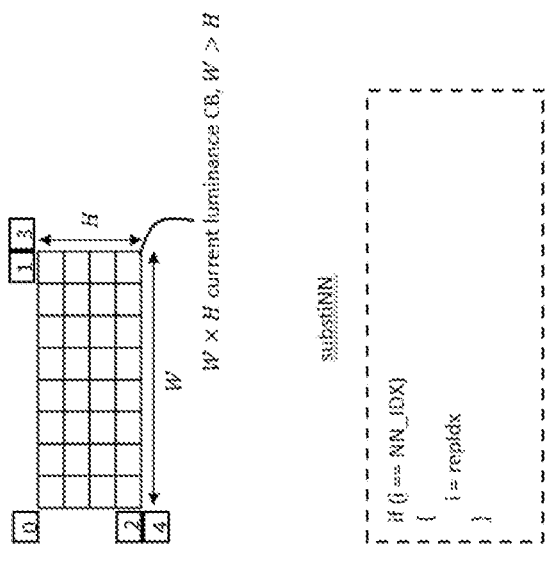
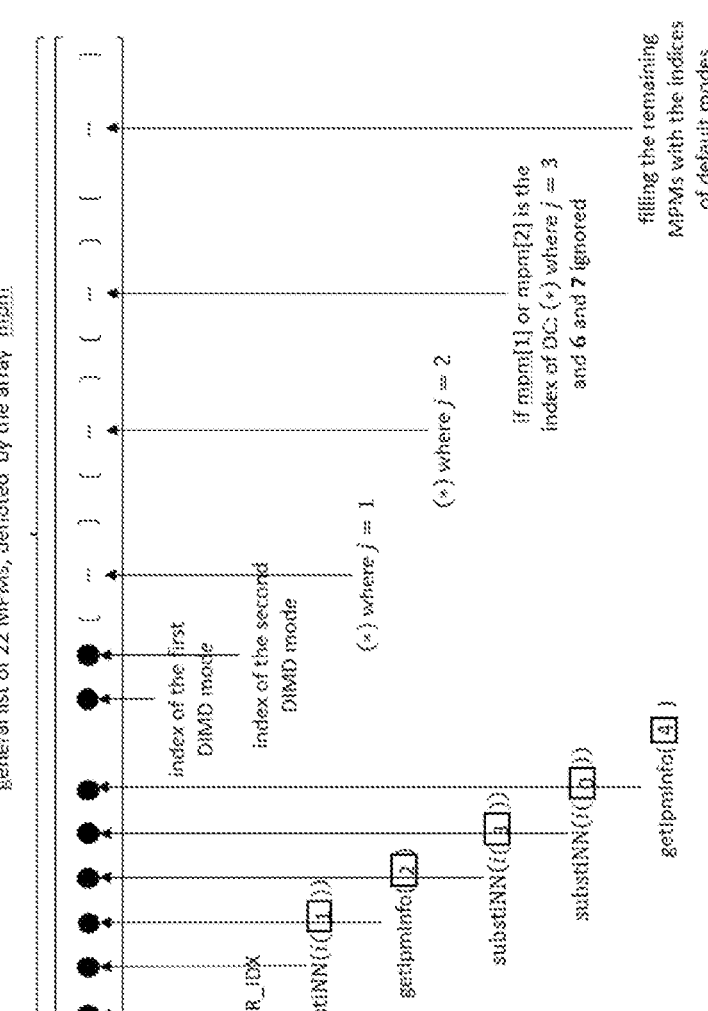
FIG. 29

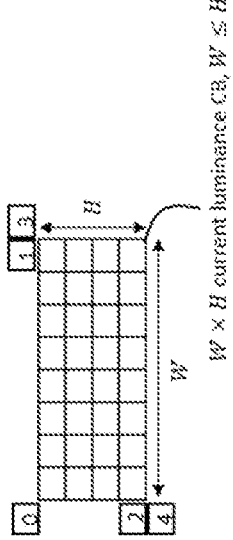
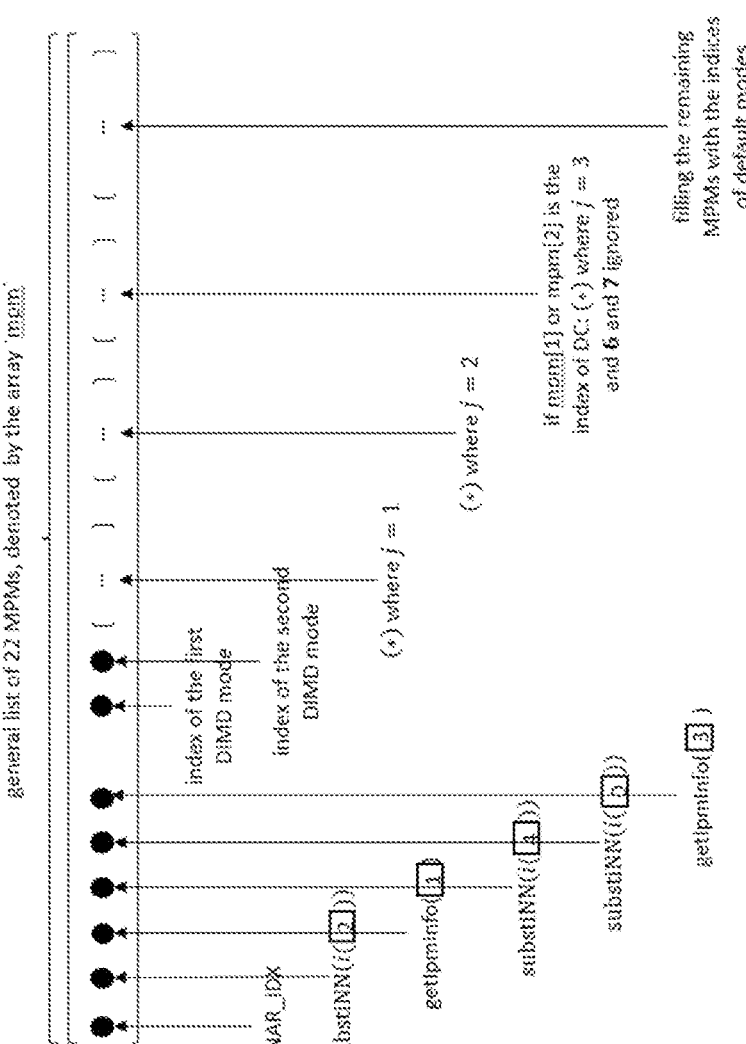
FIG. 30

INTERACTIONS BETWEEN NEURAL NETWORK-BASED INTRA PREDICTION MODES AND REGULAR INTRA PREDICTION MODES

CROSS-REFERENCE TO RELATED APPLICATIONS

This application is the National Stage Entry under 35 U.S.C. § 371 of Patent Cooperation Treaty Application No. PCT/IB2022/000252, filed Apr. 28, 2022, which claims the benefit of European Provisional Patent Application No. 21305546.0, filed Apr. 28, 2021; European Provisional Patent Application No. 21305806.8, filed Jun. 11, 2021; European Provisional Patent Application No. 21306297.9, filed Sep. 20, 2021; and European Provisional Patent Application No. 21306892.7, filed Dec. 21, 2021, the contents of which are hereby incorporated by reference herein.

BACKGROUND

To achieve high compression efficiency, image and video coding schemes may employ prediction and transform to leverage spatial and temporal redundancy in the video content. Intra prediction or inter prediction may be used to exploit the intra or inter frame correlation. Differences between the original block and the predicted block, often denoted as prediction errors or prediction residuals, may be transformed, quantized, and entropy coded. To reconstruct the video, the compressed data may be decoded by inverse processes corresponding to the entropy coding, quantization, transform, and prediction.

SUMMARY

Systems, methods, and instrumentalities are disclosed for performing intra prediction of a luminance coding block and/or a chrominance coding block and related signaling when neural network-based intra prediction is enabled. For a current coding block, information representative of a neural network-based prediction mode and a block context may be obtained. A neural network-based predictor may be generated for the current coding block based on the block context and the neural network-based prediction mode. A non-neural network-based intra prediction mode that corresponds to the generated neural network-based predictor may be determined. A prediction mode for a neighboring block may be determined based on the non-neural network-based intra prediction mode.

Systems, methods, and instrumentalities described herein may include a decoder. In some examples, the systems, methods, and instrumentalities described herein may include an encoder. In some examples, the systems, methods, and instrumentalities described herein may include a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

BRIEF DESCRIPTION OF THE DRAWINGS

FIG. 16 shows an example inferring the index of the regular intra prediction mode that best represents the neural network prediction of the current block on a decoder side.

3

Figure 25:
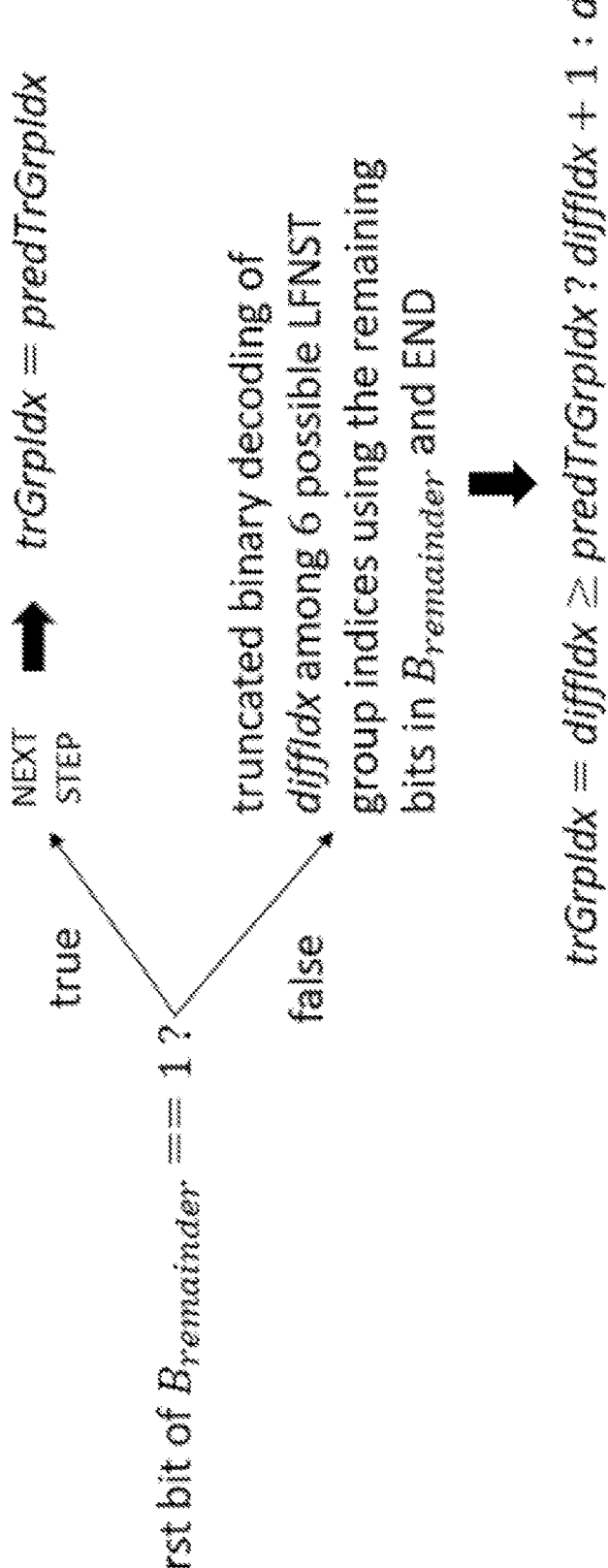

FIG. 25 shows the example predictive decoding associated with the predictive encoding.

Figure 26:
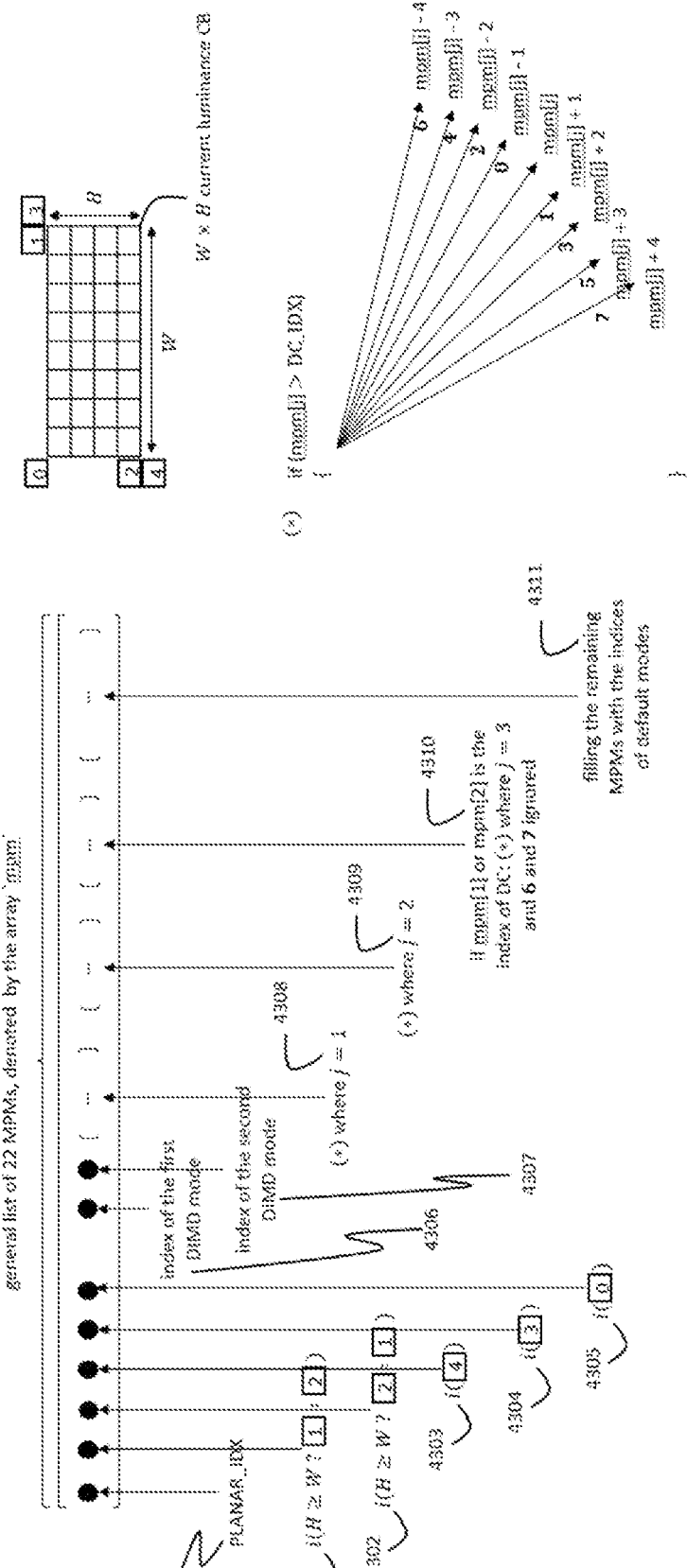

FIG. 26 shows an example derivation of a list of most probable modes (MPMs).

FIG. 27 shows an example derivation of the list of MPMs for a video codec including the neural network-based intra prediction mode.

FIG. 28 shows an example derivation of the list of MPMs.

FIG. 29 shows an example derivation of the list of MPMs for a video codec including the neural network-based intra prediction mode.

FIG. 30 shows an example derivation of the list of MPMs for a video codec including the neural network-based intra prediction mode.

Figure 31:
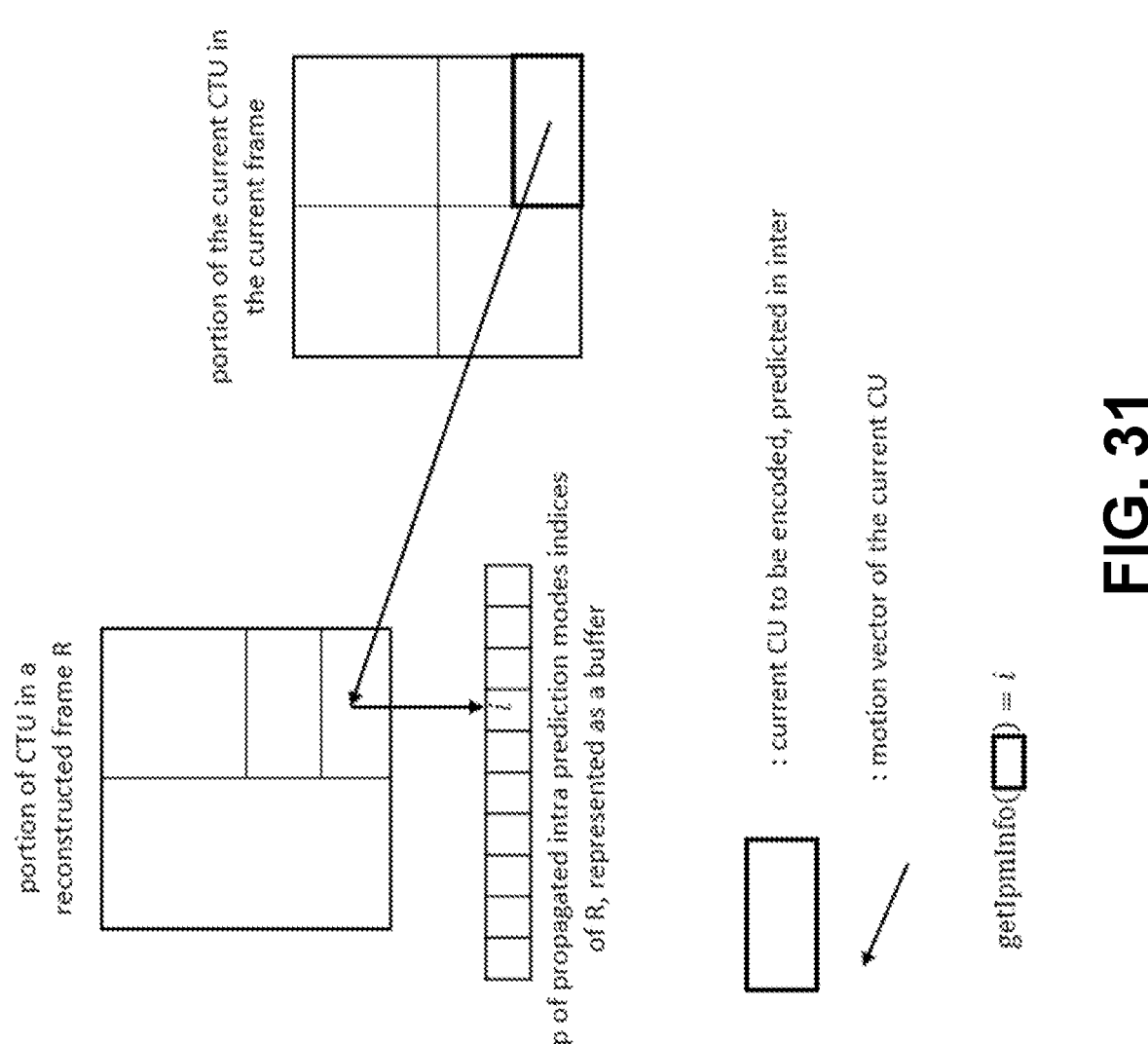

FIG. 31 shows an example derivation of the list of MPMs.

Figure 32:
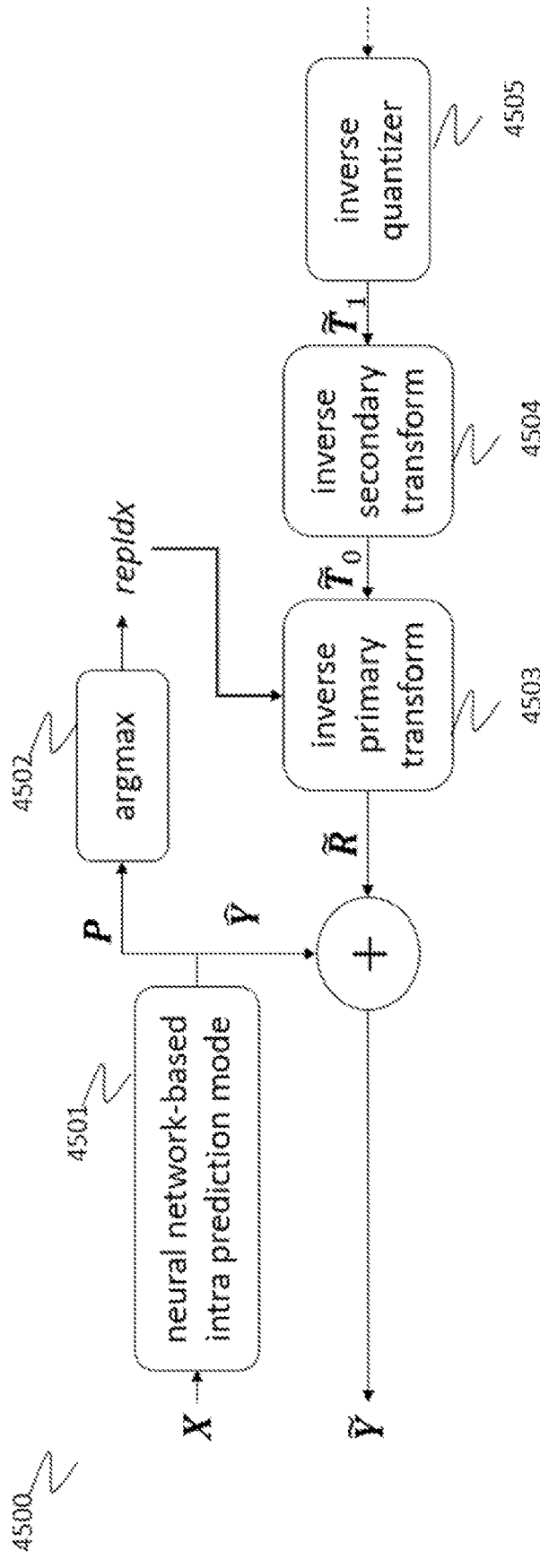

FIG. 32 shows an example inferring the index of the regular intra prediction mode that represents the neural network prediction of the current block on a decoder side.

DETAILED DESCRIPTION

A more detailed understanding may be had from the following description, given by way of example in conjunction with the accompanying drawings.

Figure 1A:
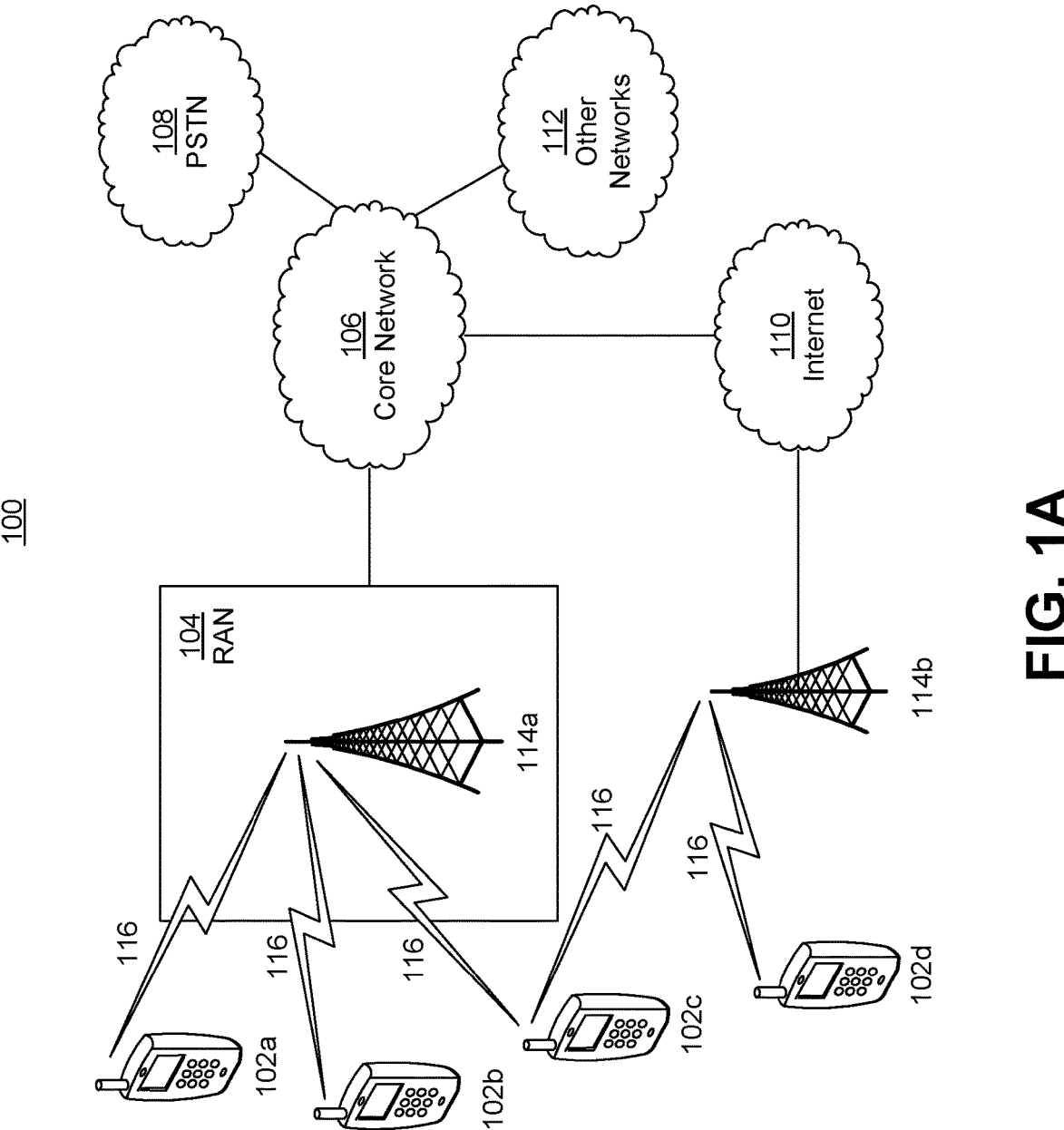
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
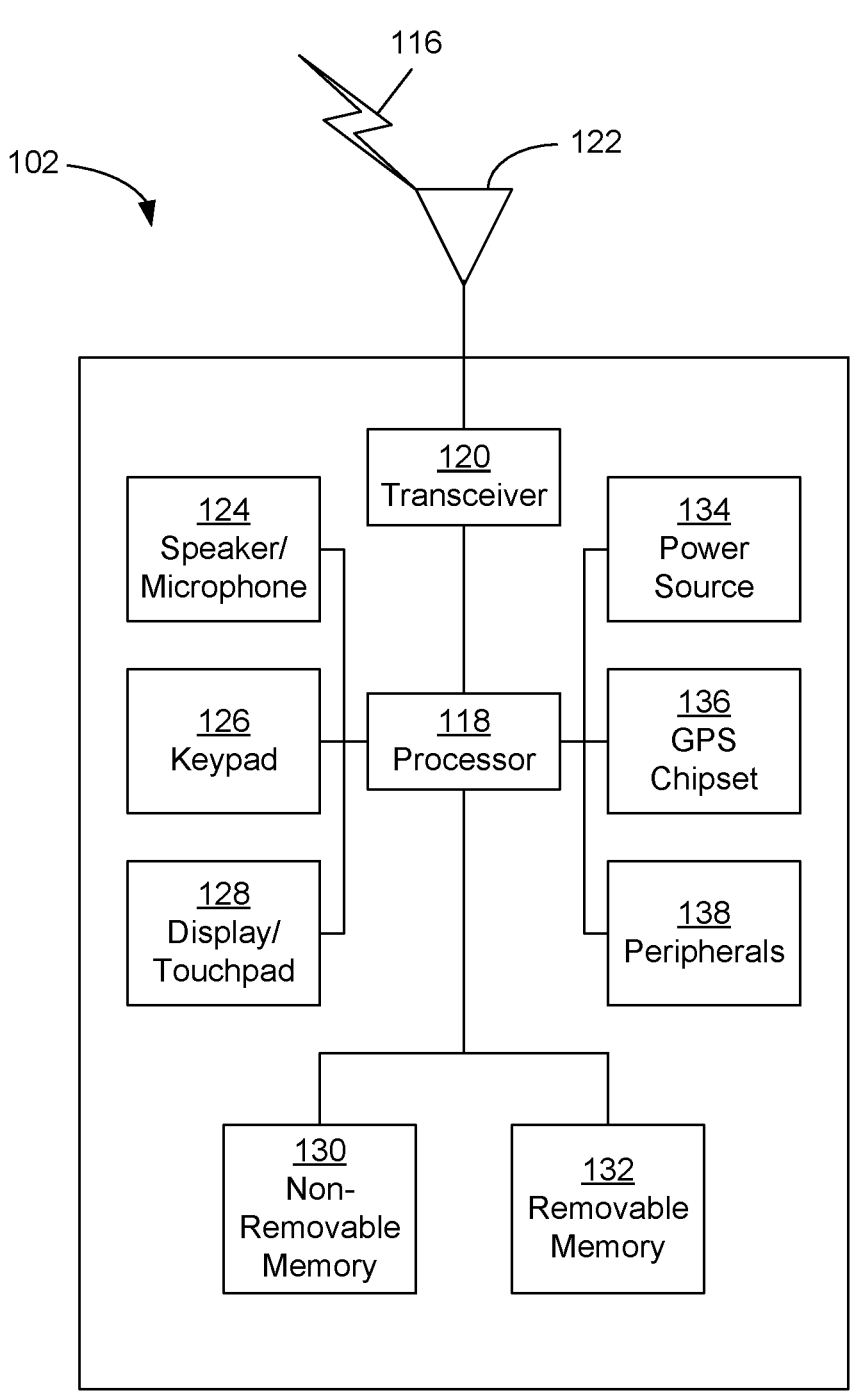
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
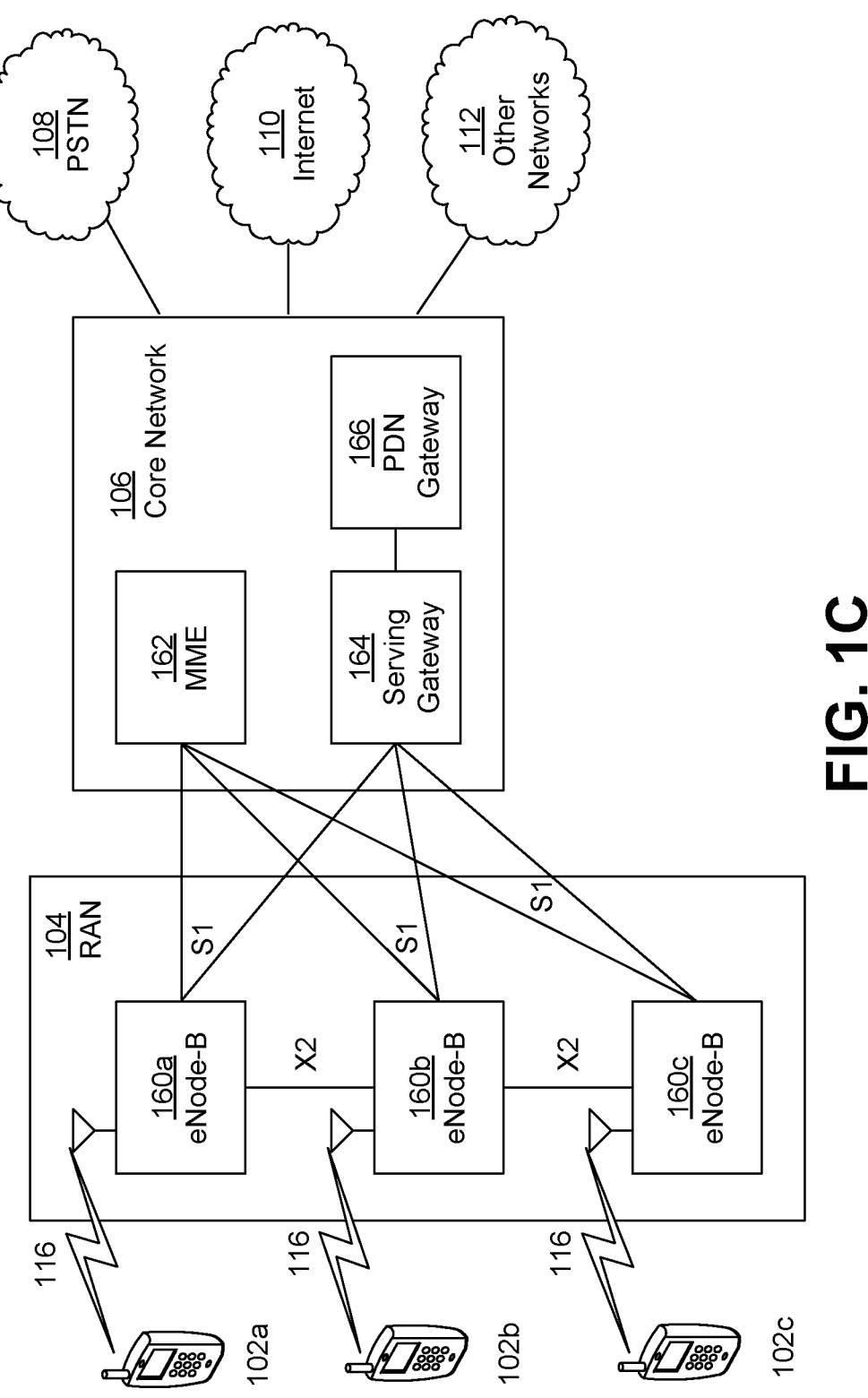
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
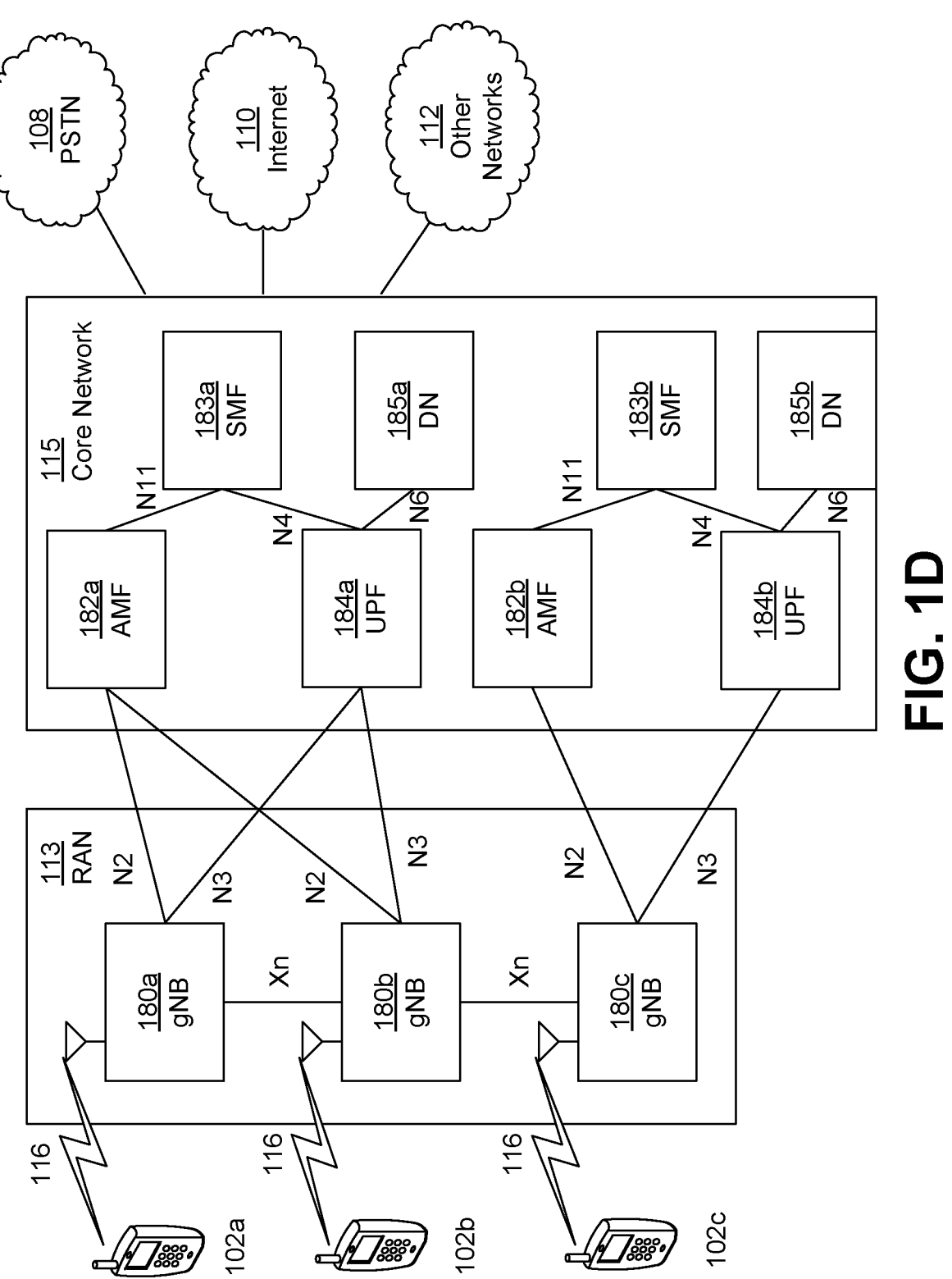
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-15 described herein may provide some examples, but other examples are contemplated. The discussion of FIGS. 5-15 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
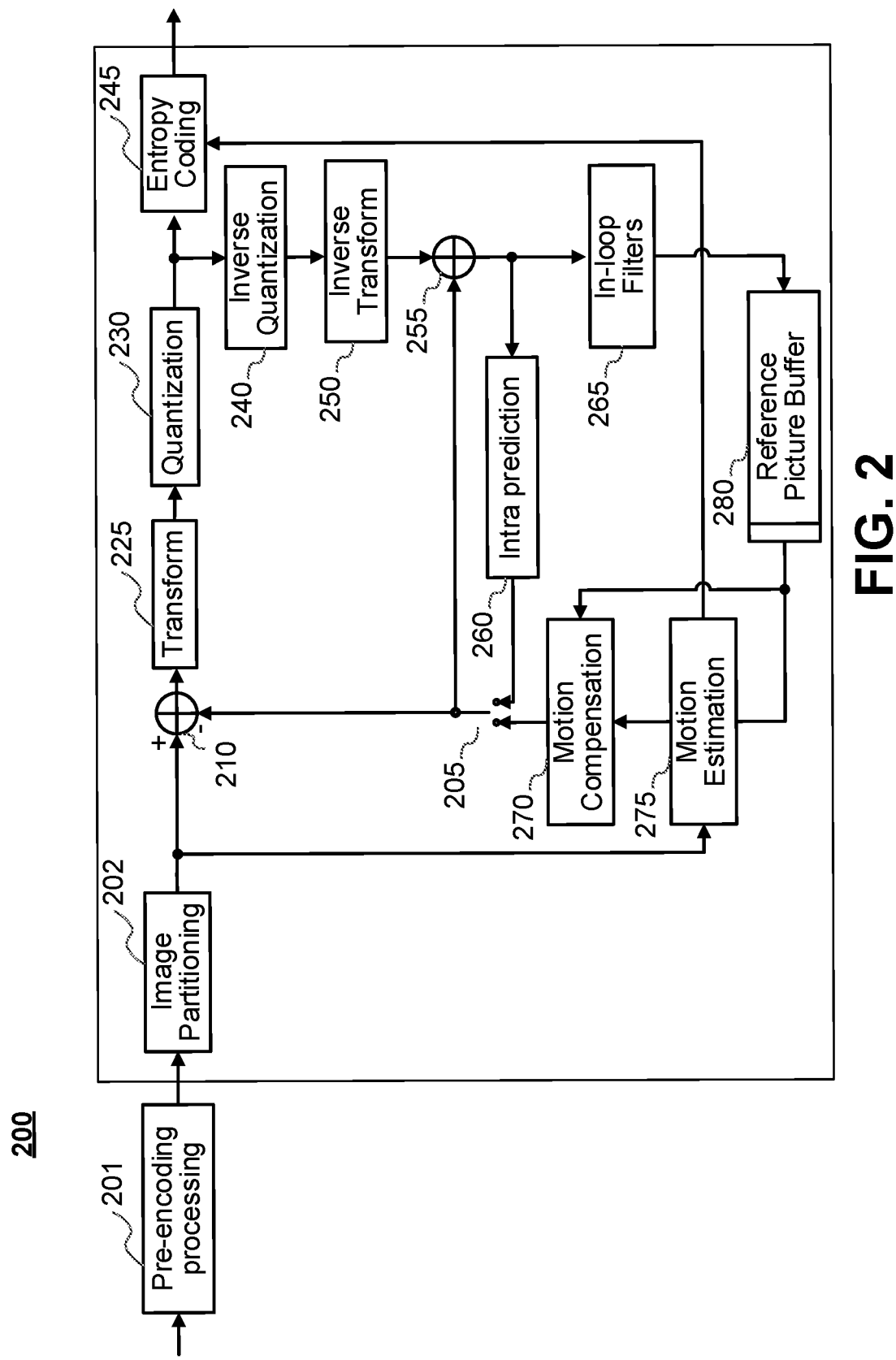
FIG. 2 illustrates an example video encoder.
Figure 3:
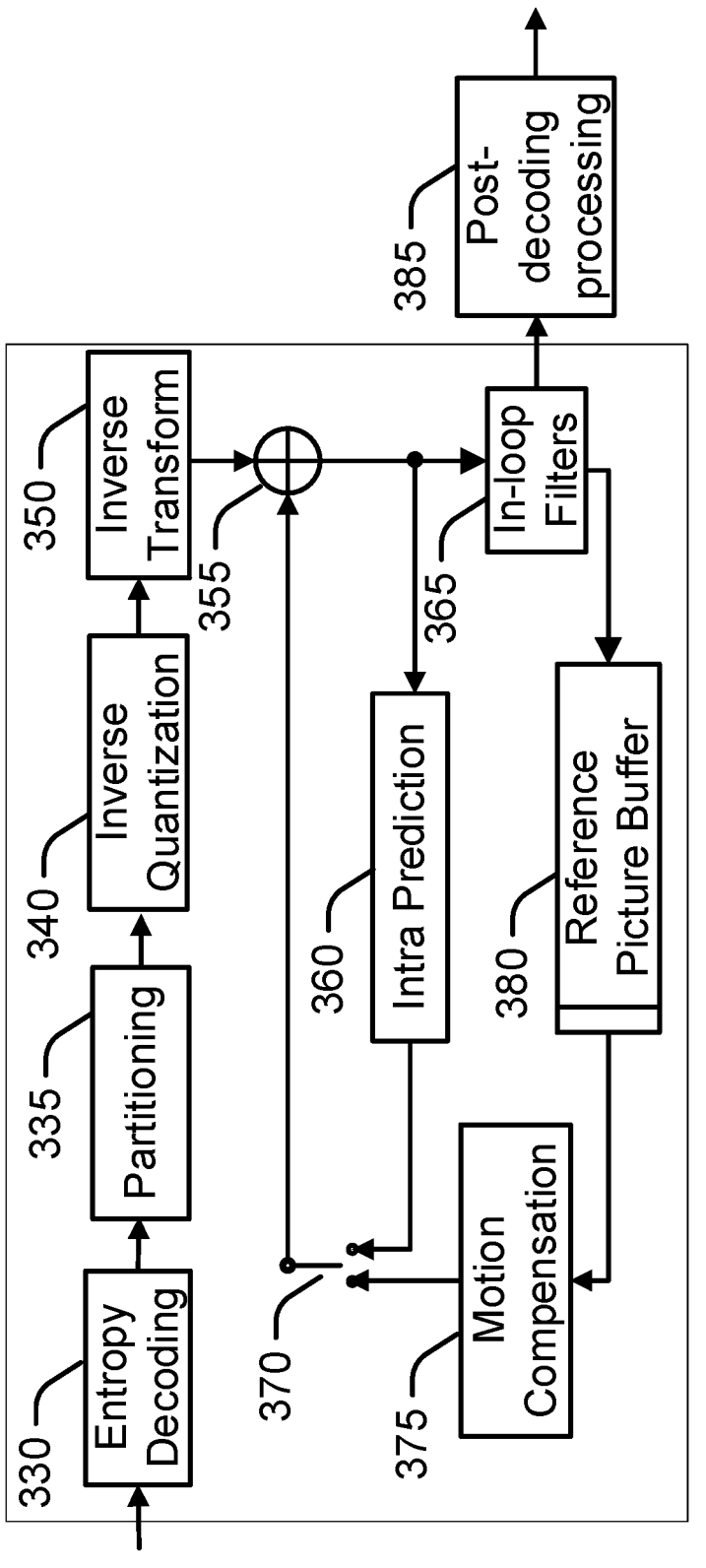
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as numbers of bits, bit depth, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing 201, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned 202 and processed in units of, for example, coding units (CUs). Each unit is encoded using, for example, either an intra or inter mode. When a unit is encoded in an intra mode, it performs intra prediction 260. In an inter mode, motion estimation 275 and compensation 270 are performed. The encoder decides 205 which one of the intra mode or inter mode to use for encoding the unit, and indicates the intra/inter decision by, for example, a prediction mode flag. Prediction residuals are calculated, for example, by subtracting 210 the predicted block from the original image block.

The prediction residuals are then transformed 225 and quantized 230. The quantized transform coefficients, as well as motion vectors and other syntax elements, are entropy coded 245 to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized 240 and inverse transformed 250 to decode prediction residuals. Combining 255 the decoded prediction residuals and the predicted block, an image block is reconstructed. In-loop filters 265 are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded 330 to obtain transform coefficients, motion vectors, and other coded information. The picture partition information indicates how the picture is partitioned. The decoder may therefore divide 335 the picture according to the decoded picture partitioning information. The transform coefficients are de-quantized 340 and inverse transformed 350 to decode the prediction residuals. Combining 355 the decoded prediction residuals and the predicted block, an image block is reconstructed. The predicted block may be obtained 370 from intra prediction 360 or motion-compensated prediction (i.e., inter prediction) 375. In-loop filters 365 are applied to the reconstructed image. The filtered image is stored at a reference picture buffer 380.

The decoded picture can further go through post-decoding processing 385, for example, an inverse color transform (e.g., conversion from YCbCr 4:2:0 to RGB 4:4:4) or an inverse remapping performing the inverse of the remapping process performed in the pre-encoding processing 201. The post-decoding processing can use metadata derived in the pre-encoding processing and signaled in the bitstream. In an example, the decoded images (e.g., after application of the in-loop filters 365 and/or after post-decoding processing 385, if post-decoding processing is used) may be sent to a display device for rendering to a user.

Figure 4:
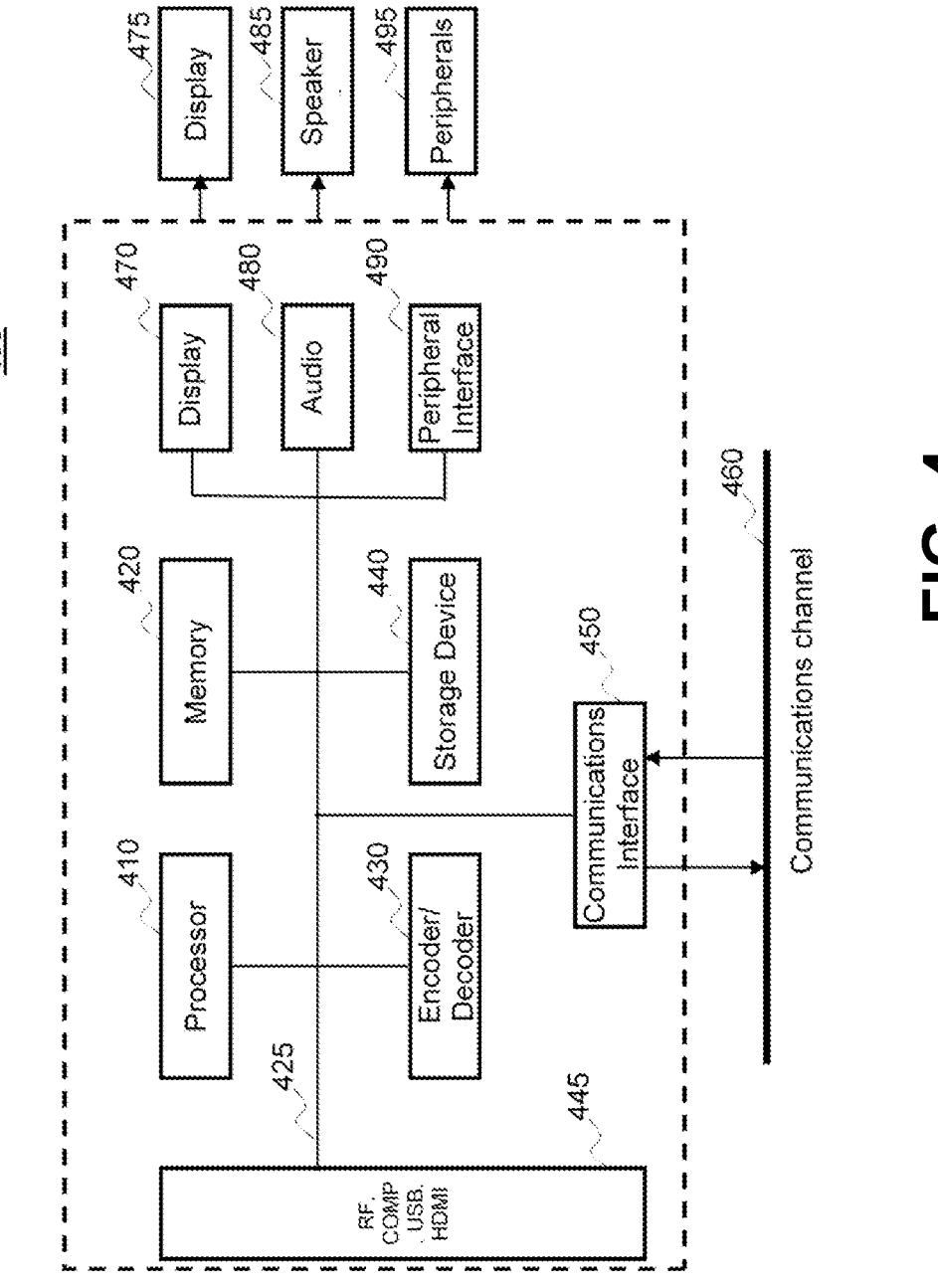
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations include decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, dequantization, inverse transformation, and obtaining, for a current coding block, information representative of a neural network-based prediction mode and a block context, generating a neural network-based predictor for the current coding block based on the block context and the neural network-based prediction mode, determining a non-neural network-based intra prediction mode that corresponds to the generated neural network-based predictor, determining a prediction mode for a neighboring block based on the non-neural network-based intra prediction mode, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations include encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, performing quantization, transformation, and obtaining, for a current coding block, information representative of a neural network-based prediction mode and a block context, generating a neural network-based predictor for the current coding block based on the block context and the neural network-based prediction mode, determining a non-neural network-based intra prediction mode that corresponds to the generated neural network-based predictor, determining a prediction mode for a neighboring block based on the non-neural network-based intra prediction mode, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on intra prediction mode index, probability, block context, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an encoding function on an input for a block using a prediction mode, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

Neural network-based intra prediction modes in a block-based video codec may be signaled. Regular intra prediction mode may refer to a non-neural network-based intra prediction mode, such as the 65 directional intra prediction modes, non-directional modes such as PLANAR and DC modes, matrix-based intra prediction (MIP) modes, etc. Interaction may refer to an interaction between an intra prediction mode selected to predict a current block and an intra prediction mode selected to predict a block surrounding the current block (e.g., a neighbor of the current block). Interaction may relate to how the signaling cost of the intra prediction mode selected to predict the current block may be affected by the intra prediction mode selected to predict a block around the current block.

The neural networks associated with the neural network-based intra prediction mode may be trained at determining (e.g., inferring the index of) the regular intra prediction mode (e.g., non-neural network intra prediction mode) that represents (e.g., best represents) the neural network prediction of the current block. For example, a neural network-based predictor may be generated for the current block based on a block context and the neural network-based intra prediction mode. A block predicted by the neural network-based intra prediction mode may be represented via the index of the regular intra prediction mode that best represents the neural network prediction. For example, if the derivation of the list of MPMs is used to signal the intra prediction mode selected to predict the current luminance CB, the derivation may use the regular intra prediction mode index inferred by the neural network-based intra prediction mode (e.g., the index of the non-neural network-based intra prediction mode may be added to the derived MPM list) when it predicts a luminance CB neighboring the current luminance CB (e.g., a neighboring luminance CB).

The neural networks belonging to the neural network-based intra prediction mode may be trained at inferring the indices of multiple (e.g., the k) regular intra prediction modes that represent (e.g., best represent) the neural network prediction of the current block. The neural networks associated with the neural network-based intra prediction mode may be trained at ranking based on how (e.g., how well) a regular intra prediction mode (e.g., each regular intra prediction mode) represents the neural network prediction (e.g., the generated neural network-based predictor) of the current block. A block predicted by the neural network-based intra prediction mode may be represented, for example, via the k inferred indices. For example, if the list of MPMs is used to signal the intra prediction mode selected to predict the current luminance CB, multiple non-neural network-based intra prediction mode indices (e.g., the k regular intra prediction mode indices) may be inferred using the neural network-based intra prediction mode. For example, the indices may be added to the derived MPM list when it predicts a luminance CB neighboring the current luminance CB (e.g., the neighboring luminance CB).

Machine learning-based intra prediction modes and regular intra prediction modes may be used when encoding and decoding video content. Mapping between a machine learning-based intra prediction mode index (e.g., each machine learning-based intra prediction mode index) and a regular intra prediction mode index may be used, for example, to facilitate interactions between machine learning-based intra prediction modes and regular intra prediction modes. Machine learning-based intra prediction modes may be disregarded and/or disabled, for example, to facilitate interactions between machine learning-based intra prediction modes and regular intra prediction modes.

Mapping between a machine learning-based intra prediction mode index (e.g., each machine learning-based intra prediction mode index) and an index of a regular intra prediction mode may be obtained. The MIP mode(s) may belong to a group of the machine learning-based intra prediction modes, for example, if the MIP modes' matrices are learned. The MIP mode(s) may be fixed on the encoder and/or decoder sides. In examples, a mapping may turn an index of an MIP mode into an index of a regular intra prediction mode (e.g., used by a derivation of a list of MPMs), for example, if the intra prediction mode selected to predict a luminance CB located above or located on the left side of a current luminance CB (e.g., the current luminance CB in a derivation of a list of MPMs) is an MIP mode.

In the example that follows, an argument of PU::getIntraDirLuma may be a prediction unit (PU) (e.g., denoted as pu in the example that follows). A PU may be equivalent to the PU's coding unit (CU). In examples, the PU (e.g., denoted as pu in the example that follows) fed into PU::getIntraDirLuma may be the PU of the CU of the luminance CB located above the current luminance CB or located on the left side of the current luminance CB. Mapping from an MIP mode index (e.g., each MIP mode index) to an index of a regular intra prediction mode may be replaced by a mapping from an MIP mode index (e.g., each MIP mode index) to the PLANAR index.

```
uint32_t PU::getIntraDirLuma(const PredictionUnit& pu)
if (isMip(pu))
{
    return g_mapMipToAngular65[getMipSizeId(pu)][pu.intraDir[CHANNEL_TYPE_LUMA]];
}
else
{
    return pu.intraDir[CHANNEL_TYPE_LUMA];
}
```

In the example above, PU::getIntraDirLuma in the file UnitTools.cpp may be provided. isMip may return true, for example, if isMip's argument PU (e.g., denoted as pu in the example above) is predicted via an MIP mode. In the example above, pu.intraDir[CHANNEL_TYPE_LUMA] may be an index of an intra prediction mode selected to predict a luminance component of the PU (e.g., denoted as pu in the example above). In the example above, g_mapMipToAngular65 may be mapping from an MIP mode index (e.g., each MIP mode index) to the index of a regular intra prediction mode.

The example above may apply to linear and/or affine machine learning-based intra prediction modes. A mapping (e.g., a fixed mapping) from a machine learning-based intra prediction mode index (e.g., each machine learning-based intra prediction mode index) to an index of a regular intra prediction mode may be constructed.

For a current luminance CB (e.g., in a derivation of a list of MPMs), information associated with the prediction via a neural network-based intra prediction mode may be discarded, for example, if the luminance CB located above the current luminance CB is predicted by the neural network-based intra prediction mode. The derivation of the list of MPMs may be adapted to rely on the remaining information. Information associated with the prediction via a neural network-based intra prediction mode may be ignored, for example, if the luminance CB located on the left side of the current luminance CB is predicted by the neural network-based intra prediction mode. The derivation of the list of MPMs may depend on the remaining information. In the example that follows, for the current luminance CB, a default list of MPMs may be derived, for example, if L==A==NN_IDX. The index of the intra prediction mode selected to predict the two neighboring luminance CBS (e.g., each of the two neighboring luminance CBs) may provide no information to derive the list of MPMs.

Semantics of the Example that Follows May Include:
L may indicate an index of the intra prediction mode of the left luminance CB, which may belong to [[0, 66]] ∪{NN_IDX};
A may indicate an index of the intra prediction mode of the above luminance CB, which may belong to [[0, 66]] ∪{NN_IDX};
offset may indicate a numeric value of 61;
mod may indicate a numeric value of 64;
NN_IDX may indicate an index of the neural network-based intra prediction mode (e.g., 72); and
multiRefIdx may be the Multiple Reference Lines (MRL) index, which may belong to {0, 1, 2}.
Initialization of the MPM list may be provided, for example:

```
MPM[0] = PLANAR_IDX
MPM[1] = DC_IDX
MPM[2] = VER_IDX
```

-continued

```
    MPM[3] = HOR_IDX
    MPM[4] = VER_IDX – 4
    MPM[5] = VER_IDX + 4
if (L == A)
{
    if ((L > DC_IDX) && (L != NN_IDX))
    {
        if ((multiRefIdx > 0) || !is Signaling0)
        {
            MPM[0] = PLANAR_IDX
            MPM[1] = L
            MPM[2] = ((L + offset) % mod) + 2
            MPM[3] = ((L – 1) % mod) + 2
            MPM[4] = ((L + offset – 1) % mod) + 2
            MPM[5] = (L % mod) + 2
        }
        else
        {
            MPM[0] = L
            MPM[1] = ((L + offset) % mod) + 2
            MPM[2] = ((L – 1) % mod) +2
            MPM[3] = PLANAR_IDX
            MPM[4] = ((L + offset – 1) % mod) + 2
            MPM[5] = (L % mod) + 2
        }
    }
    else
    {
        use initialized values
    }
}
else
{
    if ((L == NN_IDX) || (A == NN_IDX))
    {
        if ((L == NN_IDX) && (A > DC_IDX))
        {
            if (multiRefIdx > 0 || !isSignaling0)
            {
                MPM[0] = PLANAR_IDX
                MPM[1] = A
                MPM[2] = ((A + offset) % mod) + 2
                MPM[3] = ((A – 1) % mod) + 2
                MPM[4] = ((A + offset – 1) % mod) + 2
                MPM[5] = (A % mod) + 2
            }
            else
            {
                MPM[0] = A
                MPM[1] = ((A + offset) % mod) + 2
                MPM[2] = ((A – 1) % mod) + 2
                MPM[3] = PLANAR_IDX
                MPM[4] = ((A + offset – 1) % mod) + 2
                MPM[5] = (A % mod) + 2
            }
        }
        else if ((A == NN_IDX) && (L > DC_IDX))
        {
            if (multiRefIdx > 0 || !isSignaling0)
            {
                MPM[0] = PLANAR_IDX
                MPM[1] = L
                MPM[2] = ((L + offset) % mod) + 2
                MPM[3] = ((L – 1) % mod) + 2
                MPM[4] = ((L + offset – 1) % mod) + 2
                MPM[5] = (L % mod) + 2
```

-continued

```
    }
    else
    {
        MPM[0] = L
        MPM[1] = ((L + offset) % mod) + 2
        MPM[2] = ((L – 1) % mod) + 2
        MPM[3] = PLANAR_IDX
        MPM[4] = ((L + offset – 1) % mod) + 2
        MPM[5] = (L % mod) + 2
    }
}
else
{
    use initialized values
}
}
else
{
    if ((L > DC_IDX) && (A > DC_IDX))
    {
        if (multiRefIdx > 0 || !isSignaling0)
        {
            MPM[0] = PLANAR_IDX
            MPM[1] = L
            MPM[2] = A
        }
        else
        {
            MPM[0] = L
            MPM[1] = A
            MPM[2] = PLANAR_IDX
        }
        MPM[3] =        ((min(L, A) + offset) % mod) + 2 if (*)
                        ((min(L, A) – 1) % mod) + 2 if (**)
                        ((min(L, A) – 1) % mod) + 2 if (***)
                        ((min(L, A) + offset) % mod) + 2 if (****)
        MPM[4] =        ((max(L, A) – 1) % mod) + 2 if (*)
                        ((max(L, A) + offset) % mod) + 2 if (**)
                        ((min(L, A) + offset) % mod) + 2 if (***)
                        ((min(L, A) – 1) % mod) + 22 if (****)
        MPM[5] =        ((min(L, A) + offset – 1) % mod) + 2 if (*)
                          (min(L, A) % mod) + 2 if (**)
                        ((max(L, A) – 1) % mod) + 2 if (***)
                        ((max(L, A) + offset) % mod) + 2 if (****)
    }
    else if (L + A >= 2)
    {
        if (multiRefIdx > 0 || !isSignaling0)
        {
            MPM[0] = PLANAR_IDX
            MPM[1] = max(L, A)
            MPM[2] = ((max(L, A) + offset) % mod) + 2
            MPM[3] = ((max(L,A) – 1) % mod) + 2
            MPM[4] = ((max(L, A) + offset – 1) % mod) + 2
            MPM[5] = (max(L, A) % mod) + 2
        }
        else
        {
            MPM[0] = max(L, A)
            MPM[1] = ((max(L, A) + offset) % mod) + 2
            MPM[2] = ((max(L,A) – 1) % mod) + 2
            MPM[3] = PLANAR_IDX
            MPM[4] = ((max(L, A) + offset – 1) % mod) + 2
            MPM[5] = (max(L, A) % mod) + 2
        }
    }
    else
    {
        use initialized values
    }
}
}
with
(*) max(L, A) – min(L, A) == 1
(**) max(L, A) – min(L, A) >= 62
(***) max(L, A) – min(L, A) == 2
(****) all other cases
```

In the example above, the neural-based intra prediction mode may include a neural network that can predict a current luminance CB. For example, the intra prediction mode signaling denoted $S_0$, which includes the flag nnFlag characteristic of the neural network intra prediction mode, may be used and isSignaling0 may be indicated as true. Otherwise, the intra prediction mode signaling denoted S1, which does not include the flag nnFlag, may be used and isSignaling0 may be indicated as false.

In the example above, for the current luminance CB, the derivation of the list of MPMs may not (e.g., no longer) take into account correlations in the selected prediction mode index from one luminance CB to a subsequent luminance CB (e.g., a next luminance CB), for example, if neighboring luminance CBs (e.g., two neighboring CBs) are predicted via the neural network-based intra prediction mode.

Neural network-based intra prediction mode in chrominance may be signaled. In examples, a neural network-based intra prediction mode may be built to apply to a luminance block exclusively if adding neural network-based intra prediction modes to block-based video codecs.

A neural network-based mode for a luminance block and a chrominance block (e.g., both a luminance block and a chrominance block) may be provided. Intra prediction signaling associated with the neural network mode for the luminance block and the chrominance block (e.g., both a luminance block and the chrominance block) may be provided. Intra prediction signaling of the current chrominance CB may be used to describe chrominance CBs (e.g., two chrominance CBs) of the current CU, for example, that share the same intra prediction signaling.

Unified signaling of a neural network-based mode in luminance and chrominance may be provided. In examples, an intra prediction signaling may comprise setting a neural network flag at a CU level if a neural network-based intra prediction mode (e.g., an additional neural network-based intra prediction mode) applies to both a luminance block and a chrominance block. For a current CU, transform units (TUs) (e.g., the luminance and chrominance TBs) in the current CU may select the neural network-based intra prediction mode, for example, if the flag is equal to 1. For a CU in a separate tree between luminance and chrominance, local partitioning in luminance may be different from local partitioning in chrominance.

Signaling of a neural network-based mode in chrominance via a direct mode (DM) may be provided. For a current chrominance CB, a prediction via a neural network-based intra prediction mode may be allowed via the DM (e.g., via the DM exclusively). The DM may become the neural network-based intra prediction mode, e.g., which is a candidate of a rate-distortion search in chrominance on an encoder side, for example, if a luminance CB that is collocated with a current chrominance CB is predicted via the neural network-based intra prediction mode.

Figure 5:
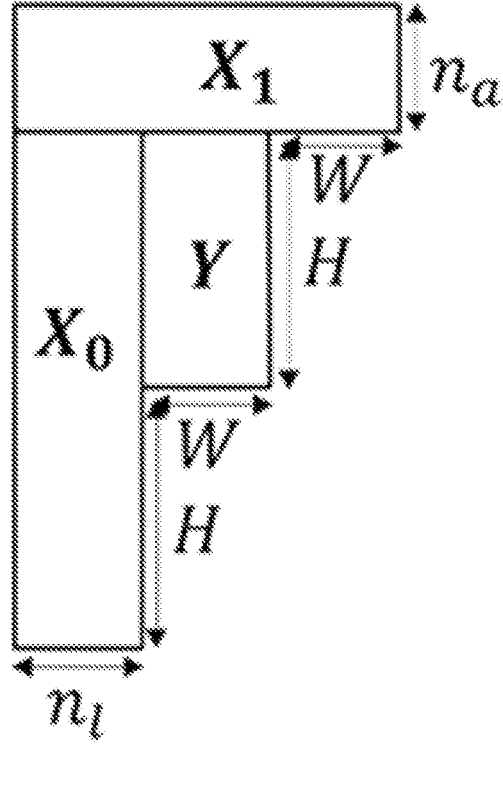
FIG. 5 shows an example of context surrounding a rectangular block to be predicted.

FIG. 5 is a diagram showing an example of context surrounding a rectangular block to be predicted. In examples, a neural network $f_{H,W}(\cdot; \theta_{H,W})$ parameterized by $\theta_{H,W}$ in the neural network-based intra prediction mode may take (e.g., obtain) the context X of decoded pixels (e.g., reconstructed pixels for the decoder-side and already encoded pixels for the encoded-side, both of which neighbor the current CB Y) around a W×H block Y to return a prediction of Y.

Figure 6:
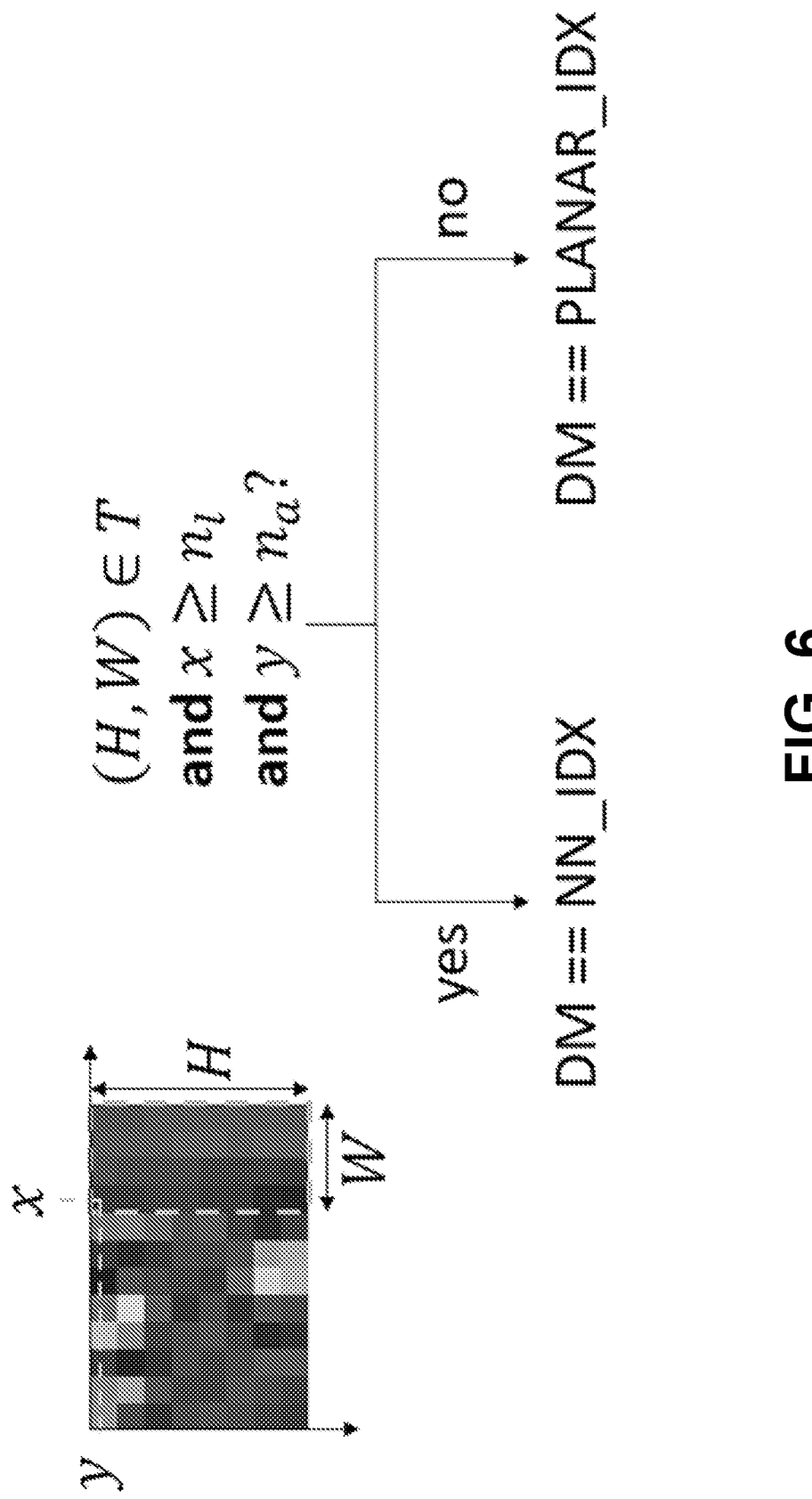
FIG. 6 shows an example of signaling of a neural network-based intra prediction mode for a current W×H chrominance Coding Block (CB).

FIG. 6 is a diagram showing an example of signaling of a neural network-based intra prediction mode for a current W×H chrominance CB. The top left-pixel of the CB may be located at (x,y) in a current frame. NN_IDX may be an index of a neural network-based intra prediction mode (e.g., 72). The luminance CB collocated with the current W×H chrominance CB may be predicted by the neural network-based intra prediction mode. T may denote a set of pairs of a block height and width, for example, where for each height H and width W, the neural network-based intra prediction mode may include a neural network able to predict blocks of size W×H. For example, for a given W×H chrominance CB whose top left-pixel is located at (x,y) in the current frame, DM may become an index of the neural-network intra prediction mode, for example, if the luminance CB collocated with the chrominance CB is predicted by the neural network-based intra prediction mode and $(H,W) \in T$ and $x \geq n_l$ and $y \geq n_a$. In examples, DM may be set to PLANAR.

An index of a regular intra prediction (e.g., non-neural network intra prediction mode) that represents (e.g., best represents) the neural network prediction of the current block may be determined.

Figure 7:
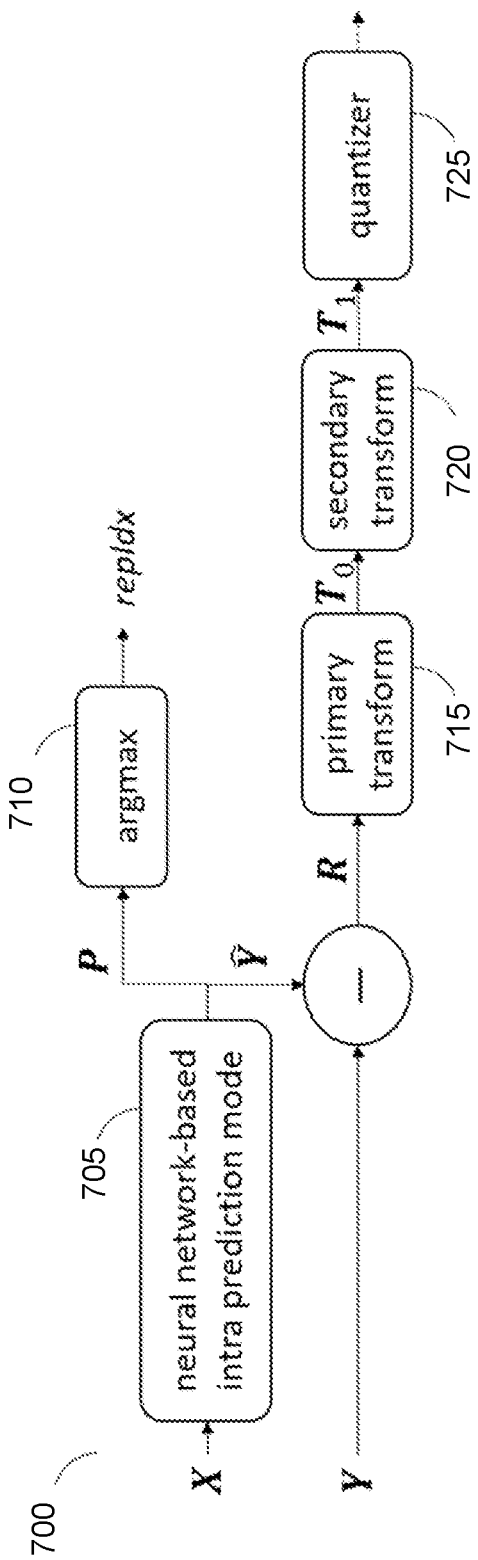
FIG. 7 shows an example inferring the index of the regular intra prediction mode that best represents the neural network prediction of the current block on an encoder side.

FIG. 7 shows an example inferring the index of the regular intra prediction mode (e.g., non-neural network-based intra prediction mode) that best represents the neural network prediction (e.g., the generated neural network-based predictor) of the current block on an encoder side 700. The neural network-based intra prediction mode may take (e.g., obtain) context X neighboring a current block Y (e.g., context X may be pixels that neighbor block Y and have already been encoded) to provide a prediction (e.g., to generate a neural network-based predictor by testing potential neural-based prediction modes on the neighboring pixels of context X) $\hat{Y}$ of Y and a vector P whose coefficient of index i may correspond to a probability that a regular intra prediction (e.g., non-neural network-based intra prediction mode) of index i that corresponds to (e.g., best represents) the neural network prediction (e.g., the generated neural network-based predictor) $\hat{Y}$ on an encoder side. For example, the regular intra prediction (e.g., non-neural network-based intra prediction mode) that best represents the neural network prediction may be the regular intra prediction (e.g., non-neural network-based intra prediction mode) that, when used, results in the generated neural network-based predictor being encoded.

In examples, a block-based video codec may include $m \in \mathbb{N}^*$ regular intra prediction modes (e.g., non-neural network-based intra prediction modes). For a given block, the neural network-based intra prediction mode may return (e.g., calculate) (e.g., amongst one or more other outputs) a vector $P \in [0, 1]^m$ whose coefficient of index i may correspond to a probability that a regular intra prediction mode (e.g., non-neural network-based intra prediction mode) of index i represents (e.g., best represents) the neural network prediction of the block. In examples, multiple probabilities (e.g., representation probabilities) associated with respective non-neural network-based intra prediction modes (e.g., non-neural network-based intra prediction modes) may be obtained (e.g., calculated) based on the block context (e.g., by applying the non-neural network-based intra prediction modes on the neighboring pixels to see which mode is most representative of the generated neural network-based predictor) and the neural network-based prediction mode. From P, the index $repIdx \in [|0, m-1|]$ of the regular intra prediction mode (e.g., non-neural network-based intra prediction mode) that corresponds to (e.g., best represents) the neural network prediction (e.g., the generated neural network-based predictor) of the block may be selected (e.g., selected from respective non-neural network-based intra prediction modes). In examples, the probabilities for a subset of the regular intra prediction modes (e.g., non-neural network-based intra prediction mode) may be computed and the non-neural network-based intra prediction mode may be selected from the subset. In examples, when the block is involved in a dependency between neighboring blocks predicted in intra, repIdx may be used as substitute.

Methods, systems, and instrumentalities described herein may be implemented on an encoding device, as such the encoder 200 described with respect to FIG. 2. In examples, based on the neural network-based intra prediction mode 705 and the context X of the current block Y, a prediction $\hat{Y}$ of Y and/or a vector $P \in [0, 1]^m$ whose coefficient of index i may be a probability that repIdx=i may be computed. For example, repIdx may equal argmax(P) 710 (e.g., which may be used to find the non-neural network-based intra prediction mode most representative of the generated neural network-based predictor). The residue $R=Y-\hat{Y}$ may be fed into a primary transform 715. In examples, the resulting primary transform coefficients $T_0$ may be turned into secondary transform coefficients $T_1$, for example, via a secondary transform 720. $T_1$ may be fed into a quantizer 725.

Figure 8:
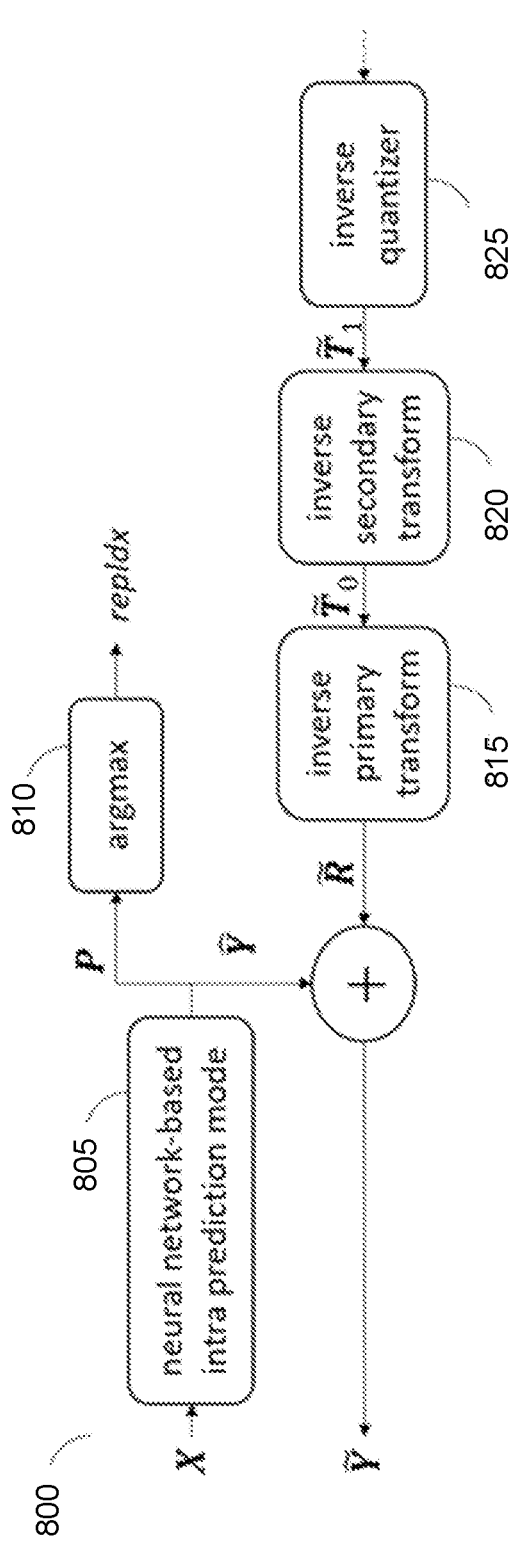
FIG. 8 shows an example inferring the index of the regular intra prediction mode that best represents the neural network prediction of the current block on a decoder side.

FIG. 8 shows an example inferring the index of the regular intra prediction mode (e.g., non-neural network-based intra prediction mode) that best represents the neural network prediction (e.g., the generated neural network-based predictor) of the current block on a decoder side 800. The neural network-based intra prediction mode may take (e.g., obtain) context X neighboring a current Y (e.g., context X may be pixels that neighbor block Y and have already been reconstructed) to provide a prediction (e.g., to generate a neural network-based predictor by testing potential neural-based prediction modes on the neighboring pixels of context X) $\hat{Y}$ of Y and a vector P whose coefficient of index i may correspond to a probability that a regular intra prediction (e.g., non-neural network-based intra prediction mode) of index i represents (e.g., best represents) the neural network prediction (e.g., the generated neural network-based predictor) $\hat{Y}$ on a decoder side. For example, the regular intra prediction (e.g., non-neural network intra prediction mode) that best represents the neural network prediction may be the regular intra prediction (e.g., non-neural network intra prediction mode) that, when used, results in the generated neural network-based predictor being reconstructed.

Methods, systems, and instrumentalities described herein may be implemented on a decoding device such as the decoder 300 described with respect to FIG. 3. As shown in FIG. 8, a prediction $\hat{Y}$ of Y and/or P may be computed from a context X of Y via the neural network-based intra prediction mode 805. For example, repIdx may equal argmax(P) 810 (e.g., which may be used to find the non-neural network intra prediction mode most representative of the generated neural network-based predictor). In examples, an inverse quantizer 825 may provide a block of reconstructed secondary transform coefficients $\tilde{T}_1$. $\tilde{T}_1$ may be turned into reconstructed primary transform coefficients $\tilde{T}_0$, for example, via an inverse secondary transform 820. The inverse primary transform 815 may compute reconstructed residue $\tilde{R}$ from $\tilde{T}_0$. Then, $\hat{Y}=\tilde{R}+\hat{Y}$.

As shown in FIGS. 7 and 8, for a block in the example block-based video codec, a primary transform and a secondary transform may apply. In examples, a combination of transforms (e.g., primary, secondary, and ternary transforms) may apply.

A regular intra prediction mode index in a subset of the set of regular mode indices may be inferred. In examples, the inferred regular intra prediction mode index may belong to a subset of a set of regular intra prediction mode indices in the example block-based video codec. It may be provided that $S\subset[|0, m-1|]$, for example, such that card(S)=I. For example, $P\in[0, 1]^I$ and repIdx∈S in FIGS. 7 and 8.

In examples, S=[|0, 66|] may denote a set of indices of the 65 directional intra prediction modes, PLANAR and DC. In examples, I may be equal to 67. For example, the set of the intra prediction mode indices (e.g., the intra prediction mode indices in the example codec) excluding S may equal a set of MIP mode indices.

An MPM for a neighboring block may be derived based on the non-neural network-based intra prediction mode index inferred for the current block (e.g., that is predicted encoded/decoded using a neural network-based prediction). For example, an index associated with the non-neural network-based intra prediction mode that corresponds to (e.g., best represents) the generated neural network-based predictor may be obtained. The index may be added to an MPM list of the neighboring block. For a current luminance CB, a computation of an index A of an intra prediction mode selected to predict a luminance CB located above the current luminance CB and a computation of an index L of an intra prediction mode selected to predict a luminance CB located on a left side of a current luminance CB may be shown in the following example.

In examples, repIdx$^{above}$∈[|0, 66|] may denote an index of the regular intra prediction mode a neural network-based intra prediction mode infers, for example, if the neural network-based intra prediction mode predicts the luminance CB above the current luminance CB.

In a video codec having neural network-based intra prediction mode(s), for the current luminance CB, an adaptation of the derivation of the list of MPMs (e.g., the list of MPMs described herein) may apply. For example, the comparisons between A and NN_IDX and the comparisons between L and NN_IDX (e.g., both of which are shown in FIG. 3) may be bypassed.

Semantics of the Example that Follows May Include:

L may indicate an index of the intra prediction mode of the left luminance CB, which may belong to [[0, 66]] (e.g., as shown in FIG. 8);

A may indicate an index of the intra prediction mode of the above luminance CB, which may belong to [[0, 66]] (e.g., as shown in FIG. 8);

offset may indicate a numeric value of 61;

mod may indicate a numeric value of 64;

NN_IDX may indicate an index of the neural network-based intra prediction mode (e.g., 72); and

```
A = PLANAR_IDX
L = PLANAR_IDX
if (puLeft && CU::isIntra(*puleft->cu))
{
    L = PU::getIntraDirLuma(*puLeft)
    if (L == NN_IDX)
    {
        L = repIdx^left
    }
}
if (puAbove && CU::isIntra(*puAbove->cu) && CU::isSameCtu(*pu.cu, *puAbove->cu))
{
    A = PU::getIntraDirLuma(*puAbove)
    if (A == NN_IDX)
    {
        A = repIdx^above
    }
}
```

As shown in the example above, computation of an index A of an intra prediction mode selected to predict a luminance CB located above a current luminance CB and computation of an index L of an intra prediction mode selected to predict a luminance CB located on the left side of the current luminance CB may be performed. In examples, A and L may be used to derive a list of MPMs for the current luminance CB, for example, after the computations (e.g., two computations). 'puLeft' may be a pointer to the left PU. 'puLeft' at NULL may indicate that there is no PU (e.g., no CU) on the left side of the current luminance CB. 'puAbove' may a pointer to the above PU. 'puAbove' at NULL may indicate that there is no PU (e.g., no CU) above the current luminance CB. NN_IDX may denote an index of a neural network-based intra prediction mode. 'PU::getIntraDirLuma' may return an index of an intra prediction mode selected to predict a luminance CB of a CU of the argument PU. 'PU::getIntraDirLuma' may replace an MIP mode index with PLANAR_IDX, for example, if an MIP mode is used to predict the luminance CB of the CU of the argument PU. In examples, repIdx$^{left}$∈[|0, 66|] may denote an index of the regular intra prediction mode that a neural network-based intra prediction mode infers, for example, if the neural network-based intra prediction mode is used to predict the luminance CB on the left side of the current luminance CB.

multiRefIdx may be the Multiple Reference Lines (MRL) index, which may belong to {0, 1, 2}.

Initialization of the MPM list may be provided, for example:

```
MPM[0] = PLANAR_IDX
MPM[1] = DC_IDX
MPM[2] = VER_IDX
MPM[3] = HOR_IDX
MPM[4] = VER_IDX - 4
MPM[5] = VER_IDX + 4
if (L == A)
{
    if (L > DC_IDX)
    {
        if ((multiRefIdx > 0) || !isSignaling0)
        {
            MPM[0] = PLANAR_IDX
            MPM[1] = L
            MPM[2] = ((L + offset) % mod) + 2
            MPM[3] = ((L - 1) % mod) + 2
            MPM[4] = ((L + offset - 1) % mod) + 2
            MPM[5] = (L % mod) + 2
        }
        else
        {
            MPM[0] = L
            MPM[1] = ((L + offset) % mod) + 2
```

-continued

```
        MPM[2] = ((L − 1) % mod) + 2
        MPM[3] = PLANAR_IDX
        MPM[4] = ((L + offset − 1) % mod) + 2
        MPM[5] = (L % mod) + 2
    }
}
else
{
    use initialized values
}
}
else
{
    if ((L > DC_IDX) && (A > DC_IDX))
    {
        if (multiRefIdx > 0 || !isSignaling0)
        {
            MPM[0] = PLANAR_IDX
            MPM[1] = L
            MPM[2] = A
        }
        else
        {
            MPM[0] = L
            MPM[1] = A
            MPM[2] = PLANAR_IDX
        }
        MPM[3] =        ((min(L, A) + offset) % mod) + 2 if (*)
                        ((min(L, A) − 1) % mod) + 2 if (**)
                        ((min(L, A) − 1) % mod) + 2 if (***)
                        ((min(L, A) + offset) % mod) + 2 if (****)
        MPM[4] =        ((max(L, A) − 1) % mod) + 2 if (*)
                        ((max(L, A) + offset) % mod) + 2 if (**)
                        ((min(L, A) + offset) % mod) + 2 if (***)
                        ((min(L, A) − 1) % mod) + 22 if (****)
        MPM[5] =        ((min(L, A) + offset − 1) % mod) + 2 if (*)
                        (min(L, A) % mod) + 2 if (**)
                        ((max(L, A) − 1) % mod) + 2 if (***)
                        ((max(L, A) + offset) % mod) + 2 if (****)
    }
    else if (L + A >= 2)
    {
        if (multiRefIdx > 0 || !isSignaling0)
        {
            MPM[0] = PLANAR_IDX
            MPM[1] = max(L, A)
            MPM[2] = ((max(L, A) + offset) % mod) + 2
            MPM[3] = ((max(L,A) − 1) % mod) + 2
            MPM[4] = ((max(L, A) + offset − 1) % mod) + 2
            MPM[5] = (max(L, A) % mod) + 2
        }
        else
        {
            MPM[0] = max(L, A)
            MPM[1] = ((max(L, A) + offset) % mod) + 2
            MPM[2] = ((max(L,A) − 1) % mod) + 2
            MPM[3] = PLANAR_IDX
            MPM[4] = ((max(L, A) + offset − 1) % mod) + 2
            MPM[5] = (max(L, A) % mod) + 2
        }
    }
    else
    {
        use initialized values
    }
}
with
(*) max(L, A) − min(L, A) == 1
(**) max(L, A) − min(L, A) >= 62
(***) max(L, A) − min(L, A) == 2
(****) all other cases
```

As shown in the example above, the list of MPMs may be derived, for example, if an index L of the intra prediction mode selected to predict the left luminance CB and an index A of the intra prediction mode selected to predict the above luminance CB arise from one or more examples described herein. In examples, the neural network-based intra prediction mode may include a neural network that may be used to predict the current luminance CB. For example, an indication may indicate the existence of a neural network in the neural network-based intra prediction mode that may be used to predict a current luminance CB, if the neural-based intra prediction mode includes a neural network that can predict a current luminance CB. The intra prediction mode signaling denoted $S_0$, e.g., which may include the flag nnFlag characteristic of the neural network-based intra prediction mode, may be used. For example, if the neural-based intra prediction mode includes a neural network that can predict a current luminance CB, the intra prediction mode signaling denoted $S_0$, which includes the flag nnFlag characteristic of the neural network intra prediction mode, may be used and is Signaling0 may be indicated as true. Otherwise, the intra prediction mode signaling denoted $S_1$, which does not include the flag nnFlag, may be used and is Signaling0 may be indicated as false.

Figure 9:
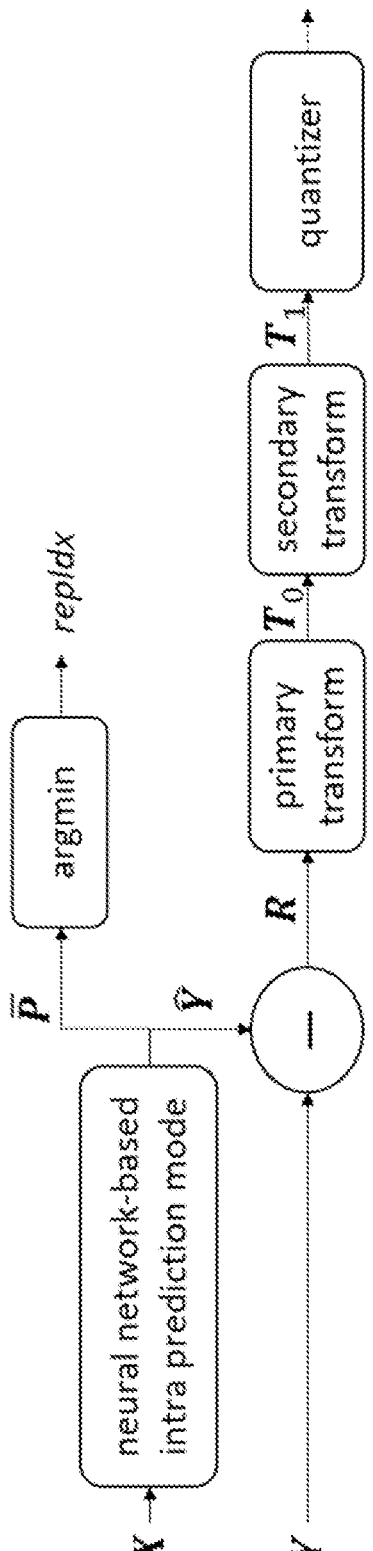
FIG. 9 shows an example inferring the index of the regular intra prediction mode that best represents the neural network prediction of the current block on an encoder side.
Figure 10:
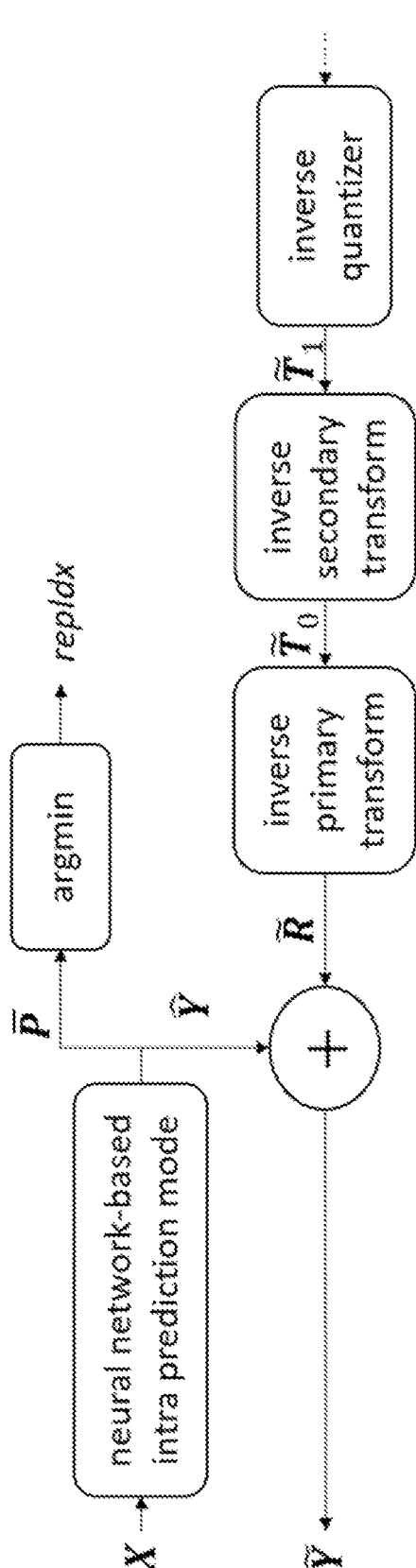
FIG. 10 shows an example inferring the index of the regular intra prediction mode that best represents the neural network prediction of the current block on a decoder side.

Different output vector(s) from which an index of a regular intra prediction mode (e.g., non-neural network-based intra prediction mode) that represents (e.g., best represents) the neural network prediction may be computed. In examples, an output of the neural network-based intra prediction mode may change. In examples, for a given block, the neural network-based intra prediction mode may be used to compute, based on the context surrounding the block, at least one vector whose coefficient of index i is the probability that repIdx=i. In examples, the neural network-based intra prediction mode may return a scalar, vector, and/or tensor from which repIdx may be computed. For example, an argmax (e.g., each argmax) may be replaced by argmin (e.g., as shown in FIGS. 9 and 10) if the neural network-based intra prediction mode returns the vector $\overline{P} \in ( \mathbb{R}_{+*})^m$ whose coefficient of index i is the opposite log-probability that repIdx=i (e.g., instead of P). In examples, for a given block, the neural network-based intra prediction mode may be used to compute, based on the context surrounding the block, one or more decimal scalars, which (e.g., after being rounded to the nearest integer) may yield the index of a regular intra prediction mode (e.g., non-neural network-based intra prediction mode) that represents (e.g., best represents) the neural network prediction of this block.

FIG. 9 shows an example inferring the index of the regular intra prediction mode (e.g., non-neural network-based intra prediction mode) that best represents the neural network prediction (e.g., generated neural network-based predictor) of the current block on an encoder side. The neural-network based intra prediction mode may take (e.g., obtain) the context X neighboring the current block Y (e.g., context X may be pixels that neighbor block Y and have already been encoded) to provide a prediction (e.g., to generate a neural network-based predictor by testing potential neural-based prediction modes on the neighboring pixels of context X) $\hat{Y}$ of Y. The neural-network based intra prediction mode may take (e.g., obtain) the context X neighboring the current block Y (e.g., context X may be pixels that neighbor block Y and have already been encoded) to provide a vector $\overline{P}$ whose coefficient of index i corresponds to the opposite log-probability that the regular intra prediction (e.g., non-neural network-based intra prediction mode) of index i represents (e.g., best represents) the neural network prediction (e.g., the generated neural network-based predictor) $\hat{Y}$ on the encoder side.

FIG. 10 shows an example inferring the index of the regular intra prediction mode (e.g., non-neural network-based intra prediction mode) that corresponds the neural network prediction (e.g., the generated neural network-based predictor) of the current block on a decoder side. The neural network-based intra prediction mode may take the context X neighboring the current block Y (e.g., context X may be pixels that neighbor block Y and have already been reconstructed) to provide a prediction (e.g., to generate a neural network-based predictor by testing potential neural-based prediction modes on the neighboring pixels of context X) $\hat{Y}$ of Y. The neural network-based intra prediction mode may take the context X neighboring the current block Y (e.g., context X may be pixels that neighbor block Y and have already been reconstructed) to provide a vector $\overline{P}$ whose coefficient of index i corresponds to the opposite log-probability that the regular intra prediction (e.g., non-neural network-based intra prediction mode) of index i represents (e.g., best represents) the neural network prediction (e.g., the generated neural network-based predictor) $\hat{Y}$ on the decoder side.

Neural network-based intra prediction mode may be used to infer the indices of multiple regular intra prediction modes that may represent (e.g., best represent) the prediction returned by the neural network-based intra prediction mode.

Figure 11:
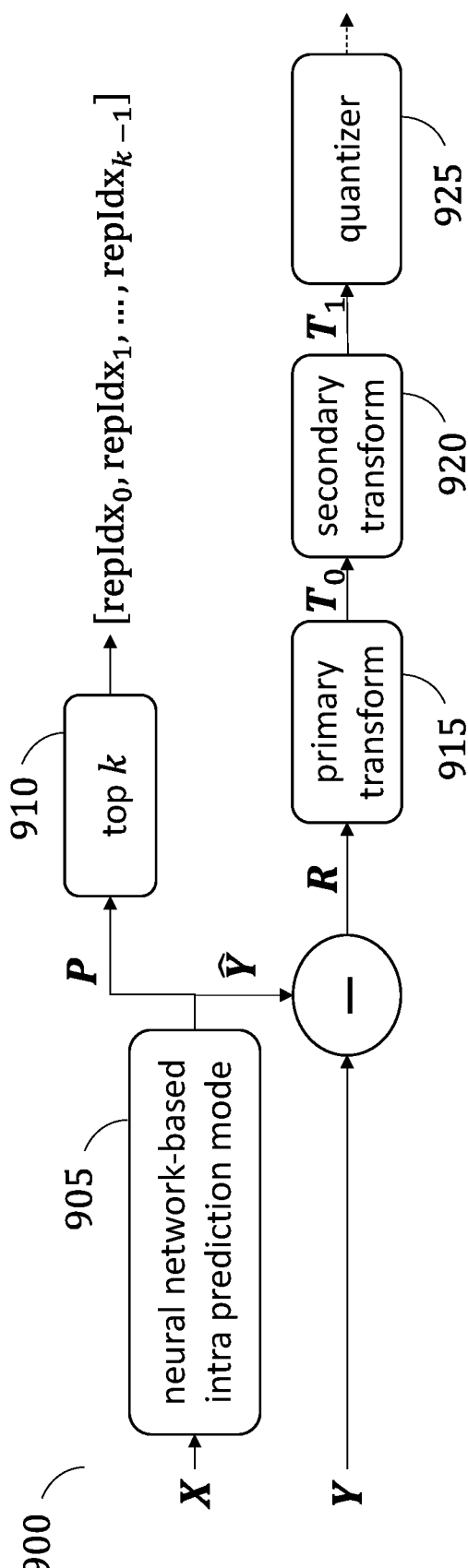
FIG. 11 shows an example inferring the indices of the k regular intra prediction modes that best represent the neural network prediction of the current block on an encoder side.

FIG. 11 shows an example inferring the indices of the k regular intra prediction modes (e.g., k non-neural network-based intra prediction modes) that best represent the neural network prediction (e.g., generated neural network-based predictor) of the current block on an encoder side 900. The inferred regular intra prediction modes may be added to the MPM list of a neighboring block.

The neural network-based intra prediction mode may take (e.g., obtain) context X neighboring a current block Y (e.g., context X may be pixels that neighbor block Y and have already been encoded) to provide a prediction (e.g., to generate a neural network-based predictor by testing potential neural-based prediction modes on the neighboring pixels of context X) $\hat{Y}$ of Y. In examples, a vector P whose coefficient of index i may correspond to a probability that a regular intra prediction mode (e.g., non-neural network intra prediction mode) of index i represents (e.g., best represents) the neural network prediction (e.g., the generated neural network-based predictor) $\hat{Y}$ on an encoder side.

Methods, systems, and instrumentalities described herein may be implemented on an encoding device, for example the encoder described with respect to FIG. 2. In examples, based on the neural network-based intra prediction mode 905 and the context X of the current block Y, a prediction $\hat{Y}$ of Y and/or a vector $P \in [0, 1]^m$ may be computed. The "top k" component 910 may return the indices of the k largest coefficients in P. Variable repIdx$_i$ may be the index of the $(i+1)^{th}$ largest coefficient in P. The residue $R = Y - \hat{Y}$ may be fed into a primary transform 915. In examples, the resulting primary transform coefficients $T_0$ may be turned into secondary transform coefficients $T_1$, for example, via a secondary transform 920. $T_1$ may be fed into a quantizer 925.

Figure 12:
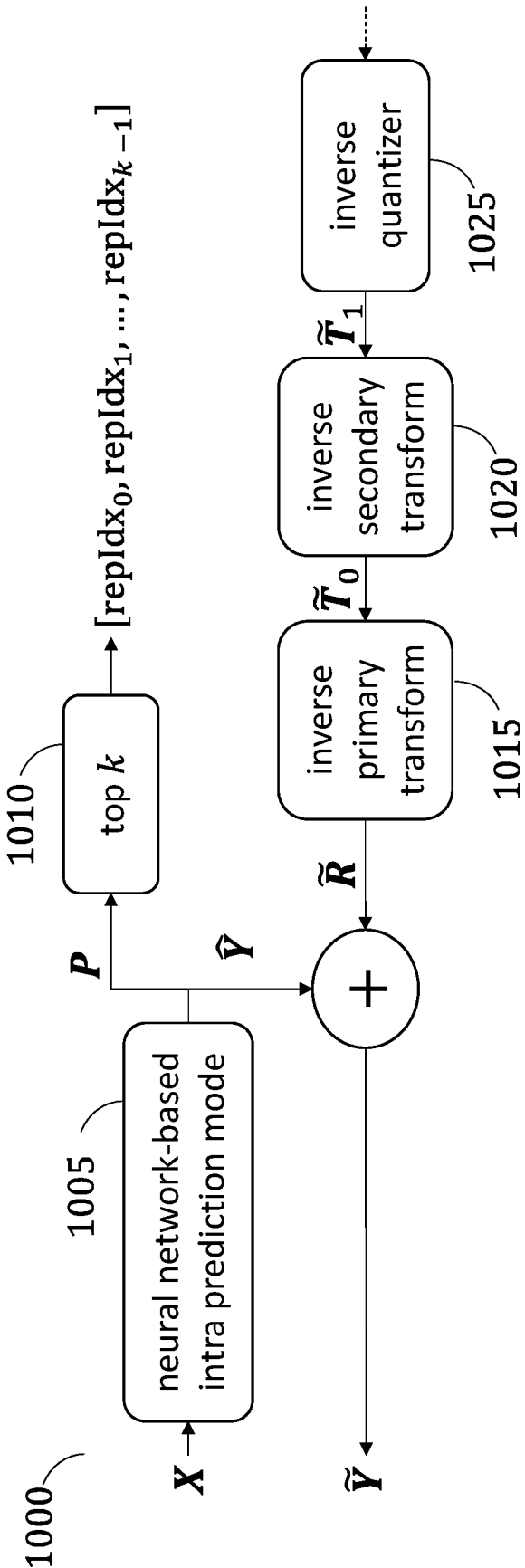
FIG. 12 shows an example inferring the indices of the k regular intra prediction modes that best represent the neural network prediction of the current block on a decoder side.

FIG. 12 shows an example the indices of the k regular intra prediction modes (e.g., non-neural network intra prediction mode) that best represent the neural network prediction (e.g., the generated neural network-based predictor) of the current block on a decoder side 1000.

The neural network-based intra prediction mode may take (e.g., obtain) context X neighboring a current block Y (e.g., context X may be pixels that neighbor block Y and have already been reconstructed) to provide a prediction (e.g., to generate a neural network-based predictor by testing potential neural-based prediction modes on the neighboring pixels of context X) $\hat{Y}$ of Y and a vector P whose coefficient of index i may correspond to the probability that the respective regular intra prediction mode (e.g., non-neural network intra prediction mode) of index i represents (e.g., best represents)

the neural network prediction (e.g., the generated neural network-based predictor) $\hat{Y}$ on a decoder side.

Methods, systems, and instrumentalities described herein may be implemented on a decoding device for example, the decoder described with respect to FIG. 3. As shown in FIG. 10, a prediction $\hat{Y}$ of Y and/or P may be computed from a context X of Y, for example, based on the neural network-based intra prediction mode 1005. The "top k" component 1010 may return the indices of the k largest coefficients in P. Variable repIdx$_i$ may indicate the index of the $(i+1)^{th}$ largest coefficient in P. In examples, an inverse quantizer 1025 may provide a block of reconstructed secondary transform coefficients $\tilde{T}_1$. Reconstructed primary transform coefficients $\tilde{T}_0$, may be computed based on $\tilde{T}_1$, for example, via an inverse secondary transform 1020. The inverse primary transform 1015 may be used to compute reconstructed residue $\tilde{R}$ from $\tilde{T}_0$. Then, $\tilde{Y} = \hat{Y} + \tilde{R}$.

For a current luminance CB, a list of MPMs may be derived. For example, if k=2 and the neural network-based intra prediction mode is selected to predict the luminance CB located on the left side of the current luminance CB and the luminance CB located above the current luminance CB, the indices of the two regular intra prediction modes may be inferred during the prediction of the luminance CB located on the left side of the current luminance CB, and the indices of the two regular intra prediction modes may be inferred during the prediction of the luminance CB located above the current luminance CB.

Semantics of this Example May Include

L may indicate the index of the intra prediction mode selected to predict the left luminance CB, for example, which may belong to $[0, 66] \cup \{NN\_IDX\}$;

A may indicate the index of the intra prediction mode selected to predict the above luminance CB, for example, which may belong to $[0, 66] \cup \{NN\_IDX\}$;

offset may indicate a numeric value of 61;

mod may indicate a numeric value of 64;

NN_IDX may indicate the index of the neural network-based intra prediction mode (e.g., 72);

multiRefIdx may be the Multiple Reference Lines (MRL) index, for example, which may belong to $\{0, 1, 2\}$;

'ptrIndicesRepNNLeft' may be a pointer to the buffer comprising the two indices of the regular intra prediction modes the neural network-based intra prediction mode inferred during the prediction of the luminance CB located on the left side of the current luminance CB. In examples, if an intra prediction mode different from the neural network-based intra prediction mode is selected to predict the luminance CB located on the left side of the current luminance CB, 'ptrIndicesRepNNLeft' may be NULL.

'ptrIndicesRepNNAbove' may be a pointer to the buffer comprising the two indices of the regular intra prediction modes the neural network-based intra prediction mode inferred during the prediction of the luminance CB located above the current luminance CB. In examples, if an intra prediction mode different from the neural network-based intra prediction mode is selected to predict the luminance CB located above the current luminance CB, 'ptrIndicesRepNNAbove' may be NULL.

A Computation of a and L May be

```
A = PLANAR_IDX
L = PLANAR_IDX
if (puLeft && CU::isIntra(*puLeft->cu))
{
   L = PU::getIntraDirLuma(*puLeft)
}
if (puAbove && CU::isIntra(*puAbove->cu) && CU::isSameCtu(*pu.cu, *puAbove->cu))
{
   A = PU::getIntraDirLuma(*puAbove)
}
```

'puLeft' may be a pointer to the left PU. In examples, 'puLeft' at NULL may indicate that there is no PU (e.g., no CU) on the left side of the current luminance CB. 'puAbove' may be a pointer to the above PU. In examples, 'puAbove' at NULL may indicate that there is no PU (e.g., no CU) above the current luminance CB. 'PU::getIntraDirLuma' may return an index of an intra prediction mode selected to predict a luminance CB of a CU of the argument PU. 'PU::getIntraDirLuma' may replace an MIP mode index with PLANAR_IDX, for example, if an MIP mode is used to predict the luminance CB of the CU of the argument PU. For a current luminance CB, the list of MPMs may be derived as

```
    MPM[0] = PLANAR_IDX
    MPM[1] = DC_IDX
    MPM[2] = VER_IDX
    MPM[3] = HOR_IDX
    MPM[4] = VER_IDX − 4
    MPM[5] = VER_IDX + 4
    fillListMPMsWithoutInitialization(MPM,
                 L,
                 A,
                 multiRefIdx,
                 isSignaling0,
                 ptrIndicesRepNNLeft,
                 ptrIndicesRepNNAbove)
    where
    void fillListMPMsWithoutInitialization(unsigned* const MPM,
                     const int& L,
                     const int& A,
                     const int& multiRefIdx,
                     const bool& isSignaling0,
                     const unsigned* const ptrIndicesRepNNLeft,
                     const unsigned* const preIndicesRepNNAbove)
    {
       if (L == A)
       {
          if ((L > DC_IDX) && (L != NN_IDX))
          {
             if ((multiRefIdx > 0) || !isSignaling0)
             {
                MPM[0] = PLANAR_IDX
                MPM[1] = L
                MPM[2] = ((L + offset) % mod) + 2
                MPM[3] = ((L − 1) % mod) + 2
                MPM[4] = ((L + offset − 1) % mod) + 2
                MPM[5] = (L % mod) + 2
             }
             else
             {
                MPM[0] = L
                MPM[1] = ((L + offset) % mod) + 2
                MPM[2] = ((L − 1) % mod) + 2
                MPM[3] = PLANAR_IDX
                MPM[4] = ((L + offset − 1) % mod) + 2
                MPM[5] = (L % mod) + 2
             }
          {
          else if (L == NN_IDX)
          {
             fillListMPMsNNLeftAbove(MPM,
```

-continued

```
                                multiRefIdx,
                                isSignaling0,
                                ptrIndicesRepNNLeft,
                                ptrIndicesRepNNAbove)
            }
            else
            {
                use initialized values
            }
        {
        else
        {
            if ((L == NN_IDX) || (A == NN_IDX))
            {
                if (L == NN_IDX)
                {
                    fillListMPMsWithoutInitialization(MPM,
                                ptrIndicesRepNNLeft[0],
                                A,
                                multiRefIdx,
                                isSignaling0,
                                NULL,
                                NULL)
                }
                else
                {
                    fillListMPMsWithoutInitialization(MPM,
                                L,
                                ptrIndicesRepNNAbove[0],
                                multiRefIdx,
                                isSignaling0,
                                NULL,
                                NULL)
                }
            }
            else
            {
                if ((L > DC_IDX) && (A > DC_IDX))
                {
                    if (multiRefIdx > 0 || !isSignaling0)
                    {
                        MPM[0] = PLANAR_IDX
                        MPM[1] = L
                        MPM[2] = A
                    }
                    else
                    {
                        MPM[0] = L
                        MPM[1] = A
                        MPM[2] = PLANAR_IDX
                    }
                        MPM[3] =        ((min(L, A) + offset) % mod) + 2 if (*)
                                        ((min(L, A) − 1) % mod) + 2 if (**)
                                        ((min(L, A) − 1) % mod) + 2 if (***)
                                        ((min(L, A) + offset) % mod) + 2 if (****)
                        MPM[4] =        ((max(L, A) − 1) % mod) + 2 if (*)
                                        ((max(L, A) + offset) % mod) + 2 if (**)
                                        ((min(L, A) + offset) % mod) + 2 if (***)
                                        ((min(L, A) − 1) % mod) + 22 if (****)
                        MPM[5] =        ((min(L, A) + offset − 1) % mod) + 2 if (*)
                                        (min(L, A) % mod) + 2 if (**)
                                        ((max(L, A) − 1) % mod) + 2 if (***)
                                        ((max(L, A) + offset) % mod) + 2 if (****)
                }
                else if (L + A >= 2)
                {
                    if (multiRefIdx > 0 || !isSignaling0)
                    {
                        MPM[0] = PLANAR_IDX
                        MPM[1] = max(L, A)
                        MPM[2] = ((max(L, A) + offset) % mod) + 2
                        MPM[3] = ((max(L,A) − 1) % mod) + 2
                        MPM[4] = ((max(L, A) + offset − 1) % mod) + 2
                        MPM[5] = (max(L, A) % mod) + 2
                    }
                    else
                    {
                        MPM[0] = max(L, A)
                        MPM[1] = ((max(L, A) + offset) % mod) + 2
```

```
            MPM[2] = ((max(L,A) − 1) % mod) + 2
            MPM[3] = PLANAR_IDX
            MPM[4] = ((max(L, A) + offset − 1) % mod) + 2
            MPM[5] = (max(L, A) % mod) + 2
          }
        }
        else
        {
          use initialized values
        }
      }
    }
  }
  with
  (*) max(L, A) − min(L, A) == 1
  (**) max(L, A) − min(L, A) >= 62
  (***) max(L, A) − min(L, A) == 2
  (****) all other cases
```

'fillListMPMsNNLeftAbove' may be a function (e.g., any function) that puts 'ptrIndicesRepNNLeft[0]', 'ptrIndices-RepNNLeft[1]', 'ptrIndicesRepNNAbove[0]', and 'ptrIndicesRepNNAbove[1]' into the list of MPMs pointed by 'MPM'. In examples, 'fillListMPMsNNLeftAbove' may be designed such that the MPMs (e.g., all the MPMs) are different.

In examples, 'fillListMPMsNNLeftAbove' may behave as described herein. The priority in the list of MPMs may be 'ptrIndicesRepNNLeft[0]', 'ptrIndicesRepNNAbove[0]', 'ptrIndicesRepNNLeft[1]', and 'ptrIndicesRepNNAbove[1]', as illustrated below.

```
void fillListMPMsNNLeftAbove(unsigned* const MPM,
                const int& multiRefIdx,
                const bool& isSignaling0,
                const unsigned* const ptrIndicesRepNNLeft,
                const unsigned* const ptrIndicesRepNNAbove)
{
  bool isIdx0Redundant = false
  bool isIdx1Redundant = false
  areRedundantInSecondArray(ptrIndicesRepNNLeft,
                ptrIndicesRepNNAbove,
                isIdx0Redundant,
                isIdx1Redundant)
  if (isIdx0Redundant && isIdx1Redundant)
  {
    fillListMPMsWithoutInitialization(MPM,
                ptrIndicesRepNNLeft[0],
                ptrIndicesRepNNLeft[1],
                multiRefIdx,
                isSignaling0,
                NULL,
                NULL)
  }
  else
  {
    int idxInc = 0
    if (isIdx0Redundant || isIdx1Redundant)
    {
      if (multiRefIdx > 0 || !isSignaling0)
      {
        MPM[idxInc++] = PLANAR_IDX
        if (ptrIndicesRepNNLeft[0] != PLANAR_IDX)
        {
          MPM[idxInc++] = ptrIndicesRepNNLeft[0]
        }
        if (ptrIndicesRepNNAbove[static_cast<int>(isIdx0Redundant)] != PLANAR_IDX)
        {
          MPM[idxInc++] = ptrIndicesRepNNAbove[static_cast<int>(isIdx0Redundant)]
        }
        if (ptrIndicesRepNNLeft[1] != PLANAR_IDX)
        {
          MPM[idxInc++] = ptrIndicesRepNNLeft[1]
        }
```

-continued

```
        fillUpToSix(MPM,
            idxInc)
      }
      else
      {
        MPM[idxInc++] = ptrIndicesRepNNLeft[0]
        MPM[idxInc++] = ptrIndicesRepNNAbove[static_cast<int>(isIdx0Redundant)]
        MPM[idxInc++] = ptrIndicesRepNNLeft[1]
        fillUpToSix(MPM,
            idxInc)
      }
    }
    else
    {
      if (multiRefIdx > 0 || !isSignaling)
      {
        MPM[idxInc++] = PLANAR_IDX
        if (ptrIndicesRepNNLeft[0] != PLANAR_IDX)
        {
          MPM[idxInc++] = ptrIndicesRepNNLeft[0]
        }
        if (ptrIndicesRepNNAbove[0] != PLANAR_IDX)
        {
          MPM[idxInc++] = ptrIndicesRepNNAbove[0]
        }
        if (ptrIndicesRepNNLeft[1] != PLANAR_IDX)
        {
          MPM[idxInc++] = ptrIndicesRepNNLeft[1]
        }
        if (ptrIndicesRepNNAbove[1] != PLANAR_IDX)
        {
          MPM[idxInc++] = ptrIndicesRepNNAbove[1]
        }
        fillUpToSix(MPM,
            idxInc)
      }
      else
      {
        MPM[idxInc++] = ptrIndicesRepNNLeft[0]
        MPM[idxInc++] = ptrIndicesRepNNAbove[0]
        MPM[idxInc++] = ptrIndicesRepNNLeft[1]
        MPM[idxInc++] = ptrIndicesRepNNAbove[1]
        fillUpToSix(MPM,
            idxInc)
      }
    }
  }
}
```

'areRedundantInSecondArray' may be used to set 'isIdx0Redundant' to true, for example, if 'ptrIndicesRepN-NAbove[0]'='ptrIndicesRepNNLeft[0]' or 'ptrIndices-RepNNAbove[0]'='ptrIndicesRepNNLeft[1]'. 'areRedun-dantInSecondArray' may be used to set 'isIdx1Redundant' to true, for example, if 'ptrIndicesRepNNAbove[1]'='ptrIndicesRepNNLeft[0]' or 'ptrIndicesRepNNAbove[1]'='ptrIndicesRepNNLeft[1]'.

As illustrated above, the condition 'isIdx0Redundant' && 'isIdx1Redundant' may indicate that the set {'ptrIndices-RepNNAbove[0]', 'ptrIndicesRepNNAbove[1]'} is redun-dant with the set {'ptrIndicesRepNNLeft[0]', 'ptrIndices-RepNNLeft[1]'}. "Redundant" may mean that the two mentioned sets are equal, not considering the set order (c.f. the notion of set equality in the programming language Python). Based on a determination that {'ptrIndicesRepN-NAbove[0]', 'ptrIndicesRepNNAbove[1]'} is redundant with the set {'ptrIndicesRepNNLeft[0]', 'ptrIndicesRepNN-Left[1]'}, 'ptrIndicesRepNNAbove[0]' and 'ptrIndices-RepNNAbove[1]' may be excluded from the derived list of MPMs.

'fillUpToSix' may be used to fill the list of MPMs pointed by 'MPM' from the list index 'idxInc' to 5. 'fillUpToSix' may use a procedure to perform the filling. In examples, 'fillUpToSix' may produce a list of MPMs comprising different intra prediction mode indices.

In examples, the list of MPMs may be derived such that the indices of the two regular intra prediction modes inferred during the prediction of the luminance CB located on the left side of the current luminance CB may appear in the derived list of MPMs. For example, if the neural network-based intra prediction mode is selected to predict the luminance CB located on the left side of the current luminance CB, and a regular intra prediction mode (e.g., non-neural network-based intra prediction mode) is selected to predict the luminance CB located above the current luminance CB, the indices of the two regular intra prediction modes inferred during the prediction of the luminance CB located on the left side of the current luminance CB may be included in the derived list of MPMs. In the illustration above, 'fill-ListMPMsWithoutInitialization' may become

```
void fillListMPMsWithoutInitialization(unsigned* const MPM,
                   const int& L,
                   const int& A,
                   const int& multiRefIdx,
                   const bool& isSignaling0,
                   const unsigned* const ptrIndicesRepNNLeft,
                   const unsigned* const preIndicesRepNNAbove)
{
  if (L == A)
  {
    if ((L > DC_IDX) && (L != NN_IDX))
    {
      if ((multiRefIdx > 0) || !isSignaling0)
      {
          MPM[0] = PLANAR_IDX
          MPM[1] = L
          MPM[2] = ((L + offset) % mod) + 2
          MPM[3] = ((L - 1) % mod) + 2
          MPM[4] = ((L + offset - 1) % mod) + 2
          MPM[5] = (L % mod) + 2
      }
      else
      {
          MPM[0] = L
          MPM[1] = ((L + offset) % mod) + 2
          MPM[2] = ((L - 1) % mod) + 2
          MPM[3] = PLANAR_IDX
          MPM[4] = ((L + offset - 1) % mod) + 2
          MPM[5] = (L % mod) + 2
      }
    {
    else if (L == NN_IDX)
    {
      fillListMPMsNNLeftAbove(MPM,
              multiRefIdx,
              isSignaling0,
              ptrIndicesRepNNLeft,
              ptrIndicesRepNNAbove)
    }
    else
    {
      use initialized values
    }
  {
  else
  {
    if ((L == NN_IDX) || (A == NN_IDX)
    {
      if (L == NN_IDX)
      {
        unsigned temp = ptrIndicesRepNNLeft[0] == A ? ptrIndicesRepNNLeft[1] : ptrIndicesRepNNLeft[0]
        unsigned arrayAbove[2] = {A, temp}
        fillListMPMsNNLeftAbove(MPM,
                multiRefIdx,
                isSignaling0,
                ptrIndicesRepNNLeft,
                &arrayAbove[0])
      }
      else
      {
        fillListMPMsWithoutInitialization(MPM,
                L,
                ptrIndicesRepNNAbove[0],
                multiRefIdx,
                isSignaling0,
                NULL,
                NULL)
      }
    }
    else
    {
      if ((L > DC_IDX) && (A > DC_IDX))
      {
        if (multiRefIdx > 0 || !isSignaling0)
        {
          MPM[0] = PLANAR_IDX
          MPM[1] = L
          MPM[2] = A
        }
        else
        {
```

-continued

```
        MPM[0] = L
        MPM[1] = A
        MPM[2] = PLANAR_IDX
      }
       MPM[3] =                    ((min(L, A) + offset) % mod) + 2 if (*)
                                   ((min(L, A) − 1) % mod) + 2 if (**)
                                   ((min(L, A) − 1) % mod) + 2 if (***)
                                   ((min(L, A) + offset) % mod) + 2 if (****)
       MPM[4] =                    ((max(L, A) − 1) % mod) + 2 if (*)
                                   ((max(L, A) + offset) % mod) + 2 if (**)
                                   ((min(L, A) + offset) % mod) + 2 if (***)
                                   ((min(L, A) − 1) % mod) + 22 if (****)
       MPM[5] =                    ((min(L, A) + offset − 1) % mod) + 2 if (*)
                                   (min(L, A) % mod) + 2 if (**)
                                   ((max(L, A) − 1) % mod) + 2 if (***)
                                   ((max(L, A) + offset) % mod) + 2 if (****)
    }
    else if (L + A >= 2)
    {
      if (multiRefIdx > 0 || !isSignaling0)
      {
        MPM[0] = PLANAR_IDX
        MPM[1] = max(L, A)
        MPM[2] = ((max(L, A) + offset) % mod) + 2
        MPM[3] = ((max(L,A) − 1) % mod) + 2
        MPM[4] = ((max(L, A) + offset − 1) % mod) + 2
        MPM[5] = (max(L, A) % mod) + 2
      }
      else
      {
        MPM[0] = max(L, A)
        MPM[1] = ((max(L, A) + offset) % mod) + 2
        MPM[2] = ((max(L,A) − 1) % mod) + 2
        MPM[3] = PLANAR_IDX
        MPM[4] = ((max(L, A) + offset − 1) % mod) + 2
        MPM[5] = (max(L, A) % mod) + 2
      }
    }
    else
    {
      use initialized values
    }
  }
  }
}
```

40

In examples, the list of MPMs may be derived such that the indices of the two regular intra prediction modes (e.g., non-neural network-based intra prediction modes) inferred during the prediction of the luminance CB located above the current luminance CB may be included in the derived list of MPMs. For example, if the neural network-based intra prediction mode is selected to predict the luminance CB located above the current luminance CB and a regular intra prediction mode (e.g., non-neural network-based intra prediction mode) is selected to predict the luminance CB located on the left side of the current luminance CB, the indices of the two regular intra prediction modes inferred during the prediction of the luminance CB located above the current luminance CB may be included in the derived list of MPMs. In the illustration, fillListMPMsWithoutInitialization may become

```
void fillListMPMsWithoutInitialization(unsigned* const MPM,
                 const int& L,
                 const int& A,
                 const int& multiRefIdx,
                 const bool& isSignaling0,
                 const unsigned* const ptrIndicesRepNNLeft,
                 const unsigned* const preIndicesRepNNAbove)
{
  if (L == A)
  {
    if ((L > DC_IDX) && (L != NN_IDX))
    {
      if ((multiRefIdx > 0) || !isSignaling0)
      {
        MPM[0] = PLANAR_IDX
        MPM[1] = L
        MPM[2] = ((L + offset) % mod) + 2
        MPM[3] = ((L − 1) % mod) + 2
        MPM[4] = ((L + offset − 1) % mod) + 2
        MPM[5] = (L % mod) + 2
```

-continued

```
        }
        else
        {
            MPM[0] = L
            MPM[1] = ((L + offset) % mod) + 2
            MPM[2] = ((L − 1) % mod) +2
            MPM[3] = PLANAR_IDX
            MPM[4] = ((L + offset − 1) % mod) + 2
            MPM[5] = (L % mod) + 2
        }
    {
    else if (L == NN_IDX)
    {
        fillListMPMsNNLeftAbove(MPM,
                multiRefIdx,
                isSignaling0,
                ptrIndicesRepNNLeft,
                ptrIndicesRepNNAbove)
    }
    else
    {
        use initialized values
    }
{
else
{
    if ((L == NN_IDX) || (A == NN_IDX))
    {
        if (L == NN_IDX)
        {
            fillListMPMsWithoutInitialization(MPM,
                    ptrIndicesRepNNLeft[0],
                    A,
                    multiRefIdx,
                    isSignaling0,
                    NULL,
                    NULL)
        }
        else
        {
            unsigned temp = ptrIndicesRepNNAbove[0] == L ? ptrIndicesRepNNAbove[1] :
ptrIndicesRepNNAbove[0]
            unsigned arrayLeft[2] = {L, temp}
            fillListMPMsNNLeftAbove(MPM,
                    multiRefIdx,
                    isSignaling0,
                    &arrayLeft[0],
                    ptrIndicesRepNNAbove)
        }
    }
    else
    {
        if ((L > DC_IDX) && (A > DC_IDX))
        {
            if (multiRefIdx > 0 || !isSignaling0)
            {
              MPM[0] = PLANAR_IDX
              MPM[1] = L
              MPM[2] = A
            }
            else
            {
              MPM[0] = L
              MPM[1] = A
              MPM[2] = PLANAR_IDX
            }
            MPM[3] =            ((min(L, A) + offset) % mod) + 2 if (*)
                                ((min(L, A) − 1) % mod) + 2 if (**)
                                ((min(L, A) − 1) % mod) + 2 if (***)
                                ((min(L, A) + offset) % mod) + 2 if (****)
            MPM[4] =            ((max(L, A) − 1) % mod) + 2 if (*)
                                ((max(L, A) + offset) % mod) + 2 if (**)
                                ((min(L, A) + offset) % mod) + 2 if (***)
                                ((min(L, A) − 1) % mod) + 22 if (****)
            MPM[5] =            ((min(L, A) + offset − 1) % mod) + 2 if (*)
                                (min(L, A) % mod) + 2 if (**)
                                ((max(L, A) − 1) % mod) + 2 if (***)
                                ((max(L, A) + offset) % mod) + 2 if (****)
        }
```

US 12,587,640 B2

49
50

-continued

```
else if (L + A >= 2)
{
  if (multiRefIdx > 0 || !isSignaling0)
  {
    MPM[0] = PLANAR_IDX
    MPM[1] = max(L, A)
    MPM[2] = ((max(L, A) + offset) % mod) + 2
    MPM[3] = ((max(L,A) - 1) % mod) + 2
    MPM[4] = ((max(L, A) + offset - 1) % mod) + 2
    MPM[5] = (max(L, A) % mod) + 2
  }
  else
  {
    MPM[0] = max(L, A)
    MPM[1] = ((max(L, A) + offset) % mod) + 2
    MPM[2] = ((max(L,A) - 1) % mod) + 2
    MPM[3] = PLANAR_IDX
    MPM[4] = ((max(L, A) + offset - 1) % mod) + 2
    MPM[5] = (max(L, A) % mod) + 2
  }
}
else
{
  use initialized values
}
}
}
}
```

Figure 14:
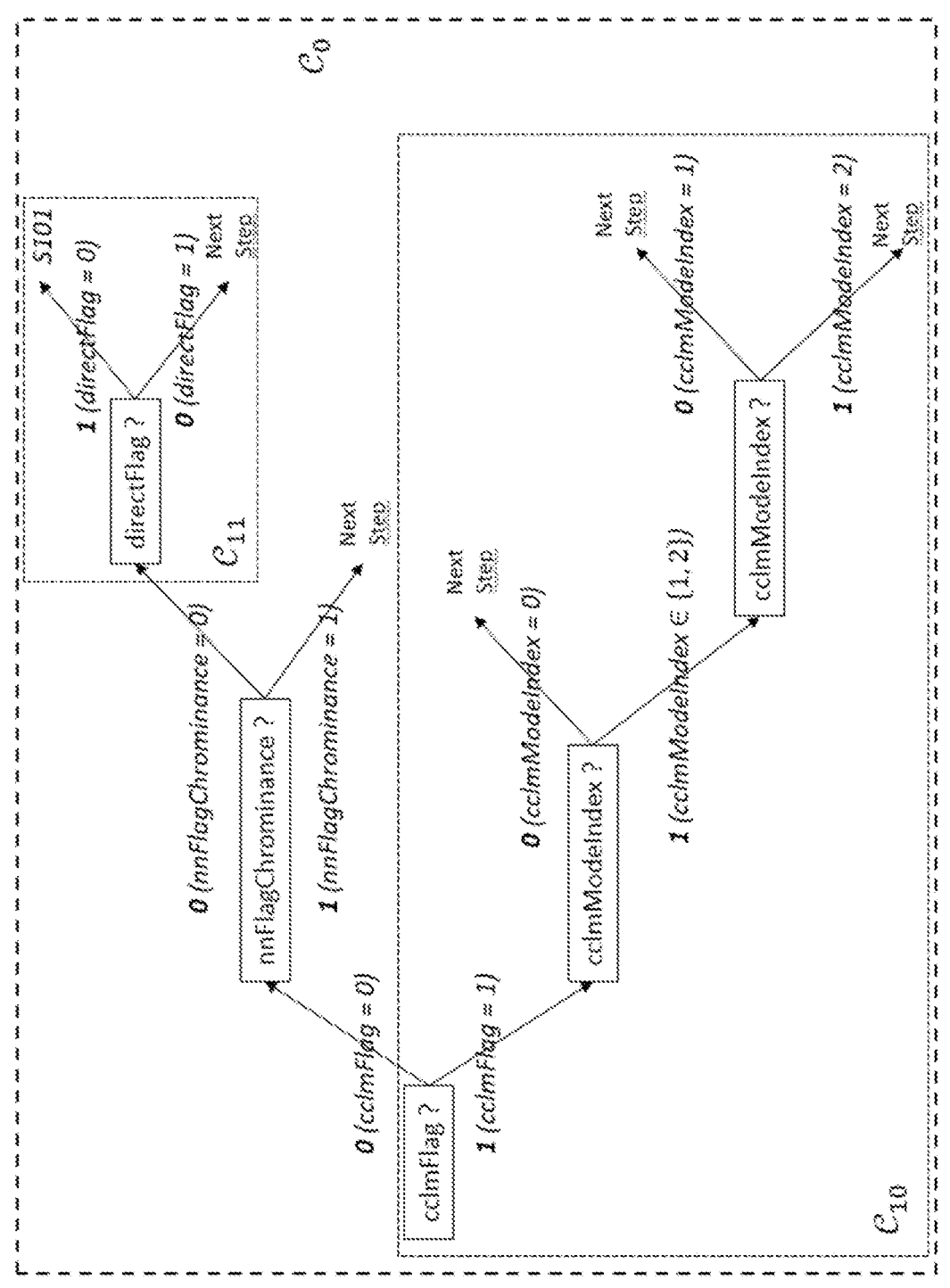
FIG. 14 shows an example intra prediction signaling for a current chrominance CB.
Figure 15:
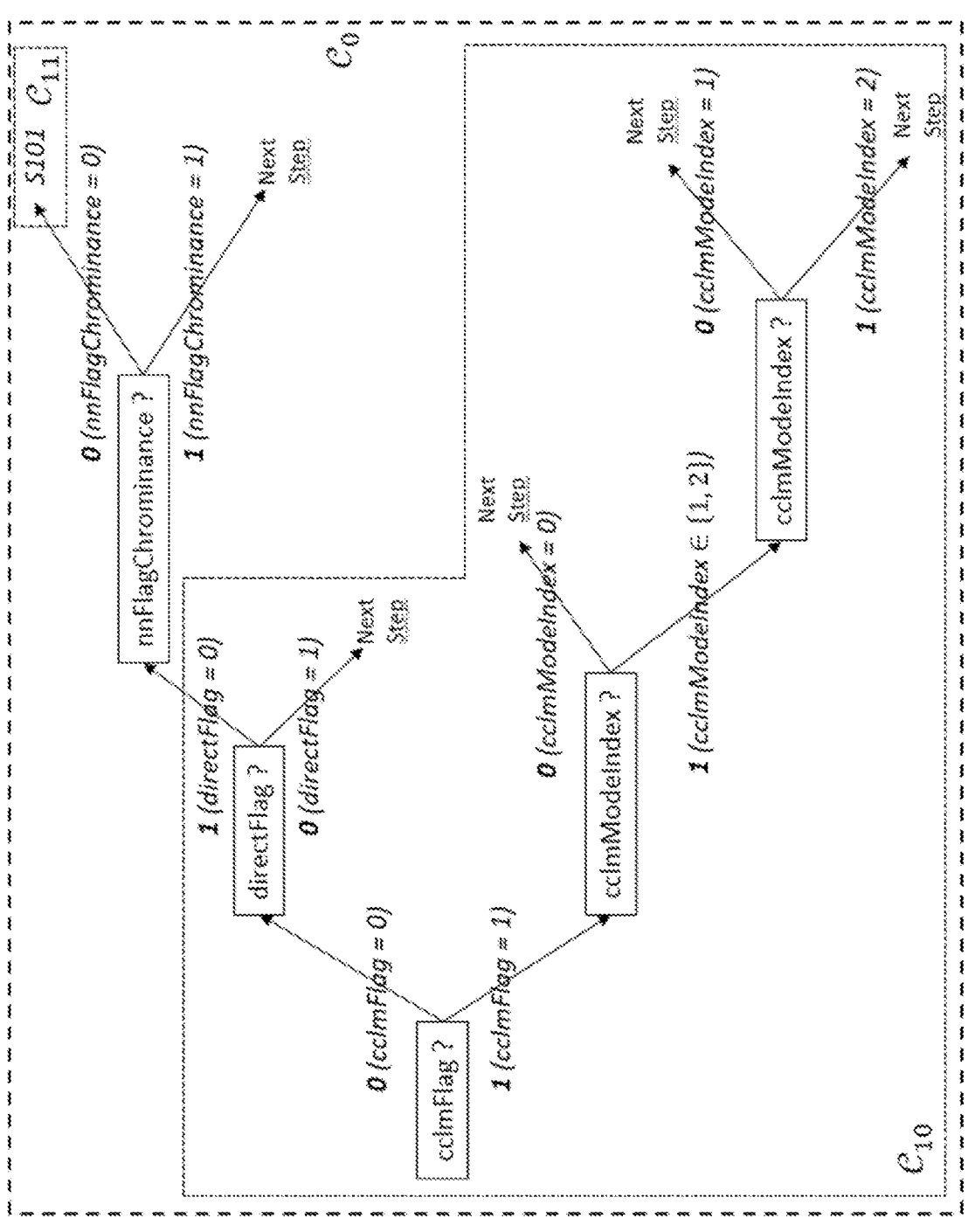
FIG. 15 shows an example intra prediction signaling for a current chrominance CB.

Indications related to the neural network-based mode in an intra prediction in chrominance may be signaled. In examples, an indication such as a flag nnFlagChrominance, that may indicate the characteristic of the neural network-based intra prediction mode may be placed before the directFlag in the intra prediction signaling of the current chrominance CB. The neural network-based intra prediction mode may be used to predict a current chrominance CB, for example, if nnFlagChrominance is equal to 1. To reduce redundancy, an encoder may determine whether to include an indication (e.g., flag nnFlagChrominance) in the signaling of the neural network-based intra prediction mode within the intra prediction signaling of the current chrominance CB based on one or more conditions. A decoder may determine whether to parse the indication (e.g., flag nnFlagChrominance) in the signaling of the neural network-based intra mode within the intra prediction signaling of the current chrominance CB based on one or more conditions. The one or more conditions may ensure that the nnFlagChrominance does not appear in the intra prediction signaling of the current chrominance CB, for example, if the DM becomes the neural network-based intra prediction mode (e.g., as shown in FIGS. 14 and 15). To save bits, conditions may make sure that the nnFlagChrominance does not appear in the intra prediction signaling of the current chrominance CB, for example, if the prediction of the current chrominance CB via the neural network-based intra prediction mode cannot be carried out. The neural network-based intra prediction mode may not be carried out based on one or more of the following: the context of the current chrominance CB cannot be extracted and/or there exists no neural network in the neural network-based intra prediction mode that may be used to predict the current chrominance CB (e.g., as shown in FIGS. 14 and 15).

Figure 13:
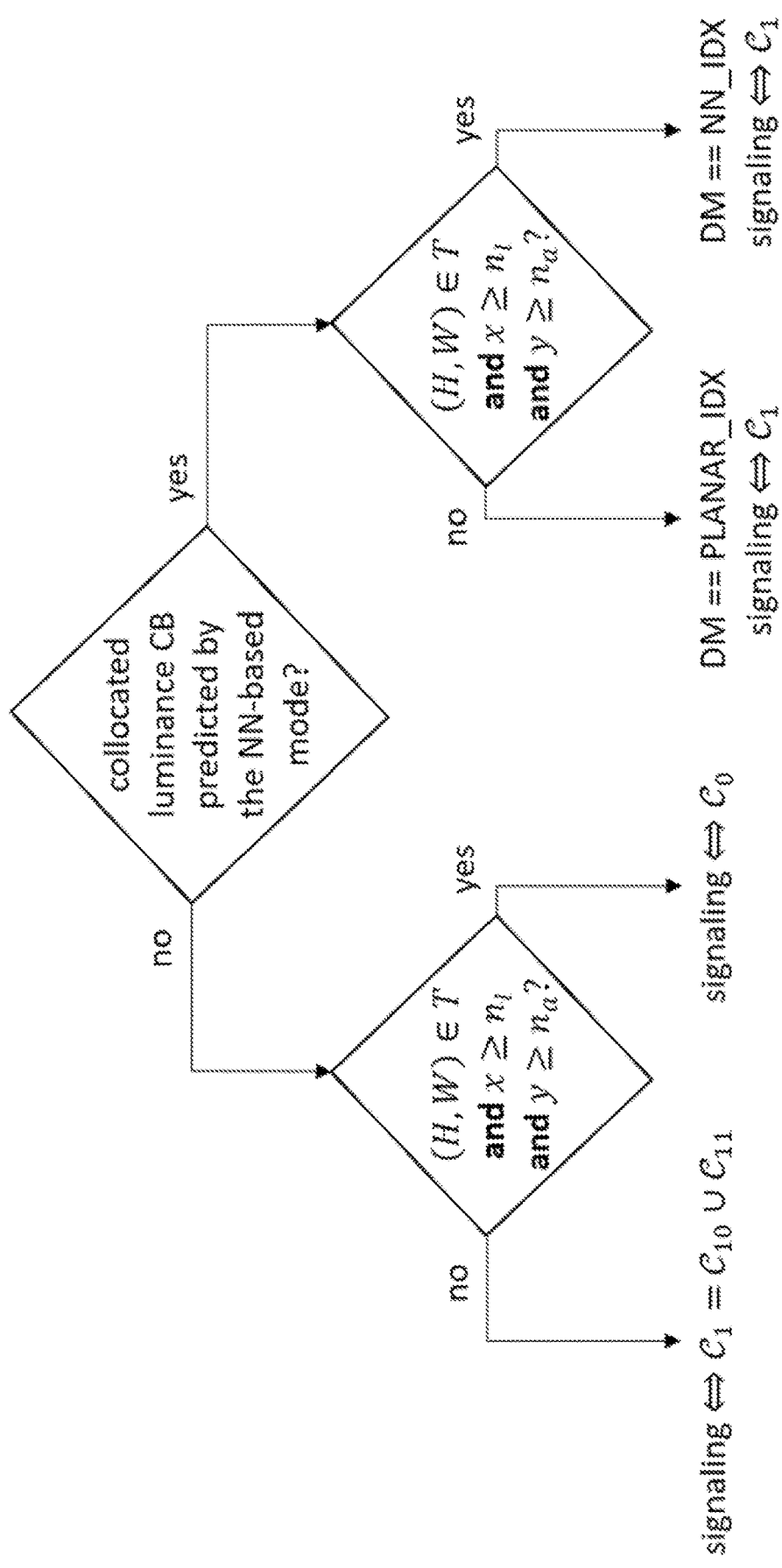
FIG. 13 shows an example definition of intra prediction signaling and a direct mode (DM) for a current chrominance coding block.

FIG. 13 shows an example intra prediction signaling and a DM for a current W×H chrominance CB whose top-left pixel is located at (x,y) in a current frame. The parameters $n_l$ and $n_a$ of the context of the current chrominance CB may be specified (e.g., as shown in FIG. 5). NN_IDX may denote the index of the neural network-based intra prediction mode. Signaling related to $c_{10}$, $c_{11}$, and $c_0$ may be obtained (e.g., as shown in FIG. 15).

FIG. 14 shows an example intra prediction signaling for a current chrominance CB. In a case of state S101, a truncated binary encoding of the non-DM among the 4 non-DM modes may be signaled. As shown, flag characteristics of a neural network-based mode may be placed before a directFlag.

FIG. 15 shows an example intra prediction signaling for a current chrominance CB. In examples, the nnFlagChrominance characteristics of the neural network-based intra prediction mode may be placed after the directFlag in the intra prediction signaling of the current chrominance CB. The intra prediction signaling may be according to examples described herein. In a case of state S101, a truncated binary encoding of the non-DM among the 4 non-DM modes may be signaled. As shown in FIG. 15, an indication such as a flag nnFlagChrominance, which may indicate the characteristic of the neural network-based intra prediction mode, may be placed after the directFlag in the intra prediction signaling of the current chrominance CB. The neural network-based intra prediction mode may be used to predict a current chrominance CB, for example, if nnFlagChrominance is equal to 1. Whether to signal the flag nnFlagChrominance may be determined based on the value of the directFlag. If the directFlag indicates that the prediction of the current chrominance CB via the neural network-based intra prediction mode cannot be carried out (e.g., directFlag=1, the direct mode is used), signaling of the flag nnFlagChrominance may skipped. If the directFlag indicates that the prediction of the current chrominance CB via the neural network-based intra prediction mode can be carried out (e.g., directFlag=0, the direct mode is not used), the flag nnFlagChrominance may be included in the bitstream. On the decoder side, whether to parse a flag nnFlagChrominance may be determined based on the value of the directFlag. If the directFlag indicates that the prediction of the current chrominance CB via the neural network-based intra prediction mode cannot be carried out (e.g., directFlag=1, the direct mode is used), parsing of the flag nnFlagChrominance may skipped. If the directFlag indicates that the prediction of the current chrominance CB via the neural network-based intra prediction mode can be carried out (e.g., directFlag=0, the direct mode is not used), the flag nnFlagChrominance may be parsed from the bitstream.

FIG. 16 shows an example the index of the regular intra prediction mode (e.g., non-neural network-based intra prediction mode) that corresponds to (e.g., best represents) the neural network prediction of the current block on a decoder side.

At 1600, information representative of a neural network-based prediction and/or a block context may be obtained. In examples, the information may be obtained for a current block in a picture and/or video. The information may be obtained as described with reference to FIGS. 5 and 6. For example, the block context may comprise a set of decoded pixels surrounding the current block.

At 1605, neural network-based intra prediction may be performed. For example, the neural network-based intra prediction may be performed for the current block based on the block context and/or the neural network-based intra prediction mode. The neural network-based intra prediction may be performed as described with respect to FIGS. 8 and 10. In examples, the neural network-based intra prediction may be performed in a luminance and/or chrominance component of the current block. Signaling information from a bitstream may be decoded. The signaling information may comprise a flag, for example, indicating whether the neural network-based prediction mode predicts the current block, as described with reference to FIGS. 14 and 15.

At 1610, a non-neural network-based intra prediction mode may be determined. For example, the non-neural network-based intra prediction mode may correspond to the performed neural network-based intra prediction. The non-neural network-based intra prediction mode may be determined as described with reference to FIGS. 8 and 10. In examples, multiple non-neural network-based intra prediction modes may be determined as described with respect to FIG. 12. The non-neural network based-intra prediction mode(s) may be determined based on a metric associated with the non-neural network-based intra prediction mode representing the neural network-based intra prediction. The metric may comprise a probability as described with respect to FIG. 8. For example, the probability may be determined based on the block context and/or the neural network-based prediction mode. In examples, the determined non-neural network based intra prediction mode(s) may be associated with a maximum probability, for example, among a plurality of representation probabilities associated with plurality of non-neural network based intra prediction modes.

At 1615, a prediction mode may be determined. The prediction mode may be determined based on the determined non-neural network-based intra prediction mode. The prediction mode may be determined for a block neighboring the current block. In examples, an MPM may be determined for the neighboring block based on the determined non-neural network-based intra prediction mode.

In the example neural network-based intra prediction mode, a neural network may be used to predict blocks of different sizes by transposing (e.g., optionally transposing) the context of the current block to be predicted and the neural network prediction of the block and/or by down-sampling the context of the current block and interpolating the neural network prediction of the block. For example, if the context of the current block to be predicted and the neural network prediction of the block are transposed, the inferred index repIdx of the regular intra prediction mode that represents (e.g., best represents) the neural network prediction of the current block may be transposed (e.g., also be transposed).

Figure 17:
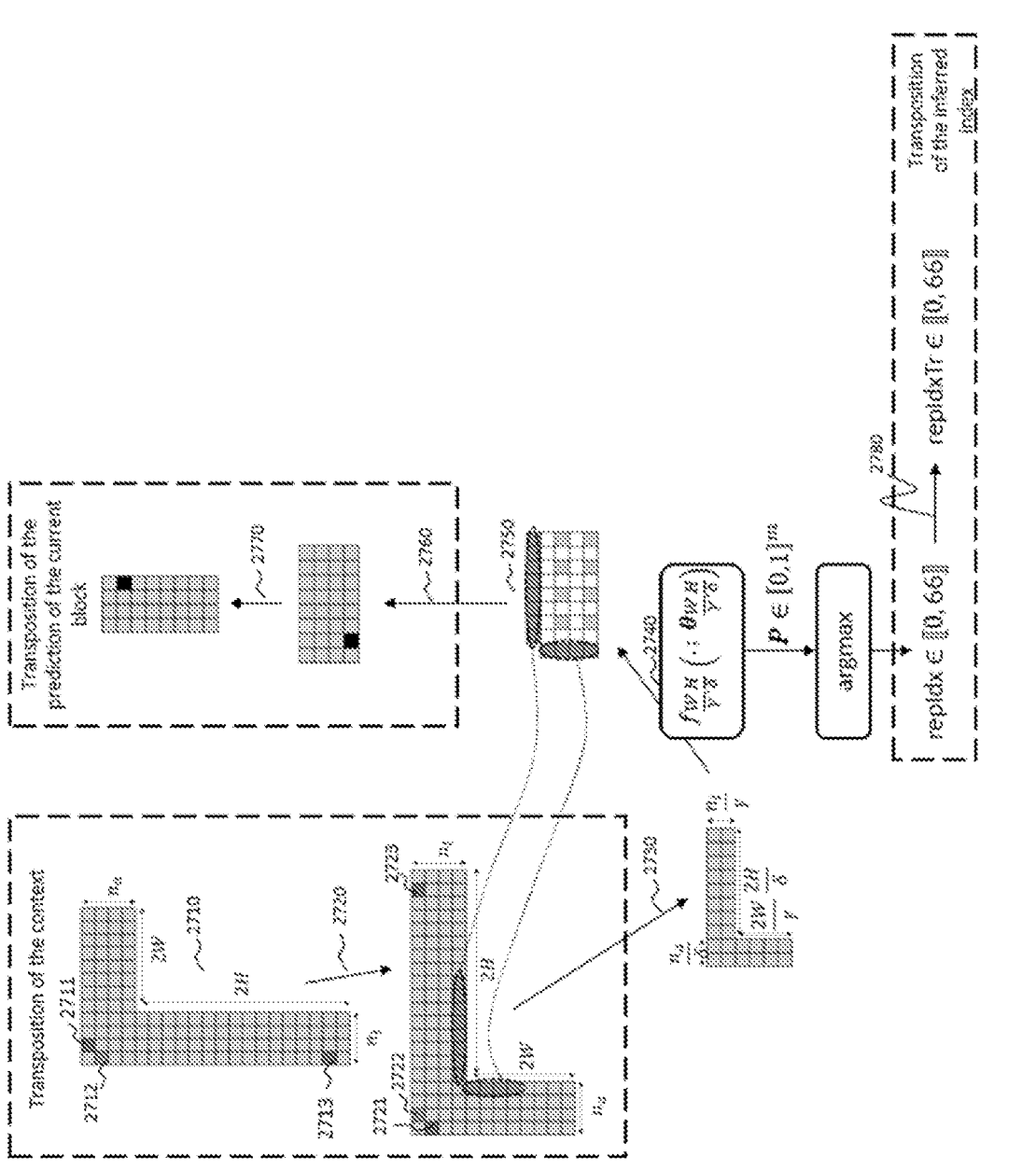
FIG. 17 shows an example of prediction via the neural network-based intra prediction mode.

FIG. 17 shows an example of prediction via the neural network-based intra prediction mode. In examples, for a given pair of a block height H and width W, the neural network-based intra prediction mode may or may not include the neural network predicting blocks of size W×H. For a vertical down-sampling factor $\gamma \in \mathbb{N}^*$ and a horizontal down-sampling factor $\delta \in \mathbb{N}^*$, the neural network-based intra prediction mode may include the neural network $$f_{\frac{W}{\gamma}, \frac{H}{\delta}}\left(.; \theta_{\frac{W}{\gamma}, \frac{H}{\delta}}\right),$$

parameterized by $$\theta_{\frac{W}{\gamma}, \frac{H}{\delta}},$$

predicting blocks of size $(H/\delta) \times (W/\gamma)$. In examples, an index (e.g., single index) of a regular intra prediction mode (e.g., non-neural network-based intra prediction mode) that represents (e.g., best represents) the neural network prediction of the current block may be inferred, as described with respect to FIGS. 7 and 8. The prediction of the current W×H block via the neural network-based intra prediction mode may be performed as described herein. At 2720, the context 2710 of the current W×H block may be transposed. The transposition of context may result in a transposed shape, for example, where the decoded samples 2711, 2712, and 2713 are transposed into the samples 2721, 2722, and 2723, respectively. At 2730, the resulting transposed context may be down-sampled using the vertical down-sampling factor γ and the horizontal down-sampling factor δ. At 2740, the neural network intra prediction may be performed. At 2760, the resulting prediction 2750 may be interpolated using γ, δ and/or using decoded pixels in the transposed context. At 2770, the result of the interpolation may be transposed.

$$f_{\frac{W}{\gamma}, \frac{H}{\delta}}\left(.; \theta_{\frac{W}{\gamma}, \frac{H}{\delta}}\right)$$

may return a vector P whose coefficient of index i may correspond to the probability that the regular intra prediction mode (e.g., non-neural network-based intra prediction mode) of index i represents (e.g., best represents) the neural network prediction. The regular intra prediction mode that corresponds to (e.g., best represents) the neural network prediction of the current block may be determined. For example, repIdx=argmax(P). At 2780, repIdx may be transposed into repIdxTr. For example, repIdxTr may be used, e.g., instead of repIdx, to derive the list of MPMs of a block surrounding the current block. Note that, although in FIG. 17, H=8, W=4, γ=δ=2, those skilled in the art would appreciate that the technique applied to blocks of other sizes.

In examples, if the inferred regular intra prediction mode index belongs to the set of the indices of the regular 65 directional intra prediction modes, PLANAR, and/or DC (e.g., m=67), the transposition of the inferred index may correspond to the transposition of the inferred regular intra prediction mode direction with respect to the diagonal from top-left to bottom-right. For example, the transposition of the inferred index may be obtained as follows:

```
if ((repIdx == PLANAR_IDX) || (repIdx == DC_IDX))
{
    repIdxTr = repIdx
}
else
{
    repIdxTr = 68 − repIdx
}
```

PLANAR_IDX may denote the index of PLANAR (e.g., 0). DC_IDX may denote the index of DC (e.g., 1). 68 may correspond to the number of regular intra prediction modes (e.g., non-neural network-based intra prediction modes). Different numbers may be used for different codecs based on the number of the intra prediction mode in the codec. For example, the number may exclude the MIP modes and/or the CCLM modes, plus 1. The transposition of the inferred regular intra prediction mode index described above may be similar to 2780 in FIG. 17.

In examples, FIG. 17 may be adapted to the case where multiple indices of regular intra prediction modes (e.g., non-neural network-based intra prediction modes) that represent (e.g., best represent) the neural network prediction of the current block are inferred, as described with respect to FIGS. 11 and 12. For example, 2780 may include the transposition of an inferred regular intra prediction mode index repIdx$_i$ using the same transposition. For example, at 2780, repIdx$_i$ may be turned into repIdxTr$_i$. The repIdxTr$_i$ may be used, for example, to derive the list of MPMs of a block neighboring the current block.

Figure 18:
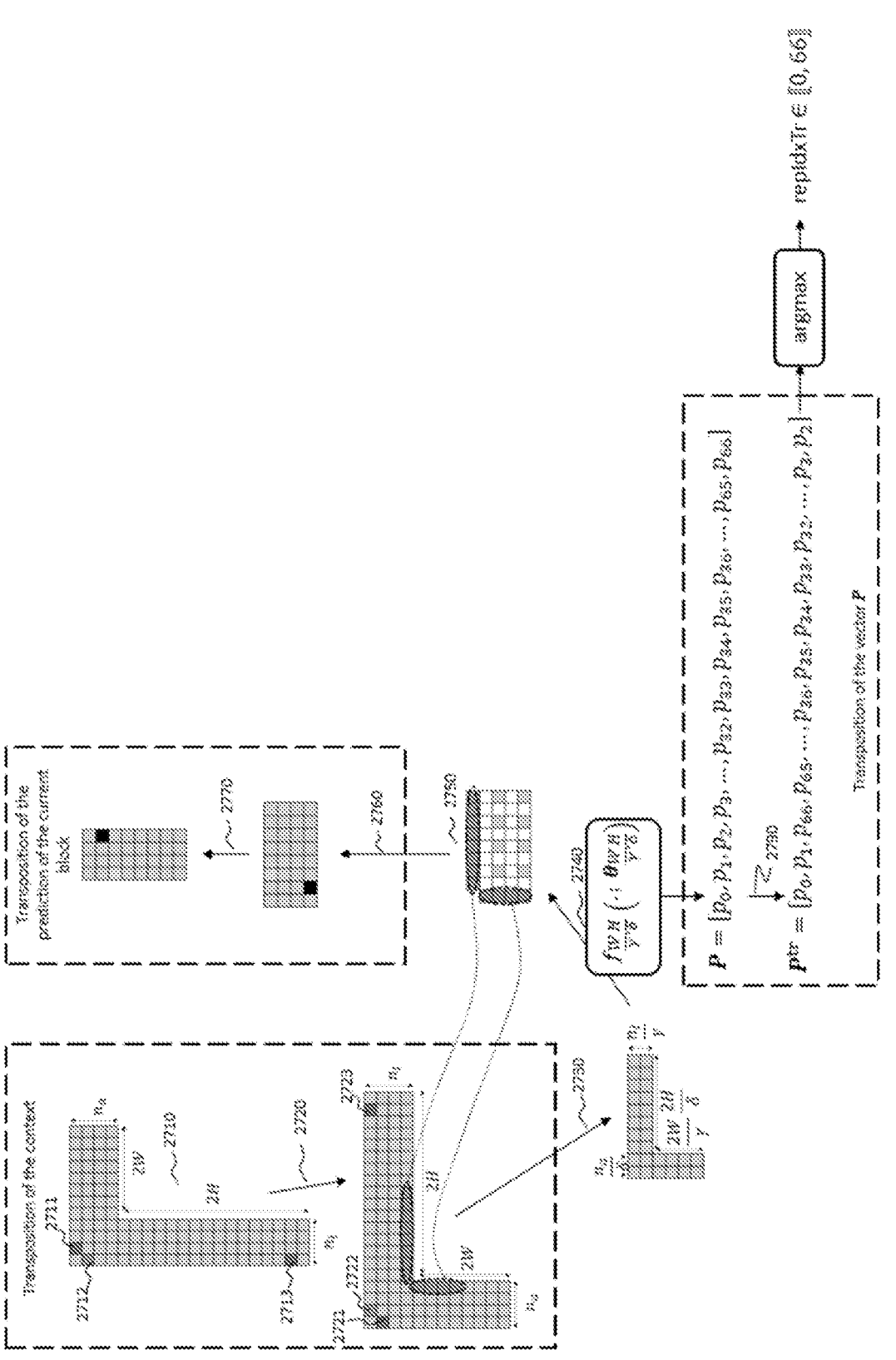
FIG. 18 shows an example of prediction via the neural network-based intra prediction mode.

In examples, FIG. 17 may be adapted to where the vector P returned by the neural network $$f_{\frac{W}{\gamma}, \frac{H}{\delta}}\left(\cdot; \theta_{\frac{W}{\gamma}, \frac{H}{\delta}}\right)$$

is transposed, which may lead to examples described with respect FIG. 18.

FIG. 18 shows an example of prediction via the neural network-based intra prediction mode. In examples, vector P returned by the neural network $$f_{\frac{W}{\gamma}, \frac{H}{\delta}}\left(\cdot; \theta_{\frac{W}{\gamma}, \frac{H}{\delta}}\right)$$

may be transposed. As described with respect to FIG. 18, the inferred regular intra prediction mode index may belong to the set of the indices of the regular directional intra prediction modes in PLANAR, and DC, and the transposition is with respect to the diagonal from top-left to bottom-right. For example, at 2790, the coefficients (e.g., each coefficient) in P of index belonging to [|2, 33|] may be swapped with the coefficient that is its symmetric with respect to the position of index 34. The final prediction of the current block and the value of repIdxTr as described with respect to FIG. 17 may be respectively equal to those as described with respect to FIG. 18.

For a block to be predicted via the neural network-based intra prediction mode, the inference by the neural network-based mode of the index of the regular intra prediction mode that represents (e.g., best represents) the neural network prediction of the block may be combined with the inference and/or prediction by the neural network-based mode of the implicit transform signaling for the transform(s) to be applied to the residue of the neural network prediction. For example, the neural network-based intra prediction mode may be used to predict the implicit transform signaling for low-frequency non-separable transforms (LFNST) to be applied to the block of primary transform coefficients arising from the application of the discrete cosine transform-2 (DCT2) horizontally and the DCT2 vertically to the residue of the neural network prediction. If the context of the current luminance CB to be predicted and the neural network prediction of the CB are transposed, the inferred index repIdx of the regular intra prediction mode that represents (e.g., best represents) the neural network prediction of the CB may be transposed (e.g., also transposed) and the prediction pIdx$_i$$^Y$ of the LFNST group index for lfnstIdx$^Y$=i, i∈{1, 2} may be transposed (e.g., also transposed). lfnstIdx$^Y$∈{0, 1, 2} may denote the LFNST index of the current luminance CB. For example, lfnstIdx$^Y$=0 may indicate that LFNST does not apply for the current luminance CB. lfnstIdx$^Y$∈{1, 2} may indicate that LFNST applies to the block of primary transform coefficients arising from the application of the DCT2 horizontally and the DCT2 vertically to the residue of the neural network prediction, for example, using the LFNST kernel of index lfnstIdx$^Y$−1 in the pair of LFNST kernels given by the LFNST group index. The LFNST group index may indicate the index of the pair of LFNST kernels to be considered and whether the block of primary transform coefficients arising from the application of the DCT2 horizontally and the DCT vertically to the residue of the neural network prediction may be transposed.

Figure 19:
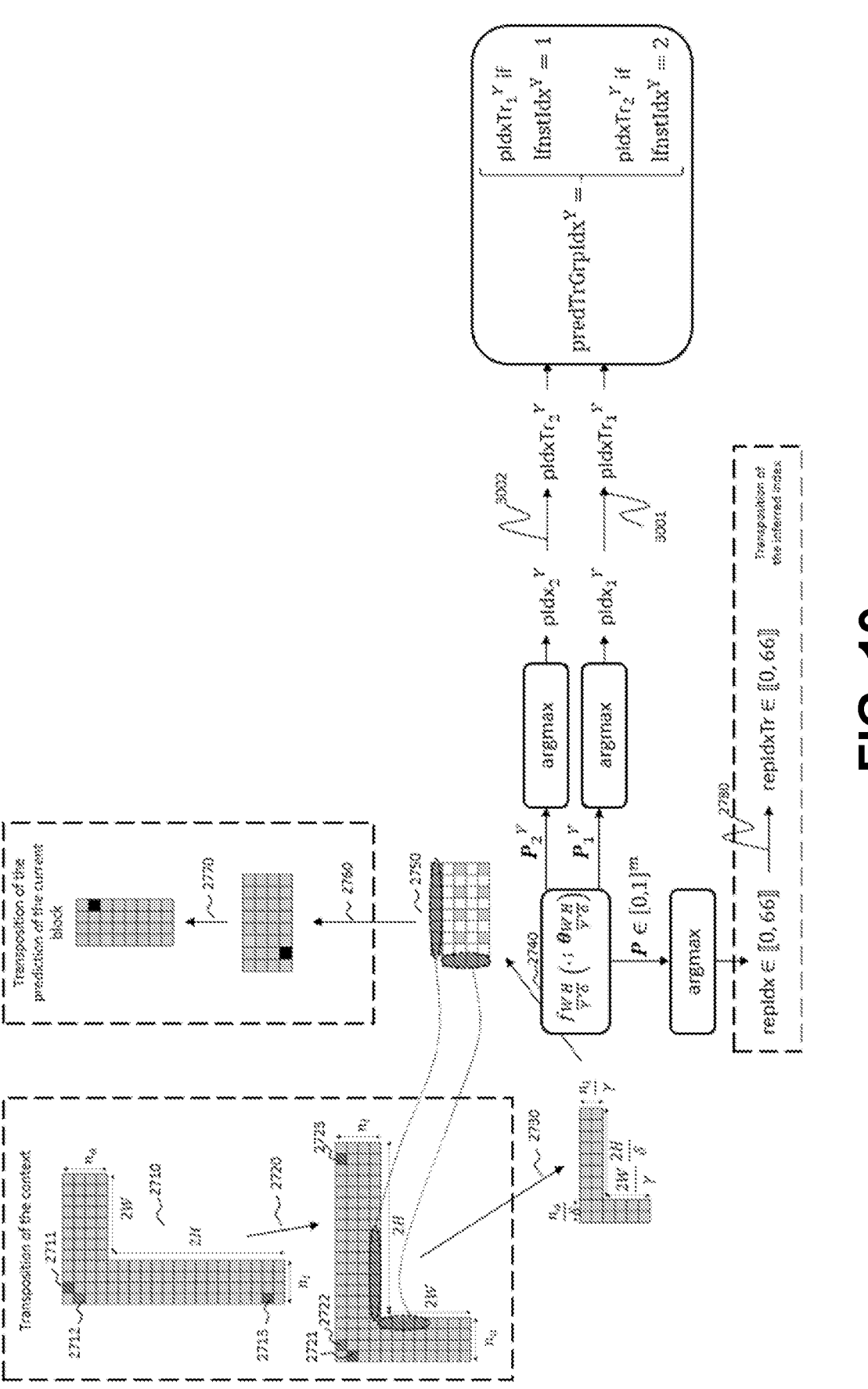
FIG. 19 shows an example of prediction via the neural network-based intra prediction mode.

FIG. 19 shows an example of prediction via the neural network-based intra prediction mode. In examples, the neural network prediction of the block may be combined with the inference and/or prediction by the neural network-based intra prediction mode of the implicit transform signaling for the transform(s) to be applied to the residue of the neural network prediction and/or the inference by the neural network-based intra prediction mode of the index of the regular intra prediction mode that represents (e.g., best represents) the neural network prediction of the block. The neural network $$f_{\frac{W}{\gamma}, \frac{H}{\delta}}\left(\cdot; \theta_{\frac{W}{\gamma}, \frac{H}{\delta}}\right)$$

may return the vector P$_1$$^Y$∈ [0, 1]$^7$ whose coefficient of index i may indicate the probability that the prediction of the LFNST group index for lfnstIdx$^Y$=1 is equal to i.

$$f_{\frac{W}{\gamma}, \frac{H}{\delta}}\left(\cdot; \theta_{\frac{W}{\gamma}, \frac{H}{\delta}}\right)$$

may return the vector P$_2$$^Y$∈ [0, 1]$^7$ whose coefficient of index i may indicate the probability that the prediction of the LFNST group index for lfnstIdx$^Y$=2 is equal to i. For example, pIdx$_1$$^Y$=argmax(P$_1$$^Y$) and pIdx$_2$$^Y$=argmax(P$_2$$^Y$). At 3001, pIdx$_1$$^Y$ may be transposed into pIdxTr$_1$$^Y$. At 3002, pIdx$_2$$^Y$ may be transposed into pIdxTr$_2$$^Y$. The final prediction predTrGrpIdx$^Y$ of the LFNST group index may be equal to pIdx$_1$$^Y$ if lfnstIdx$^Y$=1, pIdx$_2$$^Y$ if lfnstIdx$^Y$=2.

In examples, the transposition of the prediction pIdx$_a$$^Y$ of the LFNST group index for lfnstIdx$^Y$=i, i∈{1, 2} may be obtained as follows:

```
For i ∈ {1,2},
if (pIdx_i^Y == 0)
{
    pIdxTr_i^Y = pIdx_i^Y
}
else
{
    pIdxTr_i^Y = 7 − pIdx_i^Y
}
```

The transposition of the prediction of the LFNST group index for lfnstIdx$^Y$=i, i∈{1, 2} described above may be similar to 3001 and 3002 as described herein with respect to FIG. 19.

Figure 20:
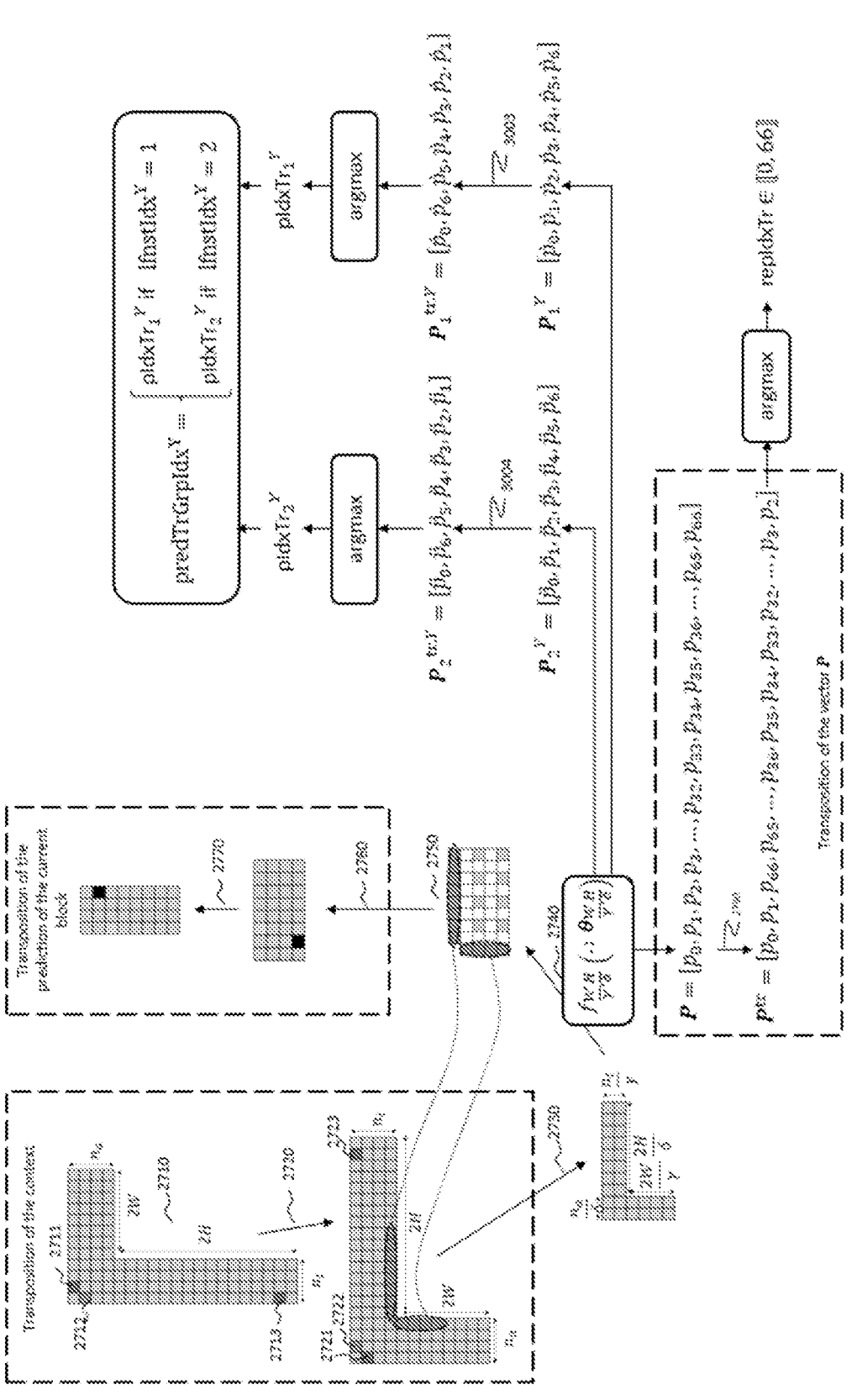
FIG. 20 shows an example of prediction via the neural network-based intra prediction mode.

In examples, FIG. 18 may be adapted to the case where the vector $P_1^Y$ returned by the neural network $$f_{\frac{W}{\gamma}, \frac{H}{\delta}}\left(\cdot; \theta_{\frac{W}{\gamma}, \frac{H}{\delta}}\right)$$

is transposed and/or the vector $P_2^Y$ returned by $$f_{\frac{W}{\gamma}, \frac{H}{\delta}}\left(\cdot; \theta_{\frac{W}{\gamma}, \frac{H}{\delta}}\right)$$

is transposed, which may lead to examples as described with respect to FIG. 20.

FIG. 20 shows an example of prediction via the neural network-based intra prediction mode. In examples, the vector $P_1^Y$ returned by the neural network may be transposed. For example, at 3003, a coefficient (e.g., each coefficient) in $P_1^Y$ of index belonging to [|1, 6|] may be swapped with the coefficient that is its symmetric with respect to the middle of $P_1^Y[1:7]$. In examples, the vector $P_2^Y$ returned by the neural network may be transposed. At 3004, a coefficient (e.g., each coefficient) in $P_2^Y$ of index belonging to [|1, 6|] may be swapped with the coefficient that is its symmetric with respect to the middle of $P_2^Y[1:7]$. The final prediction of the current block, the value of repIdxTr, and the value of predTrGrpIdx$^Y$ as described with respect to FIG. 19 may be respectively equal to those in FIG. 20.

In the combination of the inference by the neural network-based intra prediction mode of the index of the regular intra prediction mode that represents (e.g. best represents) the neural network prediction of the block and the inference and/or prediction by the neural network-based intra prediction mode of the implicit transform signaling for the transform(s) to be applied to the residue of the neural network prediction, the transform(s) targeted by the inference and/or prediction may be primary, secondary, ternary and/or another level of transform. A transform (e.g., each transform) targeted by the inference and/or prediction may apply to the residue of the neural network prediction or a block of transform coefficients being the output of a different transform (e.g., previous transform) associated with a luminance block or a chrominance block.

Figure 21:
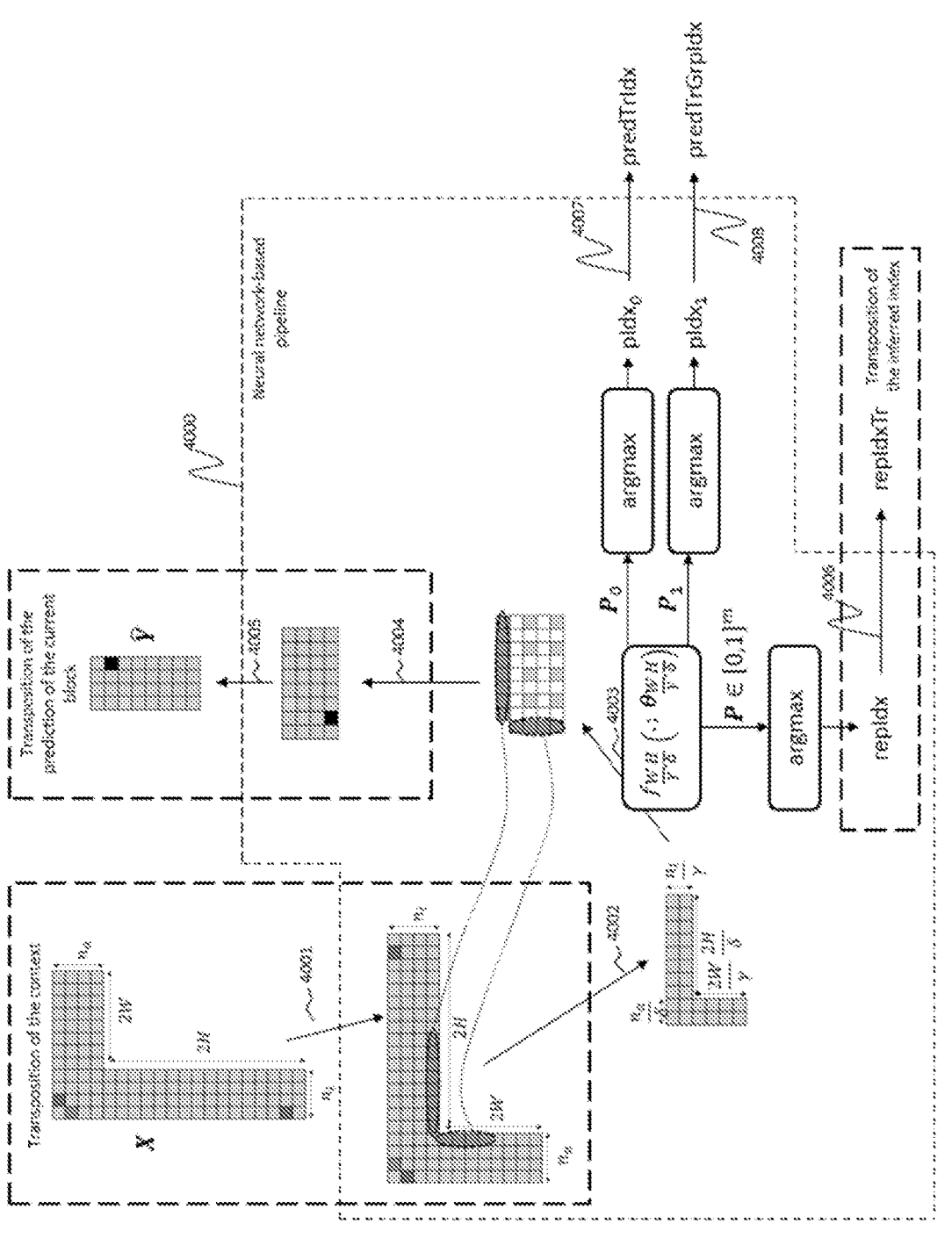
FIG. 21 shows an example of prediction of a block via the neural network-based intra prediction mode.

FIG. 21 shows an example of prediction of a block via the neural network-based intra prediction mode. In examples, where, for a pair of a block height H and width W, the neural network-based intra prediction mode may or may not include the neural network predicting blocks of size W×H. For a vertical down-sampling factor γ∈ ℕ * and a horizontal down-sampling factor δ∈ ℕ *, the neural network-based intra prediction mode may include the neural network $$f_{\frac{W}{\gamma}, \frac{H}{\delta}}\left(\cdot; \theta_{\frac{W}{\gamma}, \frac{H}{\delta}}\right),$$

parameterized by $$\theta_{\frac{W}{\gamma}, \frac{H}{\delta}},$$

predicting blocks of size (H/δ)×(W/γ). At 4001, the context X of the current W×H block may be transposed. The transposition of X may result in a transposed shape. At 4002, the resulting transposed context may be down-sampled using the vertical down-sampling factor γ and the horizontal down-sampling factor δ. At 4003, the neural network-based intra prediction may be performed. At 4004, the resulting prediction may be interpolated using γ, δ and/or using decoded pixels in the transposed context. At 4005, the result of the interpolation may be transposed, yielding the final prediction $\hat{Y}$ of the current block.

$$f_{\frac{W}{\gamma}, \frac{H}{\delta}}\left(\cdot; \theta_{\frac{W}{\gamma}, \frac{H}{\delta}}\right)$$

may return a vector P whose coefficient of index i may correspond to the probability that the corresponding regular intra prediction mode (e.g., non-neural network-based prediction mode) of index i represents (e.g., best represents) the neural network prediction. For example, repIdx=argmax(P). At 4006, repIdx may be transposed into repIdxTr. For example, repIdxTr may be used to derive the list of MPMs of a block surrounding the current block. The neural network $$f_{\frac{W}{\gamma}, \frac{H}{\delta}}\left(\cdot; \theta_{\frac{W}{\gamma}, \frac{H}{\delta}}\right)$$

may return the vector $P_0$ whose coefficient of index i may indicate the probability that the prediction of the selected primary transform index is equal to i.

$$f_{\frac{W}{\gamma}, \frac{H}{\delta}}\left(\cdot; \theta_{\frac{W}{\gamma}, \frac{H}{\delta}}\right)$$

may return the vector $P_1$ whose coefficient of index i may indicate the probability that the prediction of the selected secondary transform index is equal to i. For example, pIdx$_0$=argmax(P$_0$) and pIdx$_1$=argmax(P$_1$). At 4007, pIdx$_0$ may be transposed into predTrIdx. At 4008, pIdx$_1$ may be transposed into predTrGrpIdx. At 4000, examples described herein may be gathered in a neural network pipeline, taking X as input and returning $\hat{Y}$, predTrIdx, predTrGrpIdx, and/or repIdxTr.

Figure 22:
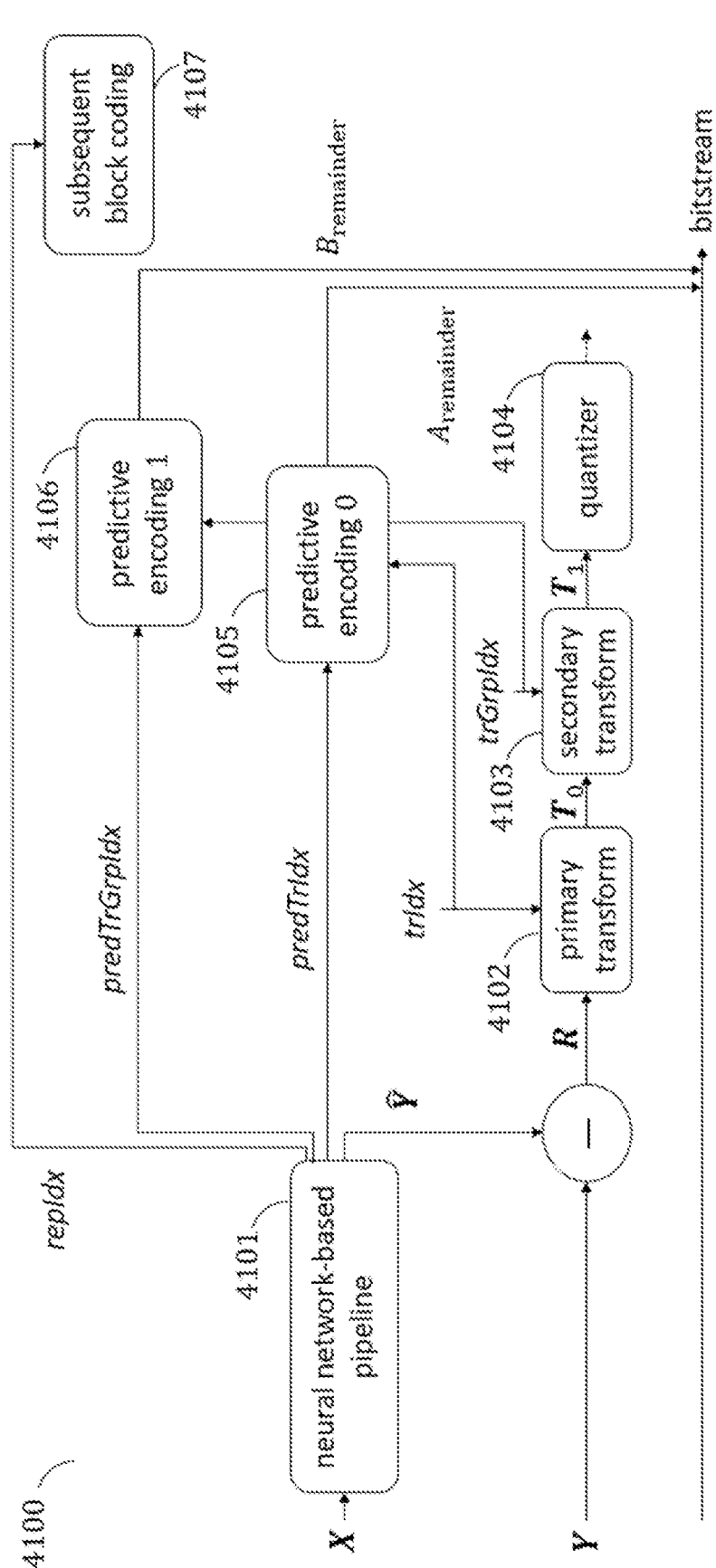
FIG. 22 shows an example of neural network-based pipeline on the encoder side.

FIG. 22 shows an example of a neural network-based pipeline on the encoder side 4100. At 4101, the neural network-based pipeline may compute from the context X of the current block Y a prediction $\hat{Y}$ of Y, the index repIdx of the regular intra prediction mode that represents (e.g., best represents) the neural network prediction of the current block, the prediction predTrIdx of the index of the selected primary transform to be applied to the residue of the neural network prediction, and/or the prediction predTrGrpIdx of the index of the selected secondary transform to be applied to the block of transform coefficients returned by the primary transform. The indices may be found by the encoder via rate-distortion optimization. At 4102, the residue of prediction R=Y−Ŷ may be fed into the primary transform of index trIdx found by the encoder. At 4103, the resulting primary transform coefficients $T_0$ may be fed into the secondary transform of index trGrpIdx found by the encoder. At 4104, the resulting secondary transform coefficients $T_1$ may be fed into the quantizer. At 4105, a predictive encoder (e.g., first predictive encoder) may encode trIdx with respect to predTrIdx, yielding the bits $A_{remainder}$ e.g., written to the bitstream. At 4106, a second predictive encoder may encode trGrpIdx with respect to predTrGrpIdx, yielding the bits $B_{remainder}$, e.g., written to the bitstream. At 4107, repIdx may be used to represent the neural network-based intra prediction mode when encoding a subsequent block with respect to the current reconstructed block, e.g., by replacing the index of the neural network-based mode with repIdx when deriving the list of MPMs for signaling the intra prediction mode selected to predict a neighboring block.

Figure 23:
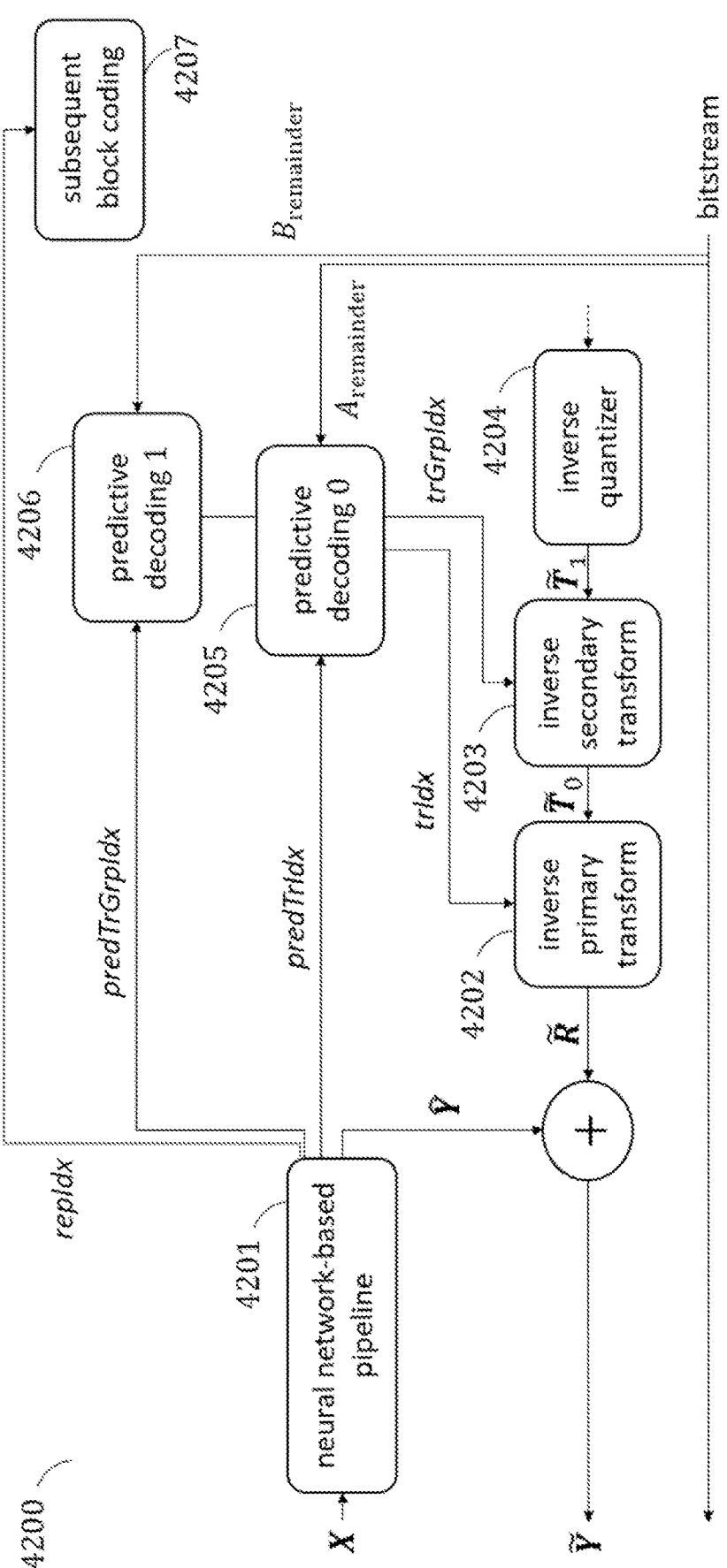
FIG. 23 shows an example of neural network-based pipeline on the decoder side.

FIG. 23 shows an example of a neural network-based pipeline on the decoder side 4200. At 4201, the neural network-based pipeline may compute from the context X a prediction Ŷ of the current block, the index repIdx of the regular intra prediction mode that represents (e.g. best represents) the neural network prediction of the current block, the prediction predTrIdx of the index of the selected primary transform to be applied to the residue of the neural network prediction, and/or the prediction predTrGrpIdx of the index of the selected secondary transform to be applied to the block of transform coefficients returned by the primary transform. At 4205, the decoder associated with the predictive encoder (e.g., first predictive encoder) may decode trIdx using predTrIdx and the bits $A_{remainder}$, e.g., read from the bitstream. At 4206, the decoder associated with the second predictive encoder may decode trGrpIdx using predTrGrpIdx and the bits $B_{remainder}$, e.g., read from the bitstream. At 4204, the inverse quantizer may provide the block of reconstructed secondary transform coefficients $\tilde{T}_1$. At 4203, the inverse secondary transform of index trGrpIdx may turn $\tilde{T}_1$ into the block of reconstructed primary transform coefficients $\tilde{T}_0$. At 4202, the inverse primary transform of index trIdx may compute the reconstructed residue $\tilde{R}$ from $\tilde{T}_0$. The reconstructed block may be $\tilde{Y}=\tilde{R}+\hat{Y}$. At 4207, repIdx may be used to represent the neural network-based intra prediction mode when decoding a subsequent block with respect to the current decoded block, e.g., by replacing the index of the neural network-based mode with repIdx when deriving the list of MPMs for signaling the intra prediction mode selected to predict a neighboring block.

Figure 24:
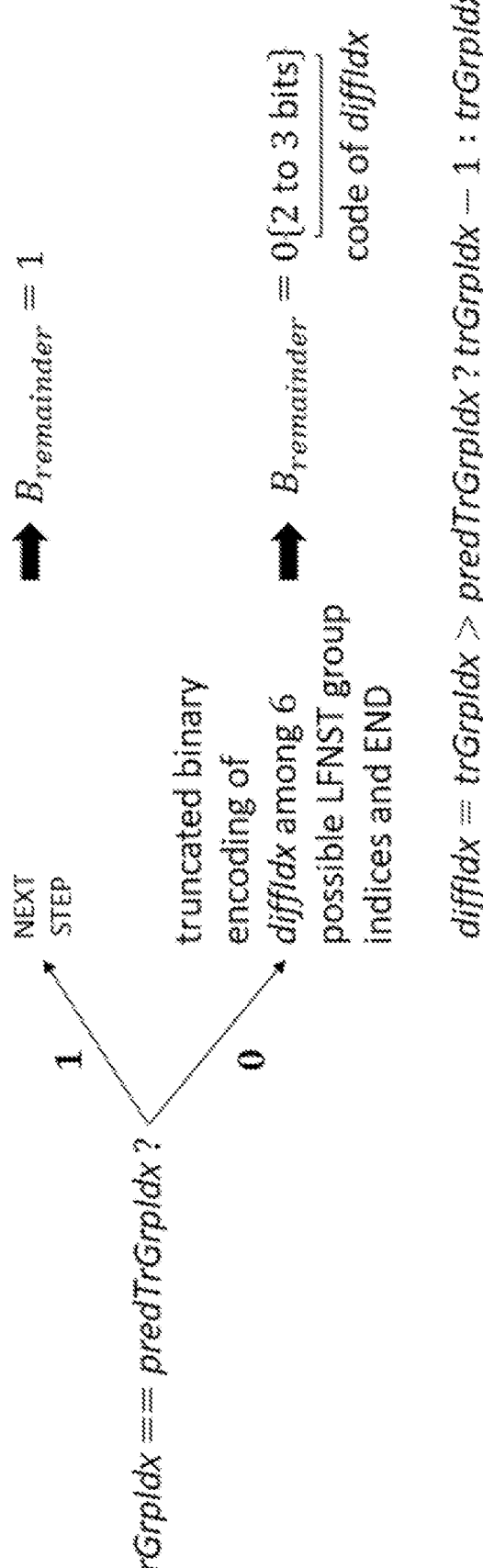
FIG. 24 shows an exemplary decision tree representative of the predictive encoding of trGrpIdx with respect to predTrGrpIdx, yielding the bits $B_{remainder}$.

In the case where, the current block is coded in intra mode and the neural network-based intra prediction mode returns the prediction predTrGrpIdx of the selected LFNST group index, the neural network-based mode be used to may predict the implicit signaling of LFNST. FIG. 24 shows an exemplary decision tree representative of the predictive encoding of trGrpIdx with respect to predTrGrpIdx, yielding the bits $B_{remainder}$. Other predictive encoding scheme(s) may be compatible with the examples described with respect to FIG. 22.

In the case where the current block is coded in intra mode, and the neural network-based intra prediction mode returns the prediction predTrGrpIdx of the selected LFNST group index, predictive decoding may be performed. FIG. 25 shows the example predictive decoding associated with the predictive encoding as described herein with respect to FIG. 24.

For a given block predicted by the neural network-based intra prediction mode, the index of the regular intra prediction mode that represents (e.g., best represents) the neural network prediction of the block may be used, e.g., at any time, during either video encoding or video decoding to represent the intra prediction of the block. The index of the regular intra prediction mode that represents the neural network prediction of the block may be used even though the regular intra prediction mode index is used during either the encoding or the decoding of another block that may be located in a coding tree unit (CTU) different from the CTU hosting the former block. The index of the regular intra prediction mode that represents the neural network-based prediction of the block may be used even if the regular intra prediction mode index is used during either the encoding or the decoding of another block located in a frame that is different from the frame hosting the former block. This may be illustrated in the context of the derivation of a list of MPMs for a given luminance CB. Derivation of a list of MPMs may be implemented, for example, by computing systems executing software. FIGS. 26, 27, 28, 29, and 30 depict derivation of a list of MPMs for the current luminance CB, and illustrate how, in a system that comprises the neural network-based intra prediction mode, the list of MPMs may be derived for the current luminance CB.

FIG. 26 depicts example derivation of a list of MPMs for a current luminance CB. The derivation may be implemented, for example, using software executing on a computing system. The derivation may comprise filling a general list of 22 MPMs. In FIG. 26, it may be assumed that the luminance CBs directly neighboring the current luminance CB are predicted in intra. This may be true if the current luminance CB is in an intra frame. When filling the general list of MPMs, when an intra prediction mode index is proposed to fill the cell of index k, if the intra prediction mode index does not already exist in the general list of MPMs, the index may be placed at the cell of index k and the filling may resume at the cell of index k+1. Otherwise (e.g., if the intra prediction mode index already exists in the general list of MPMs), the intra prediction mode index may be ignored and the filling may resume at the cell of index k. Referring to FIG. 26, at 4300, PLANAR_IDX may be proposed to fill the cell of index 0 of the list of MPMs. At 4301, if the height of the current luminance CB is larger than its width, the index of the intra prediction mode predicting the luminance CB overlapping Square "1", which may be referred to as above CB, may be proposed to fill the general list of MPMs. Otherwise, the index of the intra prediction mode predicting the luminance CB overlapping Square "2", which may be referred to as left CB, may be proposed to fill the general list of MPMs. At 4302, if the height of the current luminance CB is larger than its width, the index of the intra prediction mode predicting the luminance CB overlapping Square "2" may be proposed to fill the general list of MPMs. Otherwise, the index of the intra prediction mode predicting the luminance CB overlapping Square "1" may be proposed to fill the general list of MPMs. At 4303, the index of the intra prediction mode predicting the luminance CB overlapping Square "4", which may be referred to as below-left CB, may be proposed to fill the general list of MPMs. At 4304, the index of the intra prediction mode predicting the luminance CB overlapping Square "3", which may be referred to as above-right CB, may be proposed to fill the general list of MPMs. At 4305, the index of the intra prediction mode predicting the luminance CB overlapping Square "0", which may be referred to as above-left CB, may be proposed to fill the general list of MPMs.

At 4306, the index of the first intra prediction mode derived by decoder side intra mode derivation (DIMD) may be proposed to fill the general list of MPMs. At 4307, the index of a second intra prediction mode derived by DIMD may be proposed to fill the general list of MPMs. At 4308, if the second intra prediction mode index in the current general list of MPMs is neither PLANAR_IDX nor DC_IDX, the index of the eight directional intra prediction modes (e.g., each of the eight directional intra prediction modes) being neighbors of this second intra prediction mode in the current general list of MPMs in terms of directionality may be proposed to fill the general list of MPMs. At 4309, if the third intra prediction mode index in the current general list of MPMs is neither PLANAR_IDX nor DC_IDX, the index of the eight directional intra prediction modes (e.g., each of the eight directional intra prediction modes) being neighbors of this third intra prediction mode in the current general list of MPMs in terms of directionality may be proposed to fill the general list of MPMs. At 4310, if the second intra prediction mode index in the current general list of MPMs or the third intra prediction mode index is equal to DC_IDX and if the fourth intra prediction mode index in the current general list of MPMs is neither PLANAR_IDX nor DC_IDX, the index of the six directional intra prediction modes (e.g., each of the six directional intra prediction modes) being neighbors of this fourth intra prediction mode in the current general list of MPMs in terms of directionality may be proposed to fill the general list of MPMs. At 4311, the remaining cells in the general list of MPMs may be filled with default intra prediction modes indices. Once the general list of 22 MPMs is filled, the first 6 MPMs may be grouped into the list of primary MPMs while the last 16 MPMs may be aggregated into the list of secondary MPMs.

FIG. 27 depicts an exemplary application to the derivation depicted in FIG. 26 of the implementations described herein involving inferring the index of the regular intra prediction mode to represent the neural network prediction of a current block. FIG. 27 involves the derivation of the list of MPMs for the current luminance CB in, for example, a video codec comprising the neural network-based intra prediction mode. The derivation may be implemented, for example, on a computing system executing software. In FIG. 27, similar to FIG. 26, the luminance CBs directly neighboring the current luminance CB may be predicted in intra. The exemplary derivation in FIG. 27 proceeds similarly to that in FIG. 26, with the exception, for example, that, for the five luminance CBs (e.g., each of the five luminance CBs) surrounding the current luminance CB and overlapping Squares "0", "1", "2", "3", and "4", respectively, if the index of the intra prediction mode selected to predict the CB is equal to the index NN_IDX of the neural network-based intra prediction mode, the index may be replaced by the index repIdx of the regular intra prediction mode that represents, e.g., best represents, the neural network prediction of the neighboring luminance CB. For these five luminance CBs (e.g., each of the five luminance CBs), this potential replacement may be performed before proposing the index of the intra prediction mode selected to predict the neighboring luminance CB to fill the general list of MPMs.

FIG. 28 depicts an example derivation of the list of MPMs for the current luminance CB in the case that multiple luminance CBs directly neighboring the current luminance CB are predicted in inter. The implementation may be performed, for example, on a computing system executing software. FIG. 28 depicts an example instance wherein the luminance CBs around (e.g., neighboring) the current luminance CB that overlap Squares "2" and "4," respectively, may be predicted in inter, whereas the luminance CBs around (e.g., neighboring) the current luminance CB that overlap Squares "0", "1", and "3," respectively, may be predicted in intra. The width of the current luminance CB may be larger than its height. Referring to FIG. 28, at 4400, PLANAR_IDX may be proposed to fill the cell of index 0 of the list of MPMs. At 4401, the index of the intra prediction mode predicting the luminance CB overlapping Square "1", which may be referred to as above CB, may be proposed to fill the general list of MPMs. At 4402, a portion of code (e.g., a subroutine), which may be referred to as, for example, "getIpmInfo", may operate on the luminance CB overlapping Square "2", which may be referred to as left CB. The intra prediction mode index returned by "getIpmInfo" may be proposed to fill the general list of MPMs. "getIpmInfo" may use the decoded motion vectors to find in the past decoded frames the last decoded CU that is both linked to the luminance CB argument of "getIpmInfo" via the motion and predicted in intra. "getIpmInfo" may scan the history of the motion vectors that give rise to the luminance CB argument of "getIpmInfo", looking for the last CU predicted in intra. "getIpmInfo" may return the index of the intra prediction mode selected to predict the luminance CB of the found CU. At 4403, the index of the intra prediction mode predicting the luminance CB overlapping Square "3", which may be referred to as above-right CB, may be proposed to fill the general list of MPMs. At 4404, the index of the intra prediction mode predicting the luminance CB overlapping Square "0", which may be referred to as above-left CB, may be proposed to fill the general list of MPMs. At 4405, "getIpmInfo" may be called on the luminance CB overlapping Square "4", which may be referred to as below-left CB, and the returned intra prediction mode index may be proposed to fill the general list of MPMs. Processing at 4406, 4407, 4408, 4409, 4410, and 4411 of FIG. 28 may proceed consistent with as described in connection with 4306, 4307, 4308, 4309, 4310, and 4311, respectively, of FIG. 26.

FIG. 29 depicts application to the derivation depicted in FIG. 28 of the implementations described herein involving inferring the index of the regular intra prediction mode to represent the neural network prediction of a current block. FIG. 29 involves the derivation of the list of MPMs for the current luminance CB including the neural network-based intra prediction mode. In FIG. 29, e.g., similar to FIG. 28, the luminance CBs around (e.g., neighboring) the current luminance CB that overlap Squares "2" and "4", respectively, may be predicted in inter, whereas the luminance CBs around (e.g., neighboring) the current luminance CB that overlap Squares "0", "1", and "3", respectively, may be predicted in intra. The width of the current luminance CB may be larger than its height. As compared to FIG. 28, in FIG. 29, a first difference may be that, for the three luminance CBs (e.g., each of the three luminance CBs) neighboring the current luminance CB and overlapping Squares "0", "1", and "3", respectively, if the index of the intra prediction mode selected to predict this CB is equal to the index NN_IDX of the neural network-based intra prediction mode, the index may be replaced by the index repIdx of the regular intra prediction mode (e.g., non-neural network-based intra prediction mode) that represents (e.g., best represents) the neural network prediction of the neighboring luminance CB. A second difference may be that, for the two luminance CBs (e.g., each of the two luminance CBs) neighboring the current luminance CB and overlapping Squares "2" and "4", respectively, during the call to "getIpmInfo", for the last found CU predicted in intra, if the index of the intra prediction mode selected to predict the luminance CB of this found CU is equal to the index NN_IDX of the neural network-based intra prediction mode, this index may be replaced by the index repIdx of the regular intra prediction mode (e.g., non-neural network-based intra prediction mode) that represents (e.g., best represents) the neural network prediction of the luminance CB of the found CU.

Although FIG. 28 and FIG. 29 illustrate derivation of a list of MPMs for the current luminance CB when the luminance CBs around (e.g., neighboring) the current luminance CB that overlap Squares "2" and "4," respectively, are predicted in inter, the luminance CBs around the current luminance CB that overlap Squares "0", "1", and "3", respectively, are predicted in intra, and the width of the current luminance CB is larger than its height, the example derivations (e.g., depicted in these figures) may be applied to other instances involving different luminance CBs around (e.g., neighboring) the current luminance CB predicted in inter and/or intra. For example, FIG. 30 depicts another exemplary application to the derivation depicted in FIG. 28 of the implementations described herein involving inferring the index of the regular intra prediction mode (e.g., non-neural network-based intra prediction mode) to represent the neural network prediction of a current block. FIG. 30 depicts example derivation of the list of MPMs for the current luminance CB in, for example, a video codec comprising the neural network-based intra prediction mode. The derivation may be performed, for example, by software executing on a computing system. The luminance CBs around (e.g., neighboring) the current luminance CB that overlap Squares "1" and "3", respectively, may be predicted in inter, whereas the luminance CBs around the current luminance CB that overlap Squares "0", "2", and "4", respectively, may be predicted in intra. The height of the current luminance CB may be larger than its height.

The principles presented in FIGS. 26, 27, 28, 29, and 30 may be applied to the case where, instead of having a inferring the index of the regular intra prediction that represents (e.g., best represents) the neural network prediction of the current block, the neural network-based intra prediction mode may infer the indices of the k regular intra prediction modes that represent (e.g., best represent) the neural network prediction of the current block.

In an example, "getIpmInfo" may be programmed to perform different, operations. For example, during the encoding of a given video, for the first non-intra frame following a given reconstructed intra frame, for a luminance CB (e.g., each luminance CB) in the given reconstructed intra frame, the index of the intra prediction mode selected to predict the luminance CB may be propagated to the luminance CB predicted in inter in the non-intra frame following the associated motion vector. This processing may result in a map of intra prediction modes indices, with a luminance CB (e.g., each luminance CB) predicted in inter in the non-intra frame owning its propagated intra prediction mode index. This process may be repeated for a non-intra frame. "getIpmInfo" may use the motion vector of its argument luminance CB to determine the CU involved in the motion compensation, yielding the prediction of its argument luminance CB and the propagated intra prediction mode index of the found CU. "getIpmInfo" may return the propagated intra prediction mode index. Similar processing may be applied to decoding of a given video. In examples, for a given luminance CB, the substitution of the index NN_IDX of the neural network-based intra prediction mode by the index repIdx of the regular intra prediction mode (e.g., non-neural network-based prediction mode) that represents (e.g., best represents) the neural network prediction of the luminance CB may not be carried out during the call to "getIpmInfo." In examples, it may be carried out during the creation of the map of propagated intra prediction modes indices when moving from a video frame to the next one. FIG. 31 depicts corresponding example derivation of a list of MPMs.

During the encoding stage, for a given block predicted by the neural network-based intra prediction mode, the index of the regular intra prediction mode that represents (e.g., best represents) the neural network prediction of the block may be used, e.g., at any time, during the encoding of the block following the intra prediction step. If the implicit signaling of the index of a transform to be applied during the encoding of the block uses the index of the selected intra prediction mode, the index of the inferred regular intra prediction mode may replace the index of the neural network-based intra prediction mode. Similarly, during the decoding stage, for a given block predicted by the neural network-based intra prediction mode, the index of the regular intra prediction mode that represents (e.g., best represents) the neural network prediction of the block may be used, e.g., at any time, during the decoding of the block following the intra prediction step. If the implicit signaling of the index of a transform to be applied during the decoding of the block uses the index of the selected intra prediction mode, the index of the inferred regular intra prediction mode may replace the index of the neural network-based intra prediction mode. FIG. 32 presents an adaptation of FIG. 8 to such an implementation. FIG. 32 depicts an example inferring the index of the regular intra prediction mode (e.g., non-neural network-based intra prediction mode) that may represent (e.g., may best represent) the neural network prediction of the current block on a decoder side 4500. The neural network-based intra prediction mode may take (e.g., obtain) context X surrounding Y to provide a prediction $Y^$ of Y and a vector P whose coefficient of index i may correspond to a probability that a regular intra prediction (e.g., non-neural network-based intra prediction mode) of index i represents (e.g., best represents) the neural network prediction $Y^$ on a decoder side 4501. repIdx may equal argmax(P) 4502. In examples, an inverse quantizer 4505 may provide a block of reconstructed secondary transform coefficients $T^\sim\_1$. $TY^\sim\_1$ may be turned into reconstructed primary transform coefficients $T^\sim\_0$, for example, via an inverse secondary transform 4504. The index NN_IDX of the neural network-based intra prediction mode may be replaced by repIdx, which characterizes the implicit signaling of the inverse primary transform to be applied to $T^\sim\_0$, as shown. The inverse primary transform 4503 may compute reconstructed residue $R^\sim$ from $T^\sim\_0$. Accordingly, $Y^\sim=R^\sim+Y^$.

The principles presented in FIG. 32 may be applied where the indices of multiple regular intra prediction modes that correspond to (e.g., best represent) the neural network prediction of the current block. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A decoding device comprising:
a processor configured to:
  obtain, for a current coding block, information representative of a neural network-based prediction mode and a block context;
  generate a neural network-based predictor for the current coding block based on the block context and the neural network-based prediction mode;
  determine, based on a plurality of pixels that neighbor the current coding block, a non-neural network-based intra prediction mode that corresponds to the generated neural network-based predictor;
  determine an intra prediction index associated with the determined non-neural network-based intra prediction mode;
  add the intra prediction index to a most probable mode (MPM) list of a neighboring block of the current coding block;
  determine a prediction mode for the neighboring block based on the MPM list; and
  decode the neighboring block based on the prediction mode.

2. The device of claim 1, wherein the current coding block comprises a current luminance block and a current chrominance block, and the generated neural network-based predictor comprises a luminance predictor for the current luminance block, and a chrominance predictor for the current chrominance block.

3. The device of claim 1, wherein determining the non-neural network-based intra prediction mode further comprises:
  obtaining a plurality of representation probabilities associated with a plurality of non-neural network based intra prediction modes based on the block context and the neural network-based prediction mode; and
  selecting, from the plurality of non-neural network based intra prediction modes, the determined non-neural network-based intra prediction mode based on the plurality of representation probabilities.

4. The device of claim 3, wherein a first representation probability associated with a first non-neural network based intra prediction mode is configured to indicate a probability that using the first non-neural network based intra prediction mode on the current block yields a representation of the generated neural network-based predictor, wherein a higher probability indicates that the representation is more similar to the generated neural network-based predictor when compared to a lower probability, wherein a non-neural network based intra prediction mode associated with a highest representation probability is selected.

5. The device of claim 1, wherein the processor is further configured to:
  obtain an intra prediction index associated with the determined non-neural network-based intra prediction mode that corresponds to the generated neural network-based predictor; and add the intra prediction index associated with the determined non-neural network-based intra prediction mode to a most probable mode (MPM) list of the neighboring block.

6. The device of claim 1, wherein the processor is further configured to:
  apply at least one of a primary inverse transform or a secondary inverse transform based on the non-neural network-based intra prediction mode.

7. The device of claim 1, wherein the processor is further configured to:
  derive a most probable mode (MPM) for the neighboring block based on the determined non-neural network-based intra prediction mode.

8. A method of video decoding, comprising:
  obtaining, for a current coding block, information representative of a neural network-based prediction mode and a block context;
  generating a neural network-based predictor for the current coding block based on the block context and the neural network-based prediction mode;
  determining, based on a plurality of pixels that neighbor the current coding block, a non-neural network-based intra prediction mode that corresponds to the generated neural network-based predictor;
  determining an intra prediction index associated with the determined non-neural network-based intra prediction mode;
  adding the intra prediction index to a most probable mode (MPM) list of a neighboring block of the current coding block;
  determining a prediction mode for the neighboring block based on the MPM list; and
  decoding the neighboring block based on the prediction mode.

9. The method of claim 8, wherein the current coding block comprises a current luminance block and a current chrominance block, and the generated neural network-based predictor comprises a luminance predictor for the current luminance block, and a chrominance predictor for the current chrominance block.

10. The method of claim 8, wherein determining the non-neural network-based intra prediction mode further comprises:
  obtaining a plurality of representation probabilities associated with a plurality of non-neural network based intra prediction modes based on the block context and the neural network-based prediction mode; and
  selecting, from the plurality of non-neural network based intra prediction modes, the determined non-neural network-based intra prediction mode based on the plurality of representation probabilities.

11. The method of claim 10, wherein a first representation probability associated with a first non-neural network based intra prediction mode is configured to indicate a probability that using the first non-neural network based intra prediction mode on the current block yields a representation of the generated neural network-based predictor, wherein a higher probability indicates that the representation is more similar to the generated neural network-based predictor when compared to a lower probability, and wherein a non-neural network based intra prediction mode associated with a highest representation probability is selected.

12. The method of claim 8, further comprising:

obtaining an intra prediction index associated with the determined non-neural network-based intra prediction mode that corresponds to the generated neural network-based predictor; and adding the intra prediction index associated with the determined non-neural network-based intra prediction mode to a most probable mode (MPM) list of the neighboring block.

13. The method of claim 8, further comprising:

applying at least one of a primary inverse transform or a secondary inverse transform based on the non-neural network-based intra prediction mode.

14. The method of claim 8, further comprising:

deriving a most probable mode (MPM) for the neighboring block based on the determined non-neural network-based intra prediction mode.

15. A method of video encoding, comprising:

obtaining, for a current coding block, information representative of a neural network-based prediction mode and a block context;

generating a neural network-based predictor for the current coding block based on the block context and the neural network-based prediction mode;

determining, based on a plurality of pixels that neighbor the current coding block, a non-neural network-based intra prediction mode that corresponds to the generated neural network-based predictor;

determining an intra prediction index associated with the determined non-neural network-based intra prediction mode;

adding the intra prediction index to a most probable mode (MPM) list of a neighboring block of the current coding block;

determining a prediction mode for the neighboring block based on the MPM list; and encoding the neighboring block based on the prediction mode.

16. The method of claim 15, wherein the current coding block comprises a current luminance block and a current chrominance block, and the generated neural network-based predictor comprises a luminance predictor for the current luminance block, and a chrominance predictor for the current chrominance block.

17. The method of claim 15, wherein determining the non-neural network-based intra prediction mode further comprises:

obtaining a plurality of representation probabilities associated with a plurality of non-neural network based intra prediction modes based on the block context and the neural network-based prediction mode; and selecting, from the plurality of non-neural network based intra prediction modes, the determined non-neural network-based intra prediction mode based on the plurality of representation probabilities.

18. The method of claim 17, wherein a first representation probability associated with a first non-neural network based intra prediction mode is configured to indicate a probability that using the first non-neural network based intra prediction mode on the current block yields a representation of the generated neural network-based predictor, wherein a higher probability indicates that the representation is more similar to the generated neural network-based predictor when compared to a lower probability, and wherein a non-neural network based intra prediction mode associated with a highest representation probability is selected.

19. The method of claim 15, further comprising:

obtaining an intra prediction index associated with the determined non-neural network-based intra prediction mode that corresponds to the generated neural network-based predictor; and adding the intra prediction index associated with the determined non-neural network-based intra prediction mode to a most probable mode (MPM) list of the neighboring block.

20. The method of claim 15, wherein the method further comprises:

applying at least one of a primary inverse transform or a secondary inverse transform based on the non-neural network-based intra prediction mode.

* * * * *